(12) United States Patent
Takada

(10) Patent No.: US 10,809,505 B2
(45) Date of Patent: Oct. 20, 2020

(54) ZOOM LENS AND IMAGE PICKUP APPARATUS USING THE SAME

(71) Applicant: OLYMPUS CORPORATION, Hachioji-shi, Tokyo (JP)

(72) Inventor: Keisuke Takada, Kokubunji (JP)

(73) Assignee: OLYMPUS CORPORATION, Tokyo (JP)

( * ) Notice: Subject to any disclaimer, the term of this patent is extended or adjusted under 35 U.S.C. 154(b) by 123 days.

(21) Appl. No.: 16/153,463

(22) Filed: Oct. 5, 2018

(65) Prior Publication Data

US 2019/0056572 A1   Feb. 21, 2019

Related U.S. Application Data

(63) Continuation of application No. PCT/JP2016/061126, filed on Apr. 5, 2016.

(51) Int. Cl.
*G02B 15/14* (2006.01)
*G02B 15/177* (2006.01)
(Continued)

(52) U.S. Cl.
CPC .......... *G02B 15/177* (2013.01); *G02B 13/02* (2013.01); *G02B 15/20* (2013.01);
(Continued)

(58) Field of Classification Search
CPC .......... G02B 9/34; G02B 15/20; G02B 13/18; G02B 15/177; G02B 5/005; G02B 13/04;
(Continued)

(56) References Cited

U.S. PATENT DOCUMENTS 8,786,956 B2 *   7/2014   Souma ............... G02B 15/14
                                                    359/680
2010/0053766 A1   3/2010   Okada
(Continued)

FOREIGN PATENT DOCUMENTS

JP   2010060612 A   3/2010
JP   2012226307 A   11/2012
(Continued)

OTHER PUBLICATIONS

International Preliminary Report on Patentability (IPRP) and Written Opinion dated Oct. 9, 2018 issued in International Application No. PCT/JP2016/061126.
(Continued)

*Primary Examiner* — Evelyn A Lester
(74) *Attorney, Agent, or Firm* — Holtz, Holtz & Volek PC

(57) ABSTRACT

A zoom lens includes in order from an object side, a first lens unit having a negative refractive power, a second lens unit having a positive refractive power, a third lens unit having a negative refractive power, and a fourth lens unit having a positive refractive power. At the time of zooming, distances between lenses vary. A distance between the first lens unit and the second lens unit becomes smaller at a telephoto end than at a wide angle end, and a distance between the second lens unit and the third lens unit becomes longer at the telephoto end than at the wide angle end, and the following conditional expressions (1), (2), and (3) are satisfied:

$$0.4<|f1|/|f2|<1.2 \qquad (1)$$

$$0.3<L2/L1<0.95 \qquad (2)$$

$$0.6<Lt/Lw<1 \qquad (3).$$

19 Claims, 40 Drawing Sheets

(51) Int. Cl.

| | |
|---|---|
| *G02B 15/20* | (2006.01) |
| *G02B 13/02* | (2006.01) |
| *G02B 27/00* | (2006.01) |
| *H04N 5/232* | (2006.01) |
| *G02B 13/18* | (2006.01) |
| *G02B 13/04* | (2006.01) |
| *G02B 9/34* | (2006.01) |
| *G02B 5/00* | (2006.01) |

(52) U.S. Cl.
CPC ..... *G02B 27/0062* (2013.01); *H04N 5/23296* (2013.01); *G02B 5/005* (2013.01); *G02B 9/34* (2013.01); *G02B 13/04* (2013.01); *G02B 13/18* (2013.01)

(58) Field of Classification Search
CPC .............. G02B 13/02; G02B 27/0062; H04N 5/23296
USPC ....... 359/683–686, 715, 740, 771, 781, 745, 359/747
See application file for complete search history.

(56) References Cited

U.S. PATENT DOCUMENTS

| | | |
|---|---|---|
| 2012/0257285 A1 | 10/2012 | Kuzuhara et al. |
| 2013/0215320 A1 | 8/2013 | Souma et al. |
| 2014/0022416 A1 | 1/2014 | Shinohara |
| 2015/0054989 A1 | 2/2015 | Masui |
| 2015/0097989 A1 | 4/2015 | Kai et al. |

FOREIGN PATENT DOCUMENTS

| | | |
|---|---|---|
| JP | 2013171165 A | 9/2013 |
| JP | 2014021232 A | 2/2014 |
| JP | 2015034892 A | 2/2015 |
| JP | 2015040986 A | 3/2015 |
| JP | 2015075533 A | 4/2015 |

OTHER PUBLICATIONS

International Search Report (ISR) and Written Opinion dated Jul. 12, 2016 issued in International Application No. PCT/JP2016/061126.

* cited by examiner

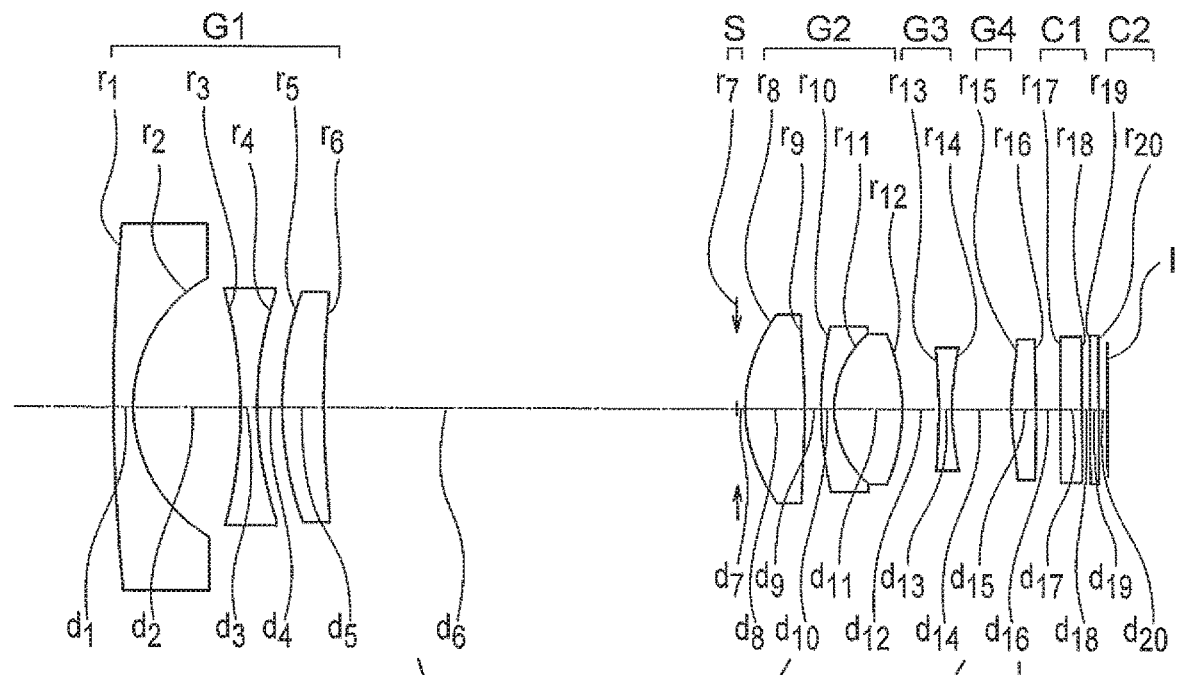
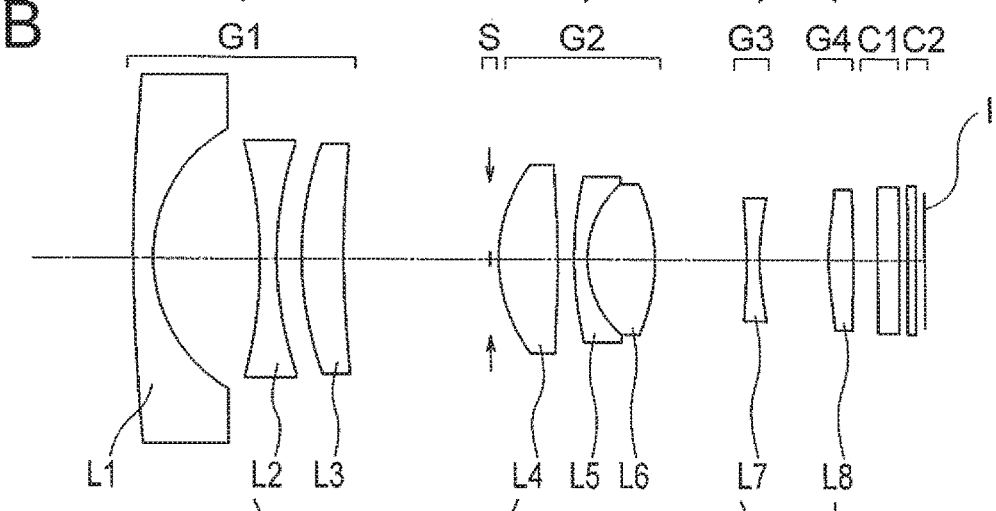
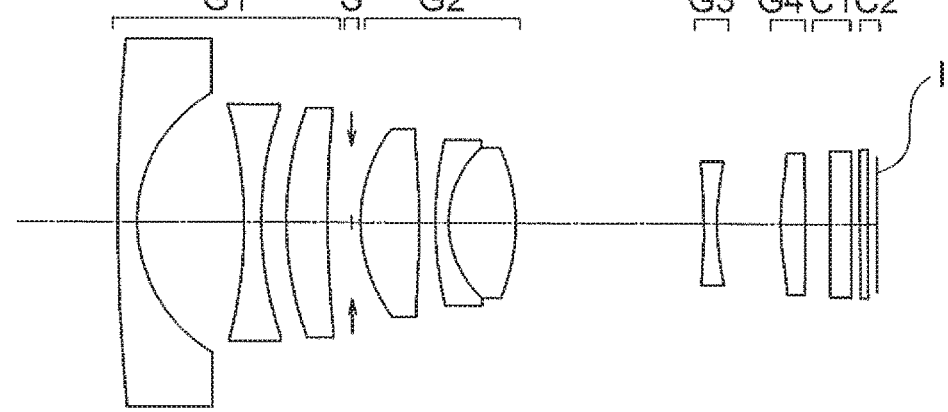
FIG. 1A
FIG. 1B
FIG. 1C

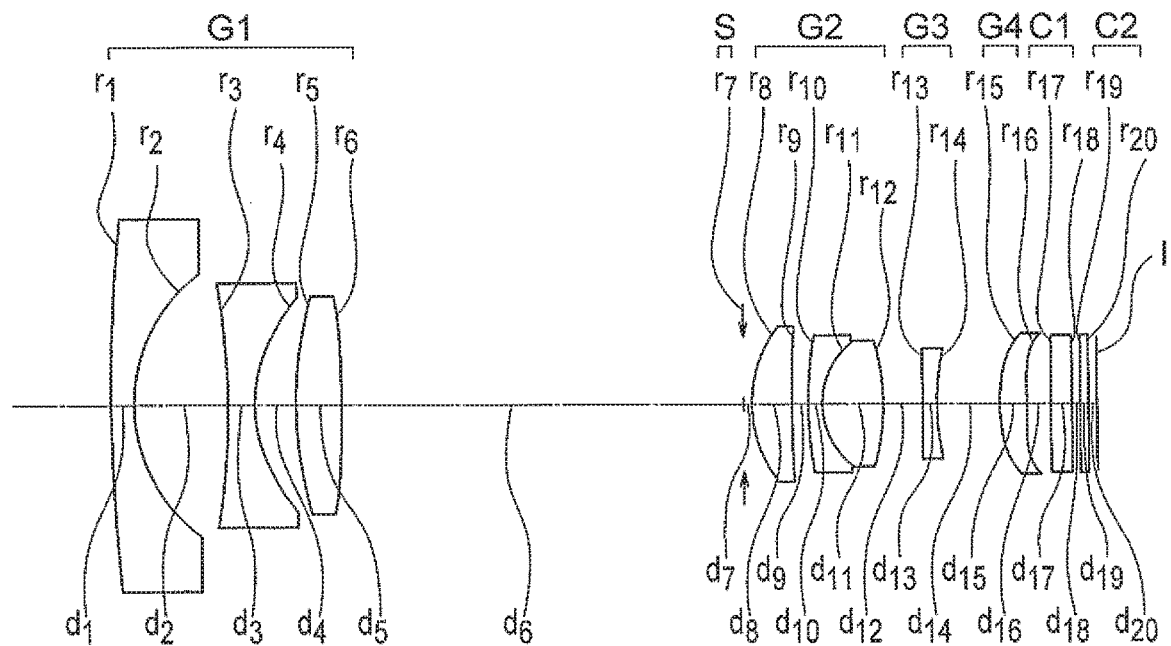
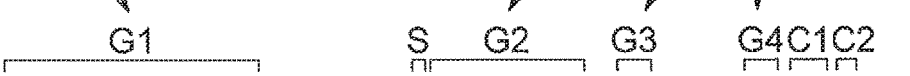
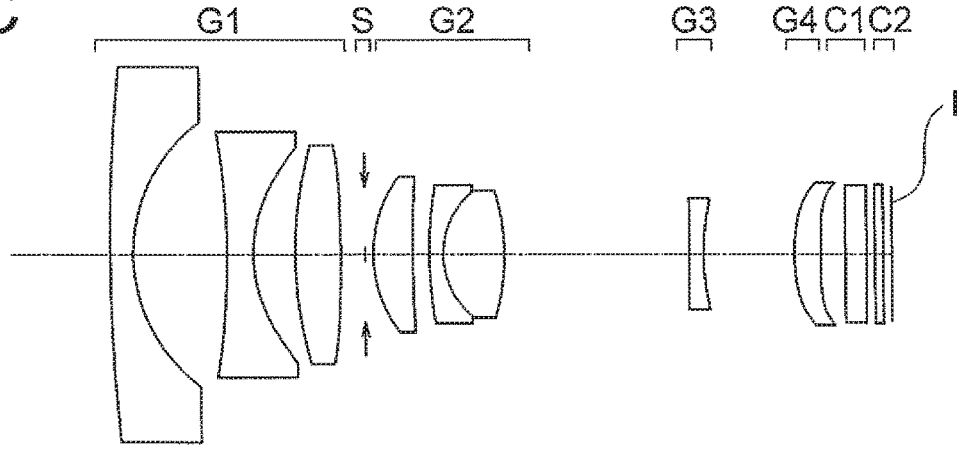

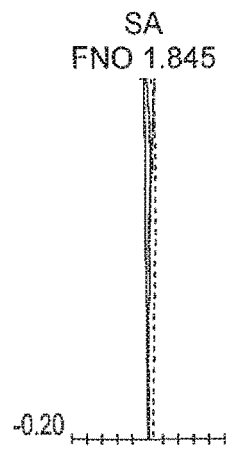
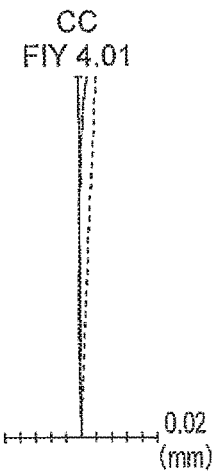
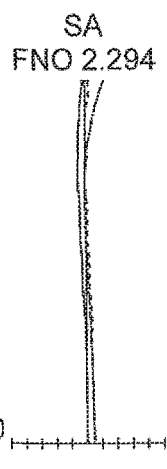
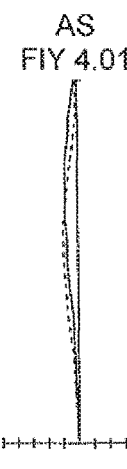
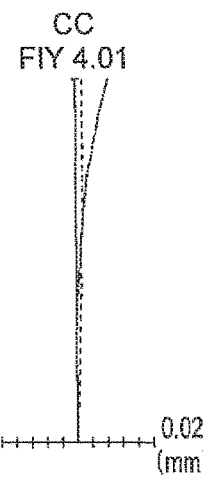
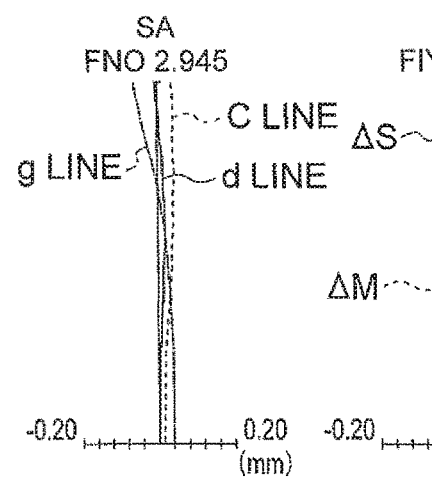
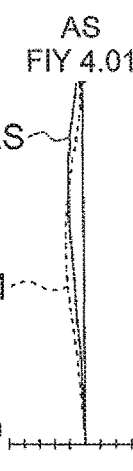
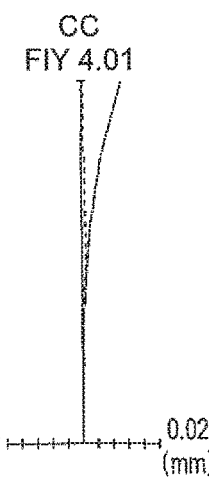

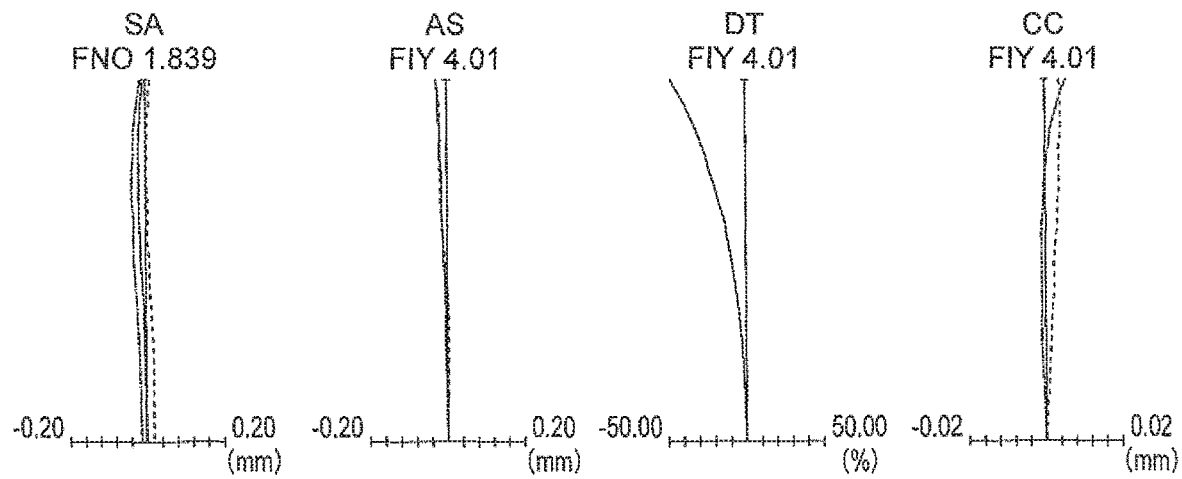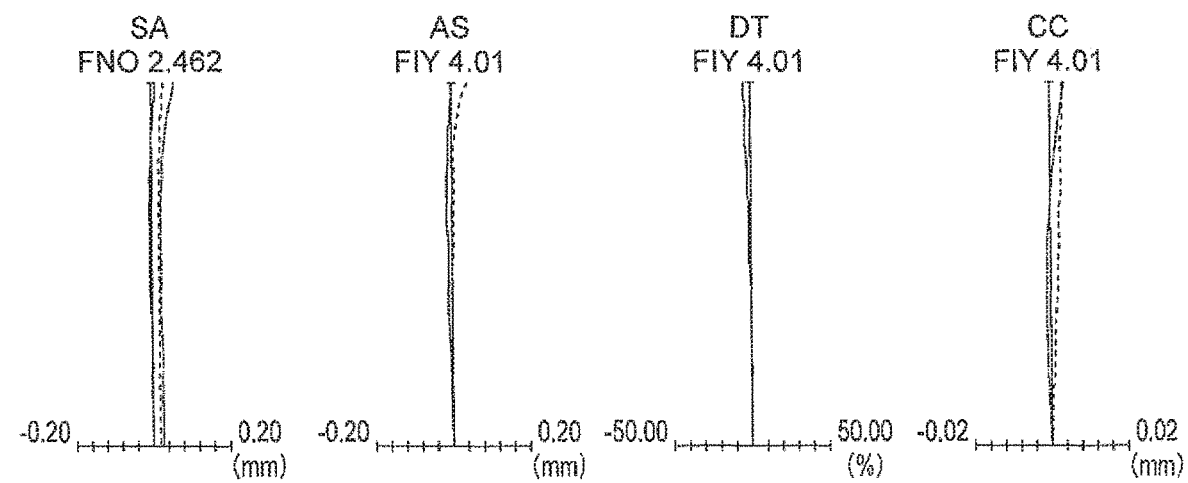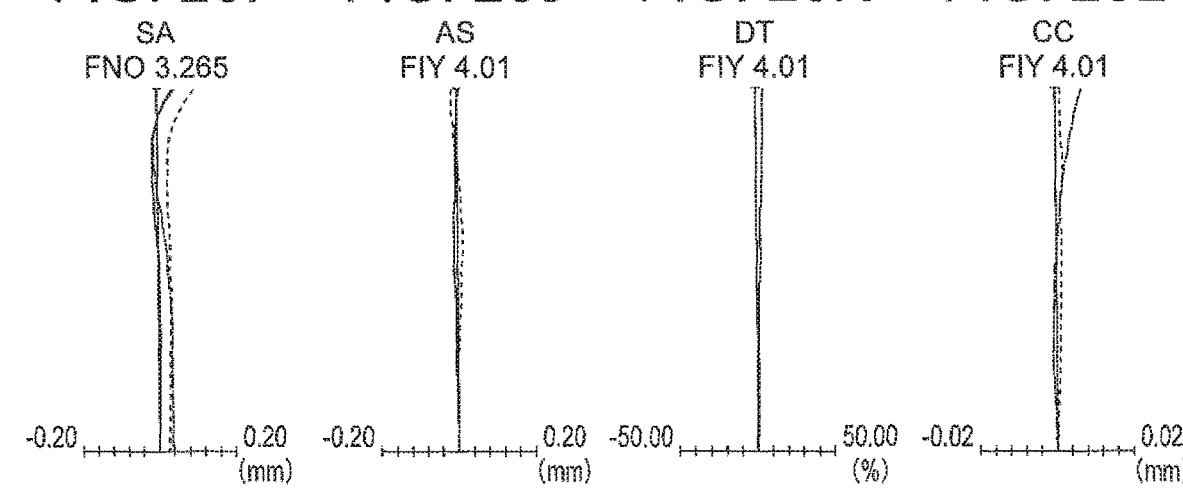

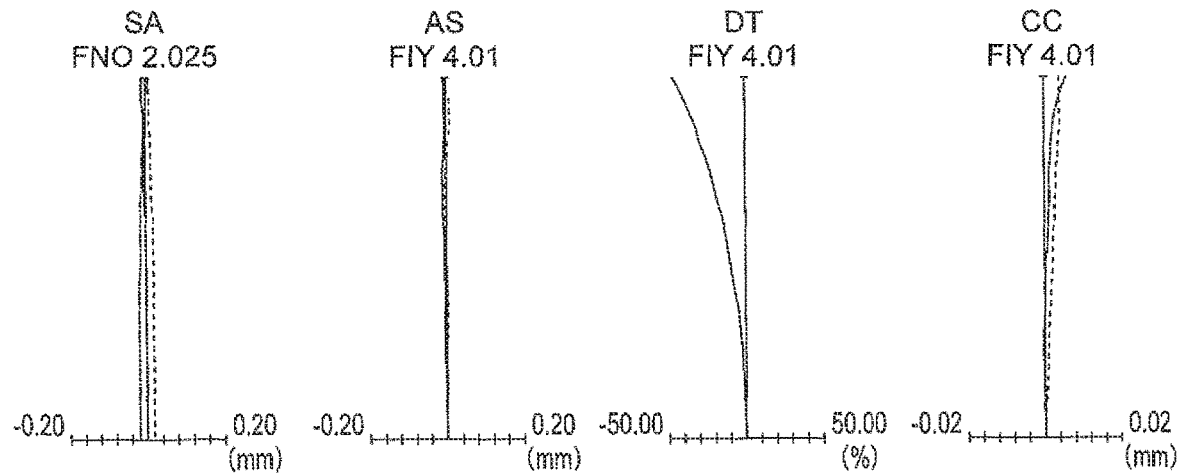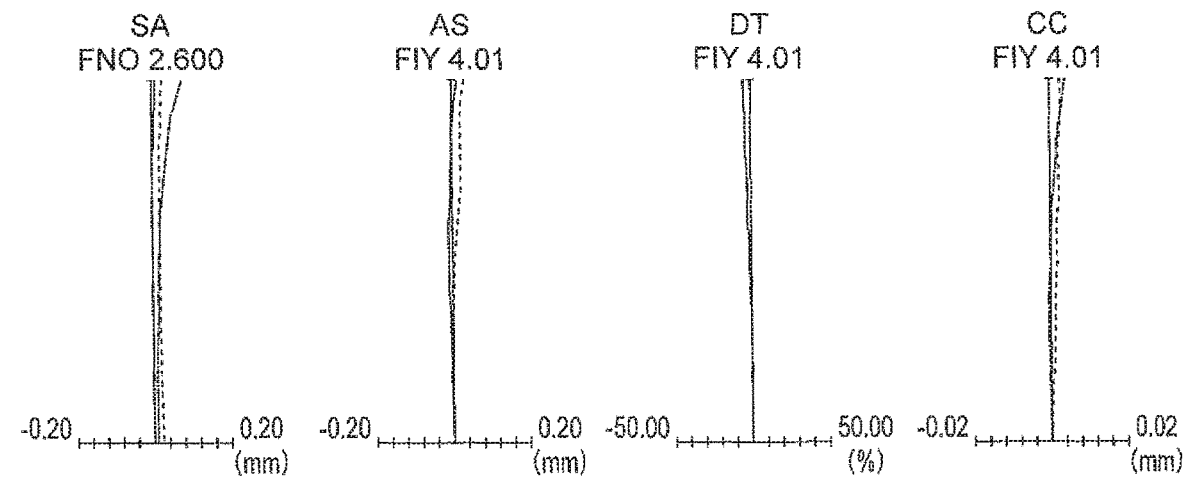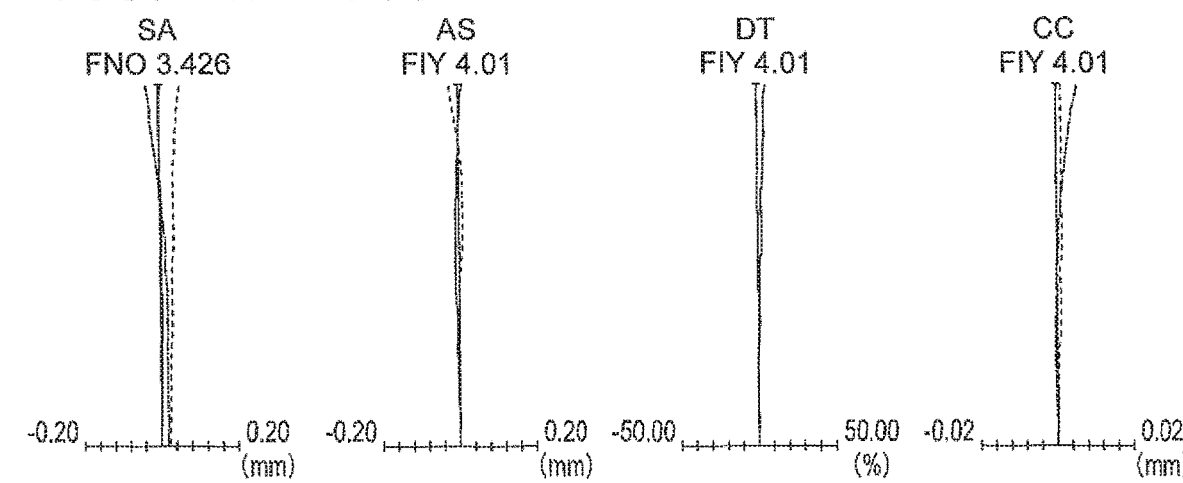

SA
FNO 2.018

-0.20 ┼┼┼┼┼┼┼┼┼ 0.20
(mm)

AS
FIY 4.01

-0.20 ┼┼┼┼┼┼┼┼┼ 0.20
(mm)

DT
FIY 4.01

-50.00 ┼┼┼┼┼┼┼┼┼ 50.00
(%)

CC
FIY 4.01

-0.02 ┼┼┼┼┼┼┼┼┼ 0.02
(mm)

SA
FNO 2.495

-0.20 ┼┼┼┼┼┼┼┼┼ 0.20
(mm)

AS
FIY 4.01

-0.20 ┼┼┼┼┼┼┼┼┼ 0.20
(mm)

DT
FIY 4.01

-50.00 ┼┼┼┼┼┼┼┼┼ 50.00
(%)

CC
FIY 4.01

-0.02 ┼┼┼┼┼┼┼┼┼ 0.02
(mm)

SA
FNO 3.323

-0.20 ┼┼┼┼┼┼┼┼┼ 0.20
(mm)

AS
FIY 4.01

-0.20 ┼┼┼┼┼┼┼┼┼ 0.20
(mm)

DT
FIY 4.01

-50.00 ┼┼┼┼┼┼┼┼┼ 50.00
(%)

CC
FIY 4.01

-0.02 ┼┼┼┼┼┼┼┼┼ 0.02
(mm)

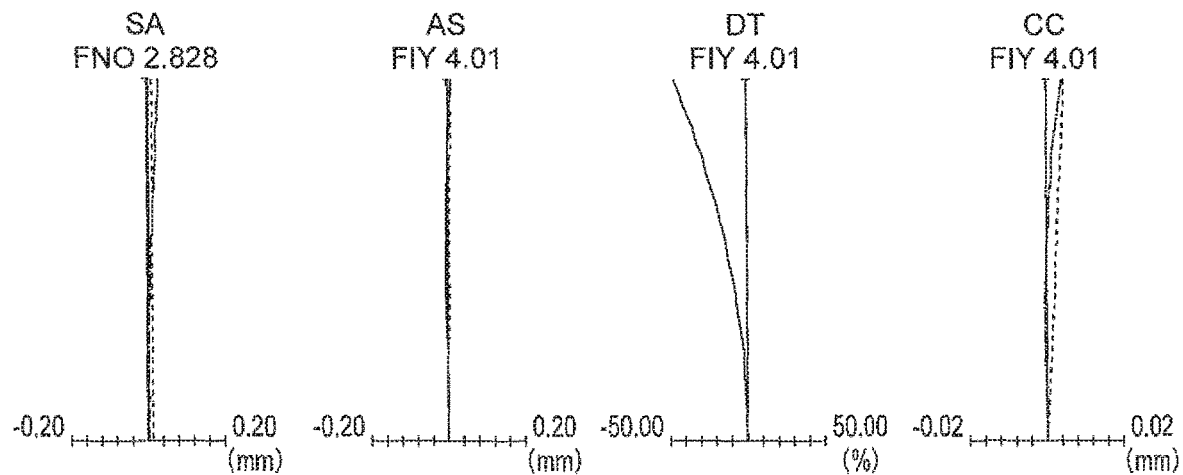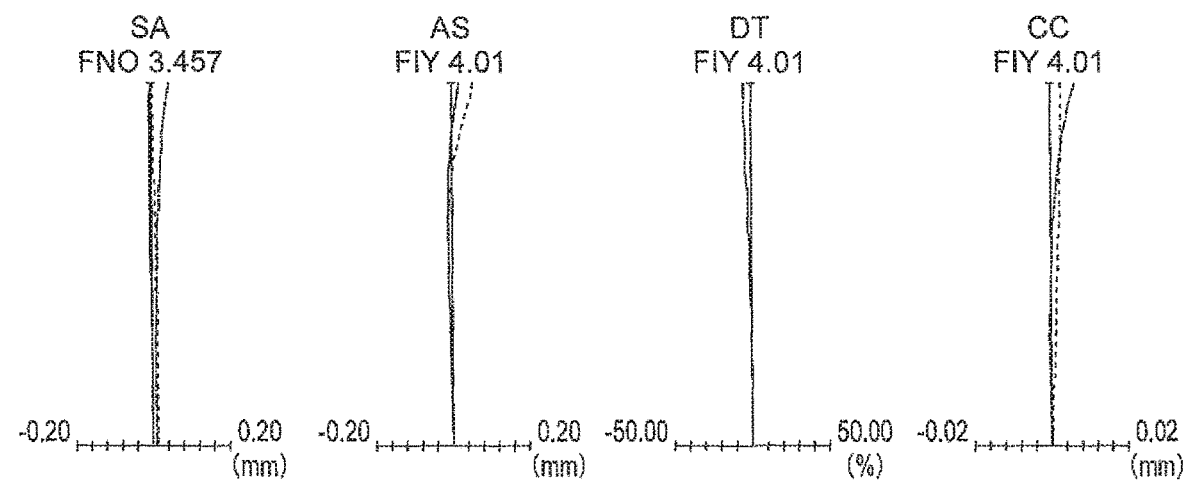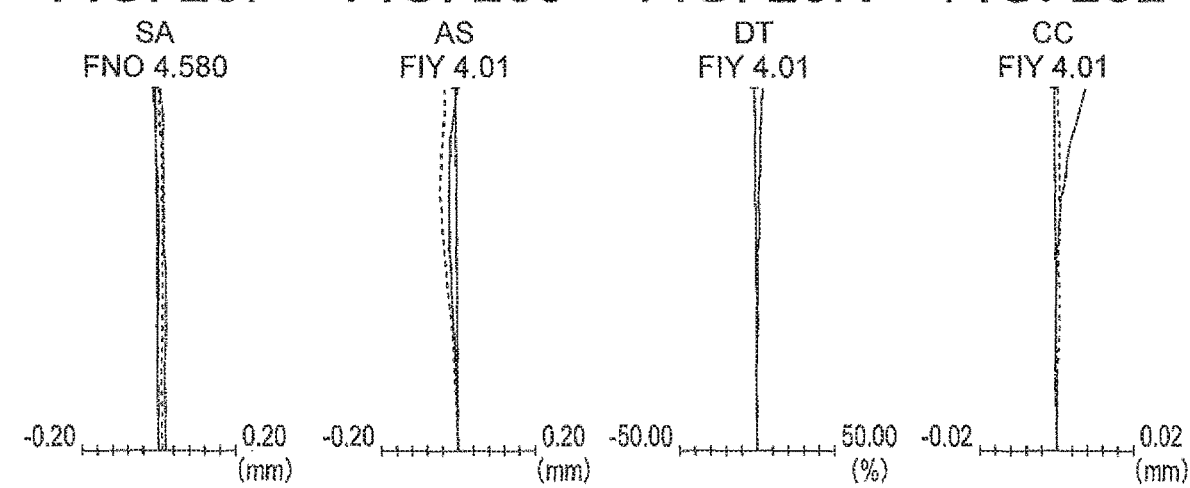

SA
FNO 2.845

AS
FIY 4.01

DT
FIY 4.01

CC
FIY 4.01

SA
FNO 3.720

AS
FIY 4.01

DT
FIY 4.01

CC
FIY 4.01

SA
FNO 4.540

AS
FIY 4.01

DT
FIY 4.01

CC
FIY 4.01

SA
FNO 2.507

-0.20   0.20
(mm)

AS
FIY 4.01

-0.20   0.20
(mm)

DT
FIY 4.01

-50.00   50.00
(%)

CC
FIY 4.01

-0.02   0.02
(mm)

SA
FNO 3.088

-0.20   0.20
(mm)

AS
FIY 4.01

-0.20   0.20
(mm)

DT
FIY 4.01

-50.00   50.00
(%)

CC
FIY 4.01

-0.02   0.02
(mm)

SA
FNO 4.219

-0.20   0.20
(mm)

AS
FIY 4.01

-0.20   0.20
(mm)

DT
FIY 4.01

-50.00   50.00
(%)

CC
FIY 4.01

-0.02   0.02
(mm)

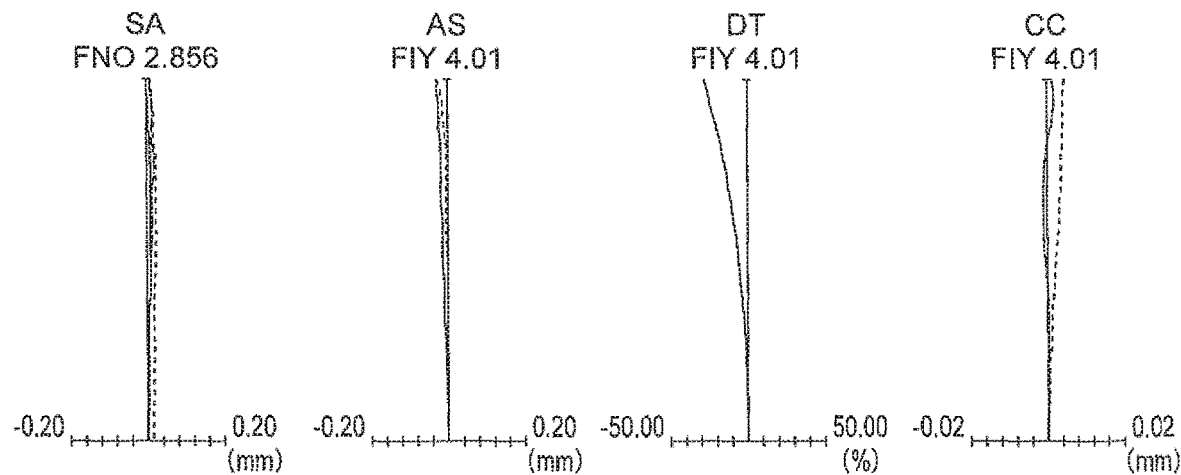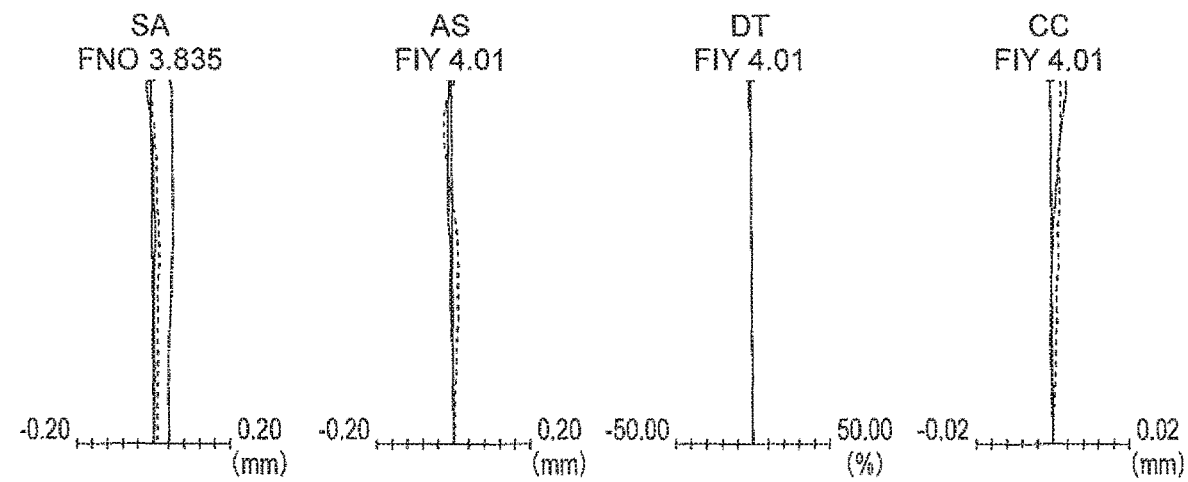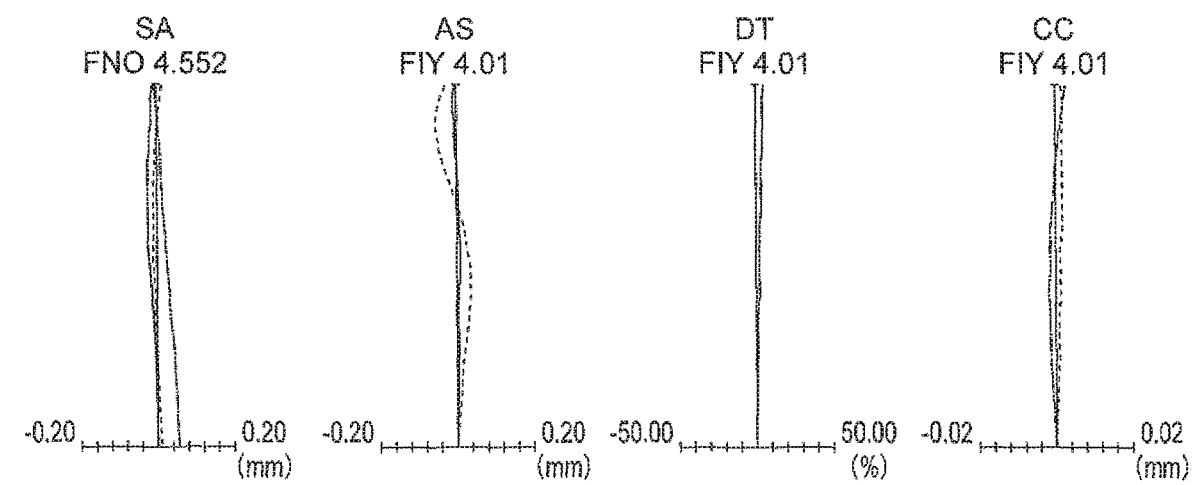

SA
FNO 2.856
-0.20 — 0.20
(mm)

AS
FIY 4.01
-0.20 — 0.20
(mm)

DT
FIY 4.01
-50.00 — 50.00
(%)

CC
FIY 4.01
-0.02 — 0.02
(mm)

SA
FNO 3.505
-0.20 — 0.20
(mm)

AS
FIY 4.01
-0.20 — 0.20
(mm)

DT
FIY 4.01
-50.00 — 50.00
(%)

CC
FIY 4.01
-0.02 — 0.02
(mm)

SA
FNO 4.175
-0.20 — 0.20
(mm)

AS
FIY 4.01
-0.20 — 0.20
(mm)

DT
FIY 4.01
-50.00 — 50.00
(%)

CC
FIY 4.01
-0.02 — 0.02
(mm)

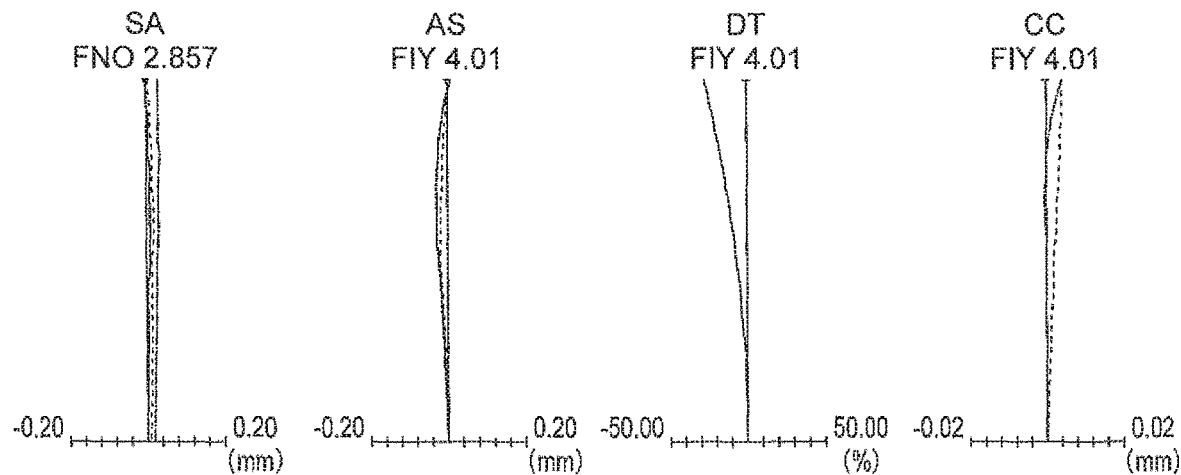
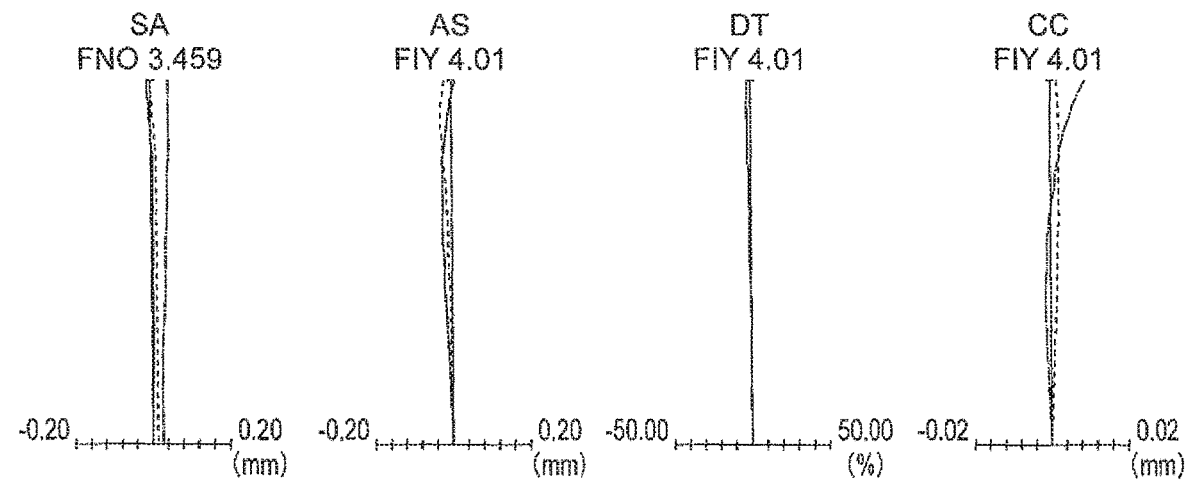
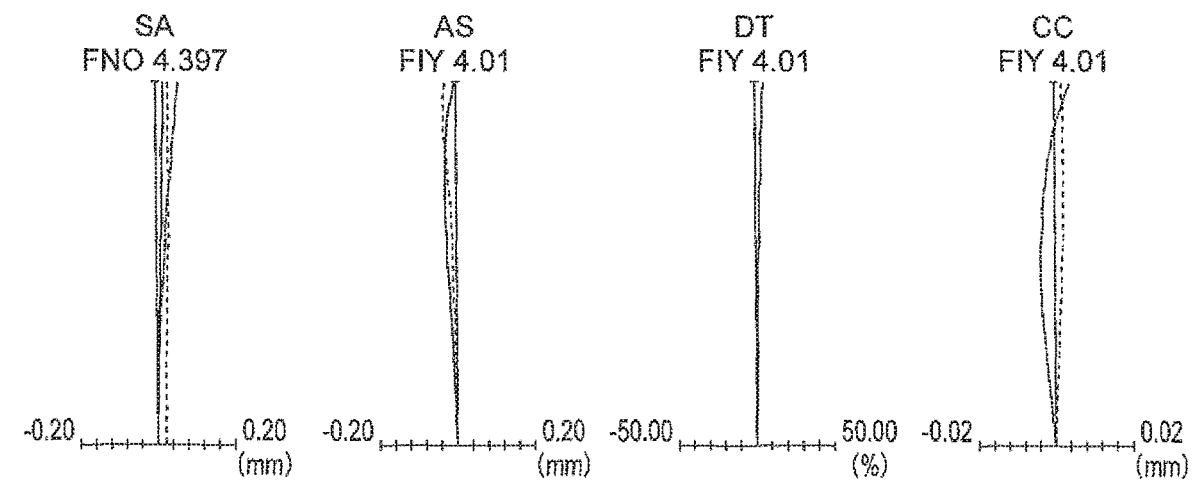

SA
FNO 2.859

AS
FIY 4.01

DT
FIY 4.01

CC
FIY 4.01

SA
FNO 3.480

AS
FIY 4.01

DT
FIY 4.01

CC
FIY 4.01

SA
FNO 4.395

AS
FIY 4.01

DT
FIY 4.01

CC
FIY 4.01

SA
FNO 2.238

-0.20   0.20
(mm)

AS
FIY 4.01

-0.20   0.20
(mm)

DT
FIY 4.01

-50.00   50.00
(%)

CC
FIY 4.01

-0.02   0.02
(mm)

SA
FNO 3.091

-0.20   0.20
(mm)

AS
FIY 4.01

-0.20   0.20
(mm)

DT
FIY 4.01

-50.00   50.00
(%)

CC
FIY 4.01

-0.02   0.02
(mm)

SA
FNO 4.486

-0.20   0.20
(mm)

AS
FIY 4.01

-0.20   0.20
(mm)

DT
FIY 4.01

-50.00   50.00
(%)

CC
FIY 4.01

-0.02   0.02
(mm)

SA
FNO 2.247

-0.20 ... 0.20
(mm)

AS
FIY 4.01

-0.20 ... 0.20
(mm)

DT
FIY 4.01

-50.00 ... 50.00
(%)

CC
FIY 4.01

-0.02 ... 0.02
(mm)

SA
FNO 3.136

-0.20 ... 0.20
(mm)

AS
FIY 4.01

-0.20 ... 0.20
(mm)

DT
FIY 4.01

-50.00 ... 50.00
(%)

CC
FIY 4.01

-0.02 ... 0.02
(mm)

SA
FNO 4.251

-0.20 ... 0.20
(mm)

AS
FIY 4.01

-0.20 ... 0.20
(mm)

DT
FIY 4.01

-50.00 ... 50.00
(%)

CC
FIY 4.01

-0.02 ... 0.02
(mm)

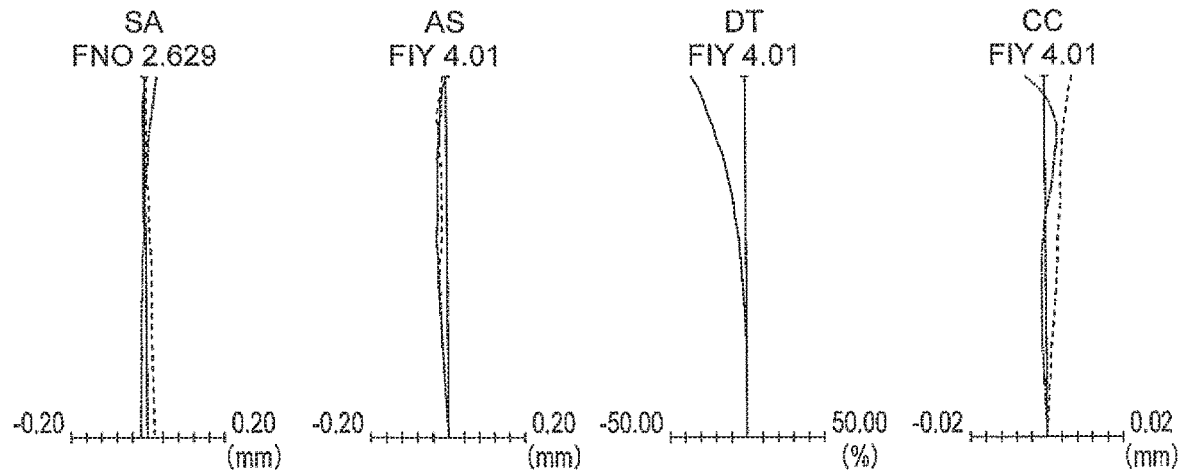
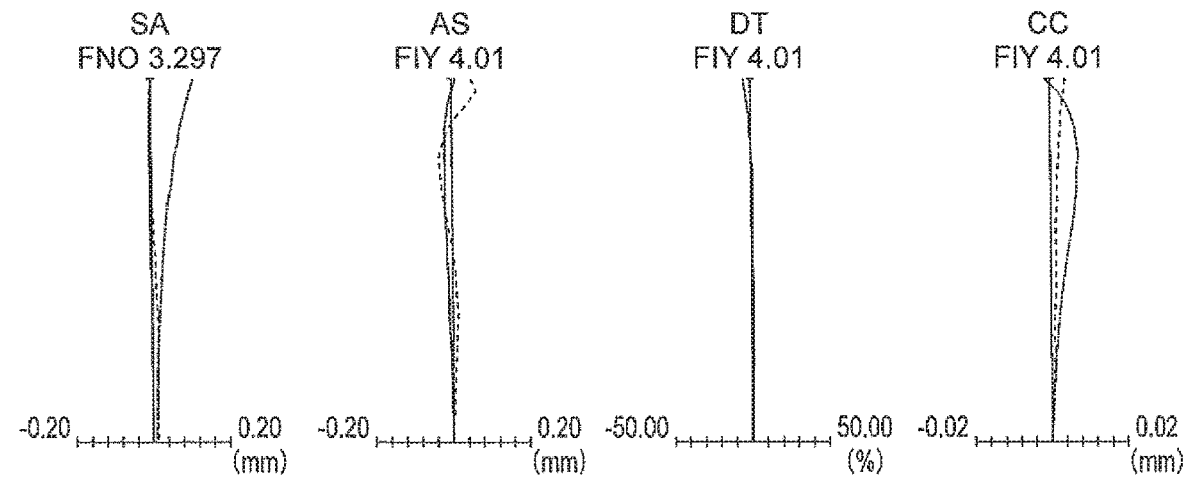
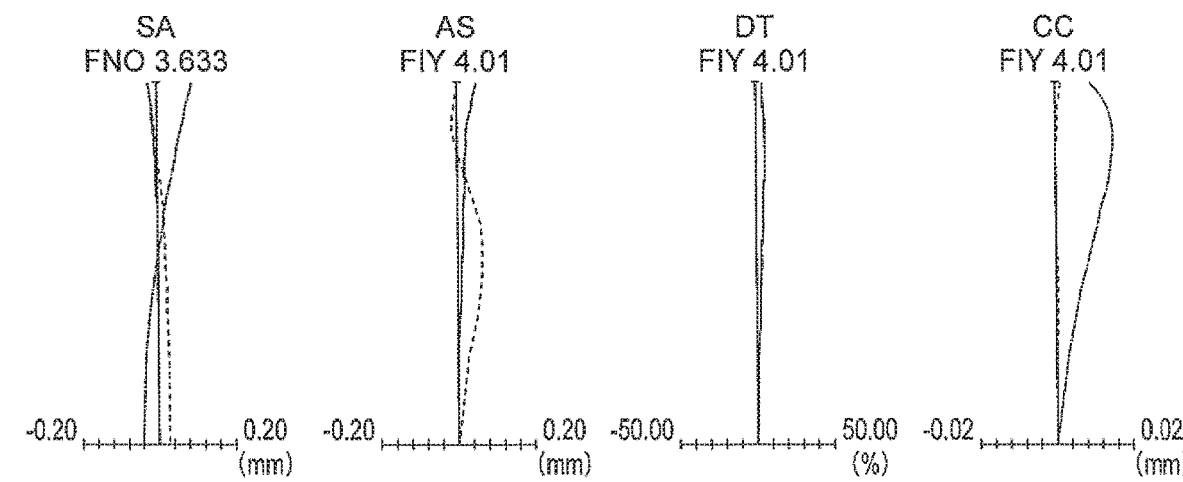

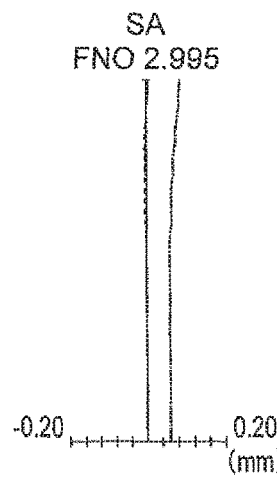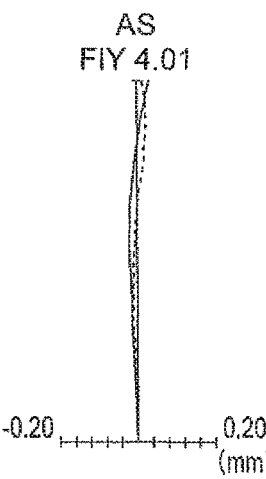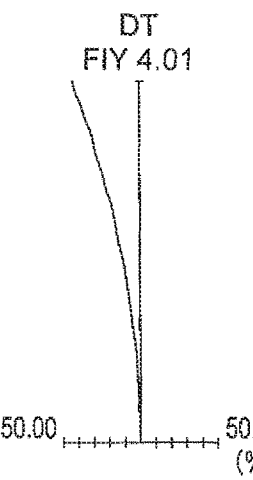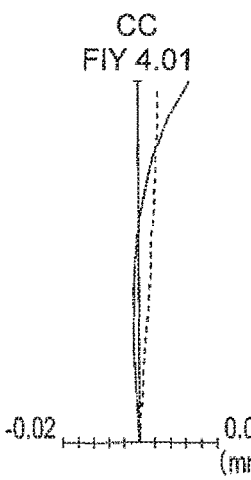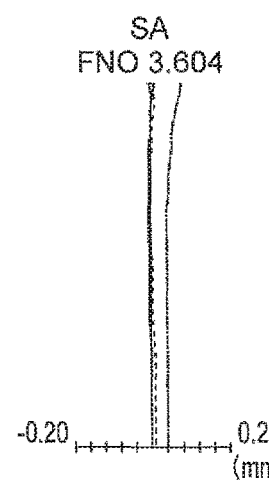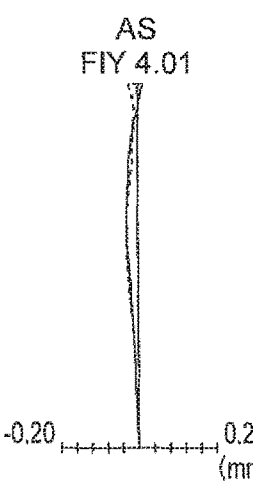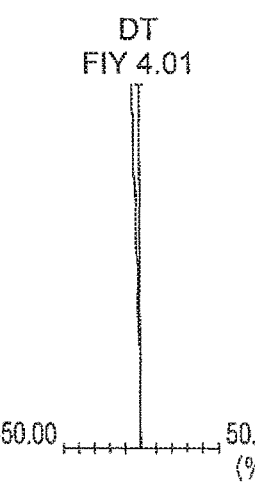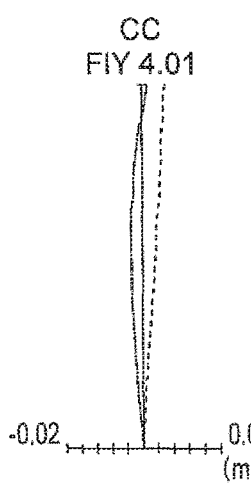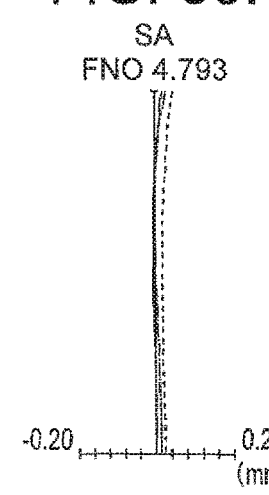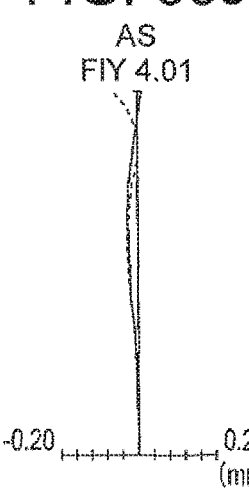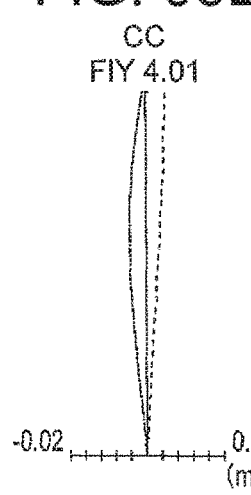

SA
FNO 3.194

AS
FIY 4.01

DT
FIY 4.01

CC
FIY 4.01

SA
FNO 3.945

AS
FIY 4.01

DT
FIY 4.01

CC
FIY 4.01

SA
FNO 5.479

AS
FIY 4.01

DT
FIY 4.01

CC
FIY 4.01

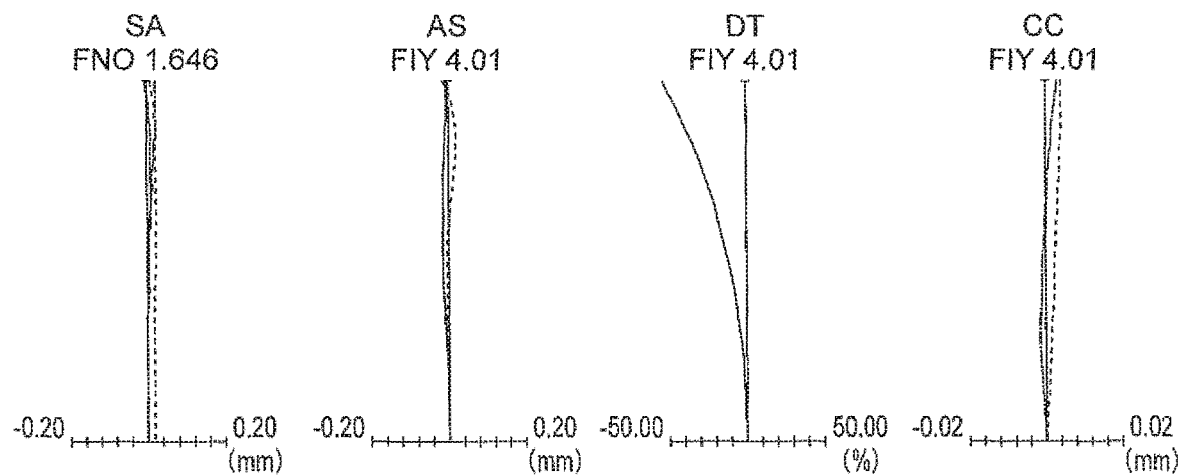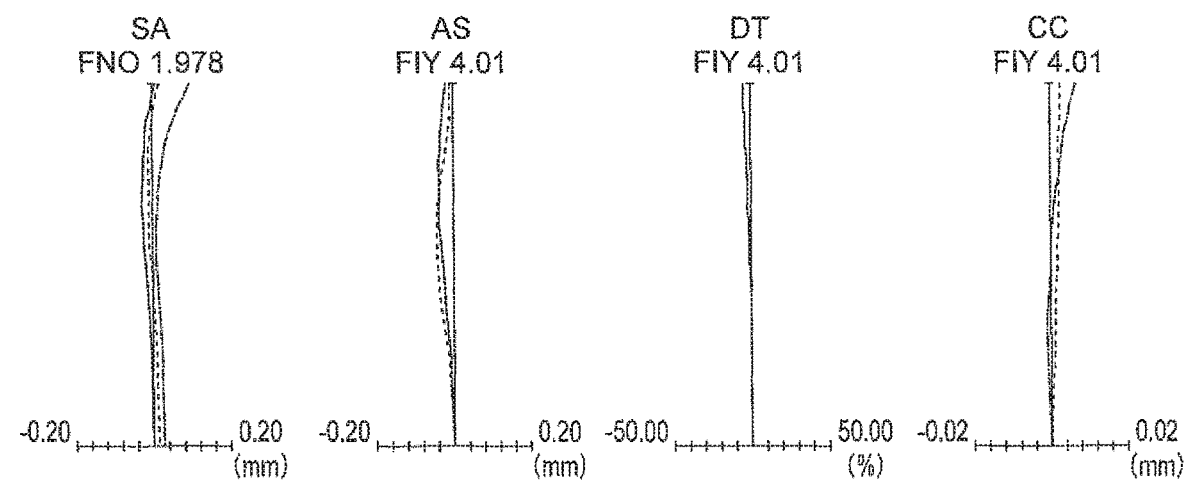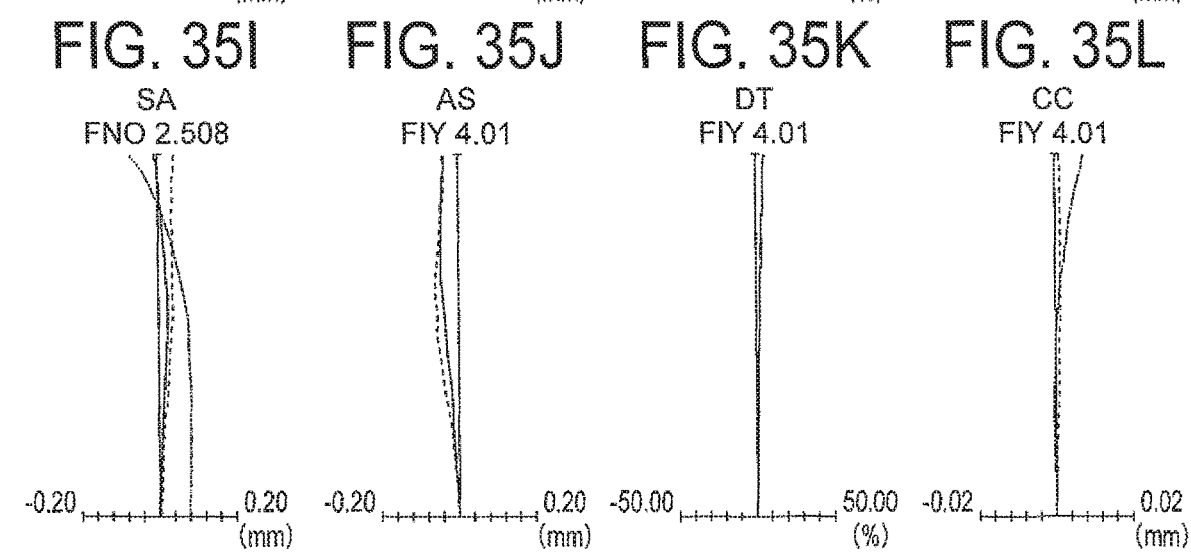

SA
FNO 1.944

-0.20 — 0.20 (mm)

AS
FIY 4.01

-0.20 — 0.20 (mm)

DT
FIY 4.01

-50.00 — 50.00 (%)

CC
FIY 4.01

-0.02 — 0.02 (mm)

SA
FNO 2.431

-0.20 — 0.20 (mm)

AS
FIY 4.01

-0.20 — 0.20 (mm)

DT
FIY 4.01

-50.00 — 50.00 (%)

CC
FIY 4.01

-0.02 — 0.02 (mm)

SA
FNO 3.241

-0.20 — 0.20 (mm)

AS
FIY 4.01

-0.20 — 0.20 (mm)

DT
FIY 4.01

-50.00 — 50.00 (%)

CC
FIY 4.01

-0.02 — 0.02 (mm)

ZOOM LENS AND IMAGE PICKUP APPARATUS USING THE SAME

CROSS-REFERENCE TO RELATED APPLICATION

The present application is a continuation application of International Application PCT/JP2016/061126 filed on Apr. 5, 2016, the entire contents of which are incorporated herein by reference.

BACKGROUND OF THE INVENTION

Field of the Invention

The present invention relates to a zoom lens and an image pickup apparatus using the same.

Description of the Related Art

As a zoom lens which includes in order from an object side to an image side, a first lens unit having a negative refractive power, a second lens unit having a positive refractive power, a third lens unit having a negative refractive power, and a fourth lens unit having a positive refractive power, a zoom lens in Japanese Patent Application Laid-open Publication No. 2013-171165 has been known.

An optical system in which a lens unit having a negative refractive power is disposed nearest to object is called as an optical system of a negative-lead type. An optical system of negative lead-type, in general, is an optical system which is advantageous for widening an angle of view.

SUMMARY OF THE INVENTION

A zoom lens of the present invention comprises in order from an object side:
  a first lens unit having a negative refractive power,
  a second lens unit having a positive refractive power,
  a third lens unit having a negative refractive power, and
  a fourth lens unit having a positive refractive power,
wherein
  at a time of zooming, distances between lens units vary, and
  a distance between the first lens unit and the second lens unit becomes smaller at a telephoto end than at a wide angle end, and a distance between the second lens unit and the third lens unit becomes longer at the telephoto end than at the wide angle end, and
  the following conditional expressions (1), (2), and (3) are satisfied:

$$0.4 < |f1|/|f2| < 1.2 \quad (1)$$

$$0.3 < L2/L1 < 0.95 \quad (2)$$

$$0.6 < Lt/Lw < 1 \quad (3)$$

where,
  f1 denotes a focal length of the first lens unit,
  f2 denotes a focal length of the second lens unit,
  L1 denotes a thickness on an optical axis of the first lens unit,
  L2 denotes a thickness on an optical axis of the second lens unit,
  Lw denotes an overall length of the zoom lens at the wide angle end, and
  Lt denotes an overall length of the zoom lens at the telephoto end, and here the overall length is a distance from a lens surface nearest to object up to a paraxial image plane, and is a distance in a case in which no air conversion is carried out.

Moreover, an image pickup apparatus of the present invention comprises:
  the abovementioned zoom lens, and
  an image pickup element which converts an image formed by the zoom lens to an electric signal.

BRIEF DESCRIPTION OF THE DRAWINGS

FIG. 1A, FIG. 1B, and FIG. 1C are lens cross-sectional views of a zoom lens according to an example 1, at a time of focusing to an object at infinity;

FIG. 3A, FIG. 3B, and FIG. 3C are lens cross-sectional views of a zoom lens according to an example 3, at the time of focusing to an object at infinity;

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L are aberration diagrams of the zoom lens according to the example 1, at the time of focusing to an object at infinity;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams of the zoom lens according to the example 2, at the time of focusing to an object at infinity;

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L are aberration diagrams of the zoom lens according to the example 3, at the time of focusing to an object at infinity;

FIG. 23A, FIG. 23B, FIG. 23C, FIG. 23D, FIG. 23E, FIG. 23F, FIG. 23G, FIG. 23H, FIG. 23I, FIG. 23J, FIG. 23K, and FIG. 23L are aberration diagrams of the zoom lens according to the example 5, at the time of focusing to an object at infinity;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams of the zoom lens according to the example 8, at the time of focusing to an object at infinity;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams of the zoom lens according to the example 10, at the time of focusing to an object at infinity;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L are aberration diagrams of the zoom lens according to the example 14, at the time of focusing to an object at infinity;

FIG. 33A, FIG. 33B, FIG. 33C, FIG. 33D, FIG. 33E, FIG. 33F, FIG. 33G, FIG. 33H, FIG. 33I, FIG. 33J, FIG. 33K, and FIG. 33L are aberration diagrams of the zoom lens according to the example 15, at the time of focusing to an object at infinity;

FIG. 35A, FIG. 35B, FIG. 35C, FIG. 35D, FIG. 35E, FIG. 35F, FIG. 35G, FIG. 35H, FIG. 35I, FIG. 35J, FIG. 35K, and FIG. 35L are aberration diagrams of the zoom lens according to the example 17, at the time of focusing to an object at infinity;

DETAILED DESCRIPTION OF THE INVENTION

Figure 2A:
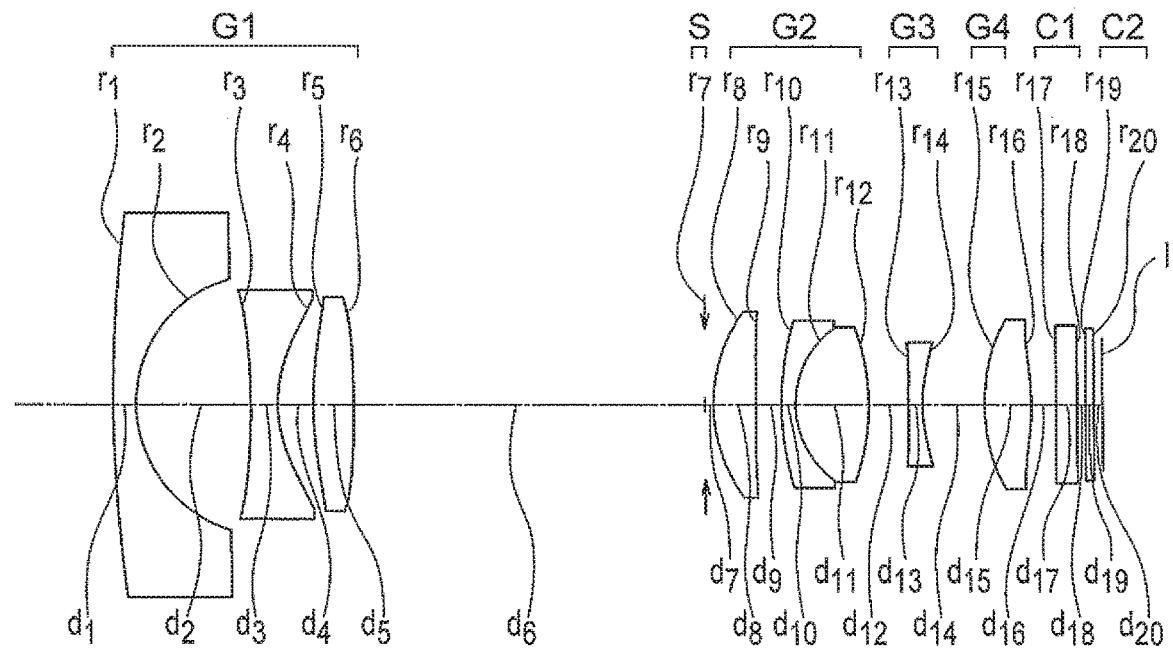
FIG. 2A, FIG. 2B, and FIG. 2C are lens cross-sectional views of a zoom lens according to an example 2, at the time of focusing to an object at infinity.
Figure 2B:
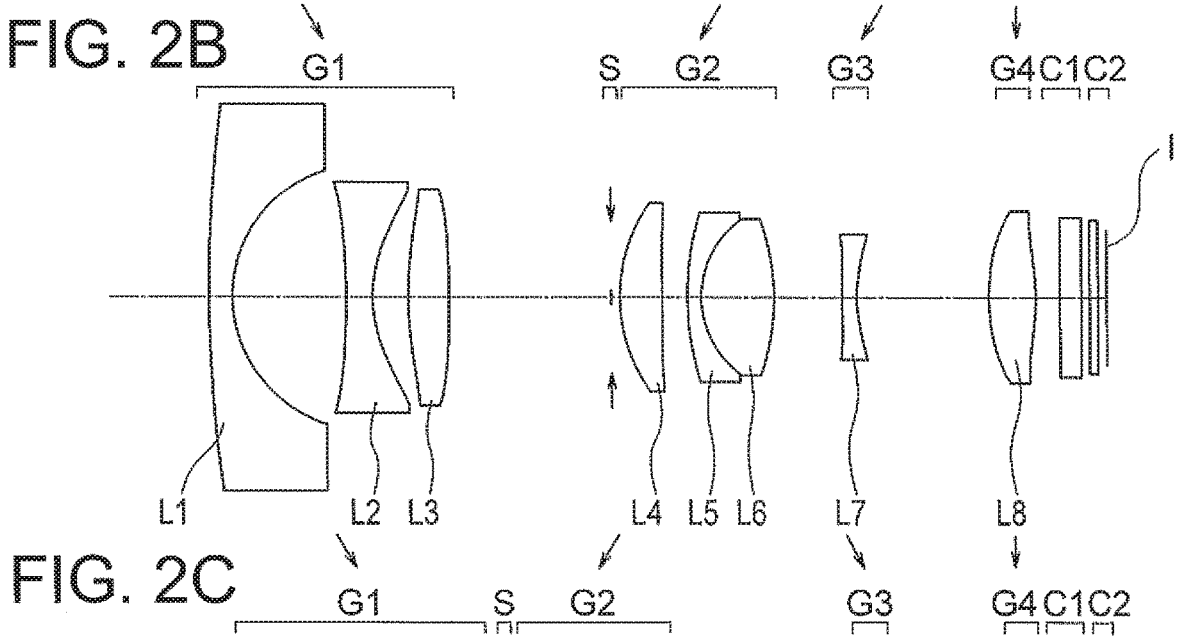
Figure 2C:
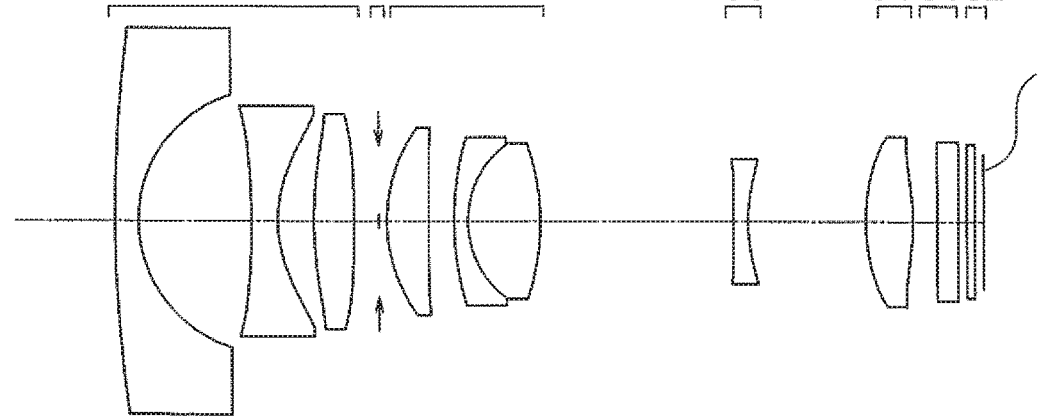
Figure 4A:
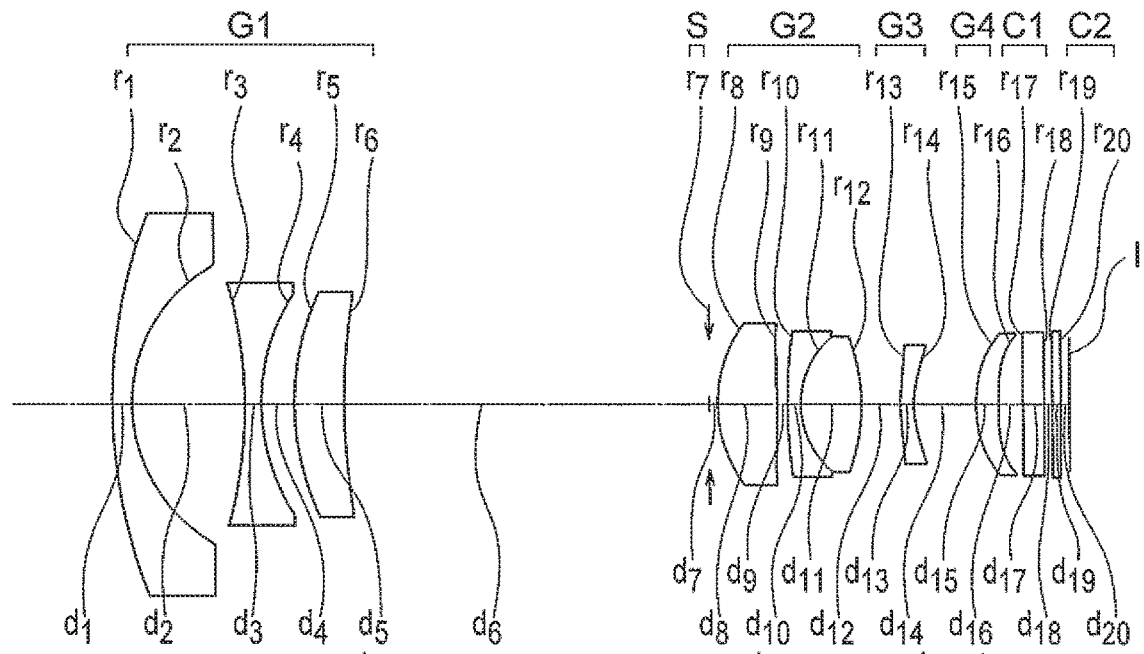
FIG. 4A, FIG. 4B, and FIG. 4C are lens cross-sectional views of a zoom lens according to an example 4, at the time of focusing to an object at infinity.
Figure 4B:
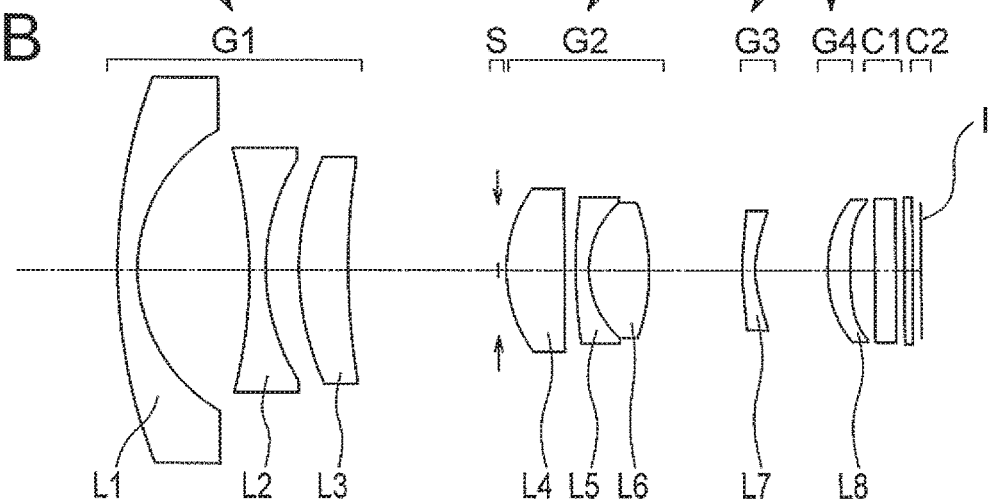
Figure 4C:
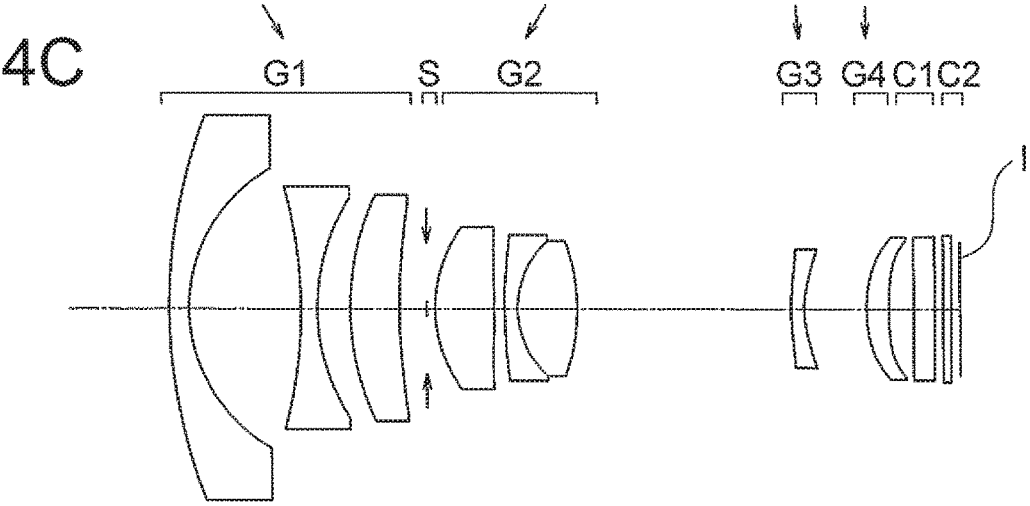
Figure 5A:
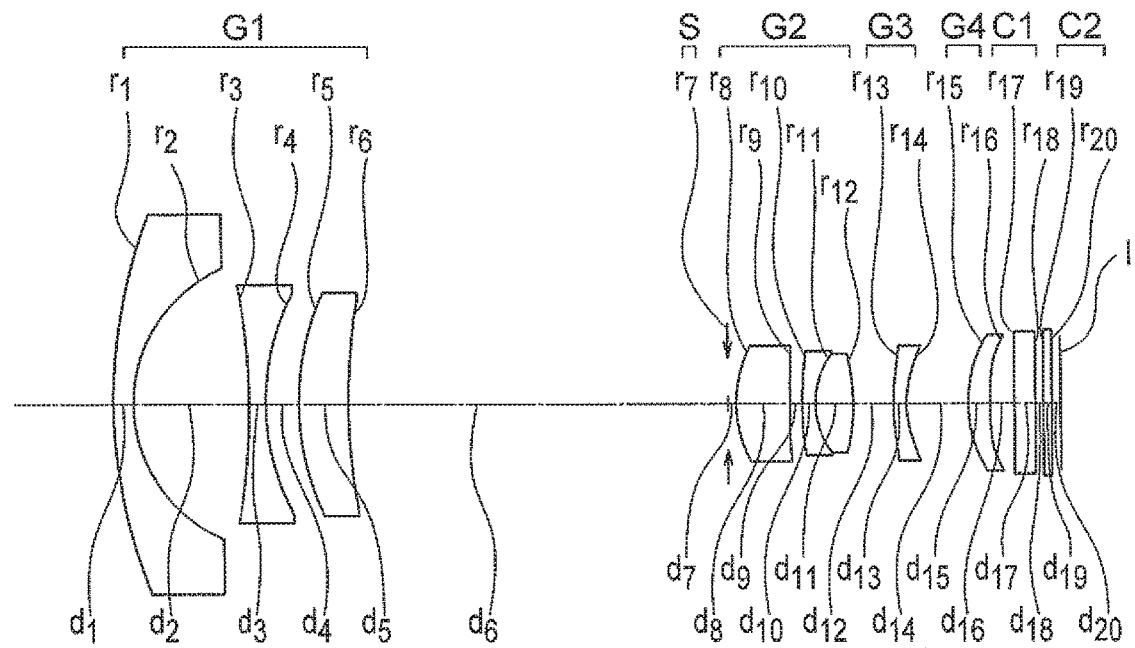
FIG. 5A, FIG. 5B, and FIG. 5C are lens cross-sectional views of a zoom lens according to an example 5, at the time of focusing to an object at infinity.
Figure 5B:
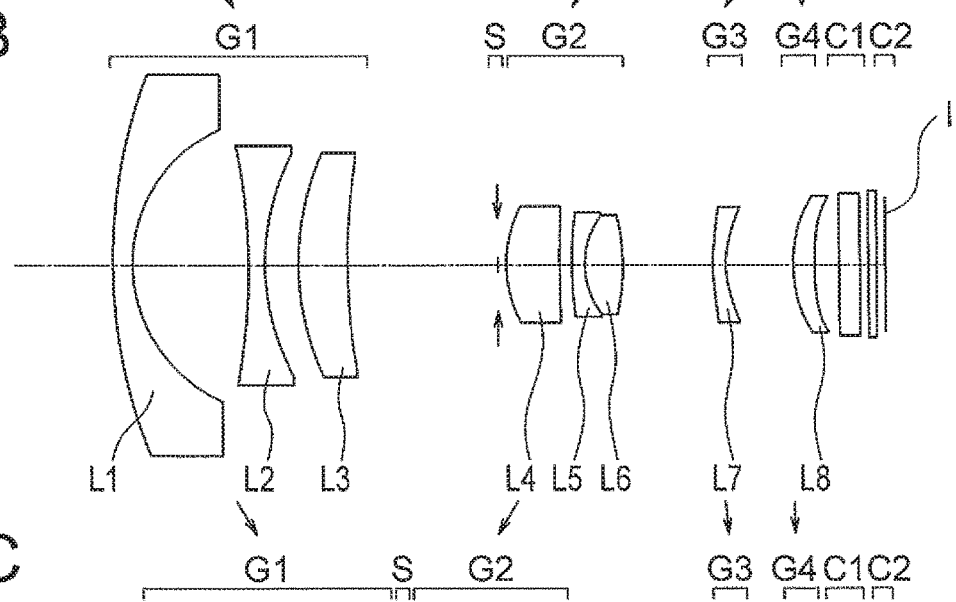
Figure 5C:
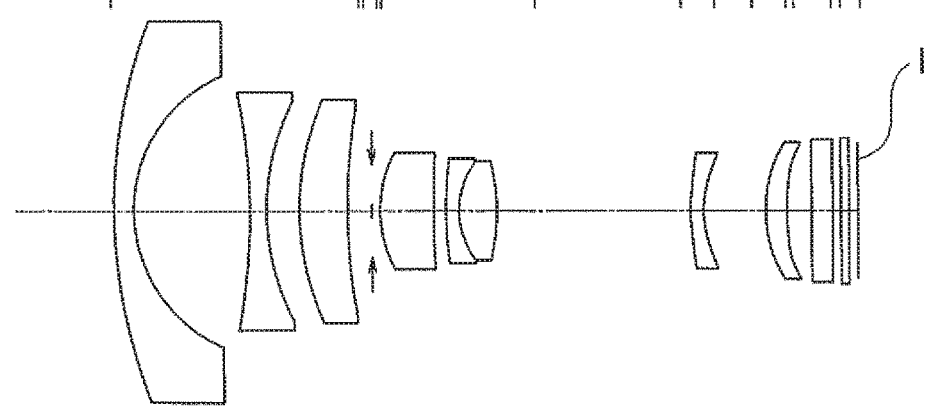
Figure 6A:
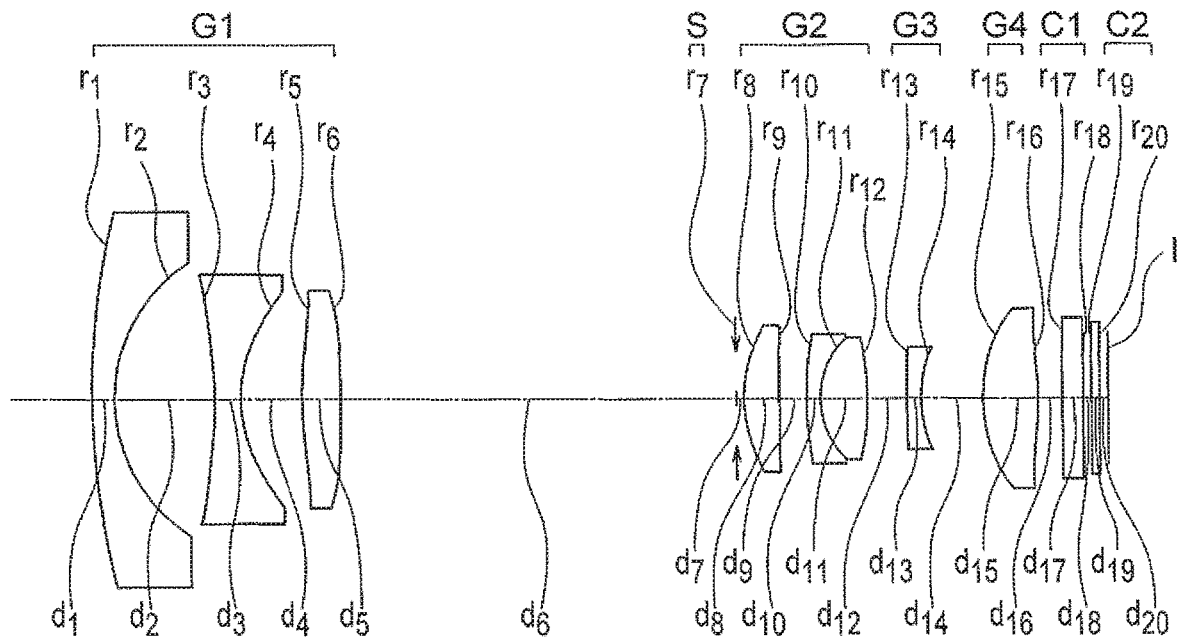
FIG. 6A, FIG. 6B, and FIG. 6C are lens cross-sectional views of a zoom lens according to an example 6, at the time of focusing to an object at infinity.
Figure 6B:
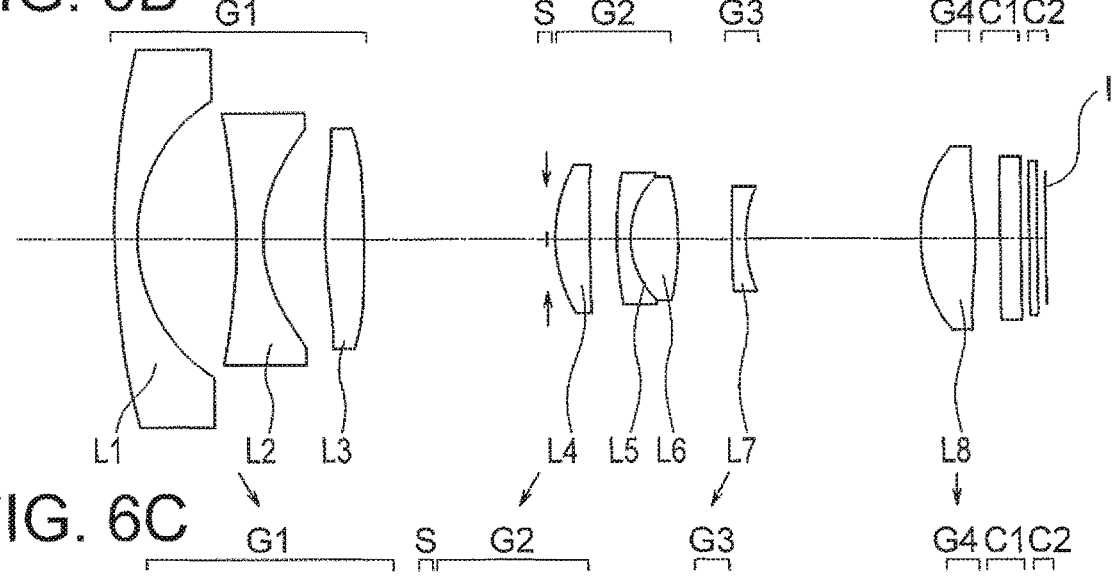
Figure 6C:
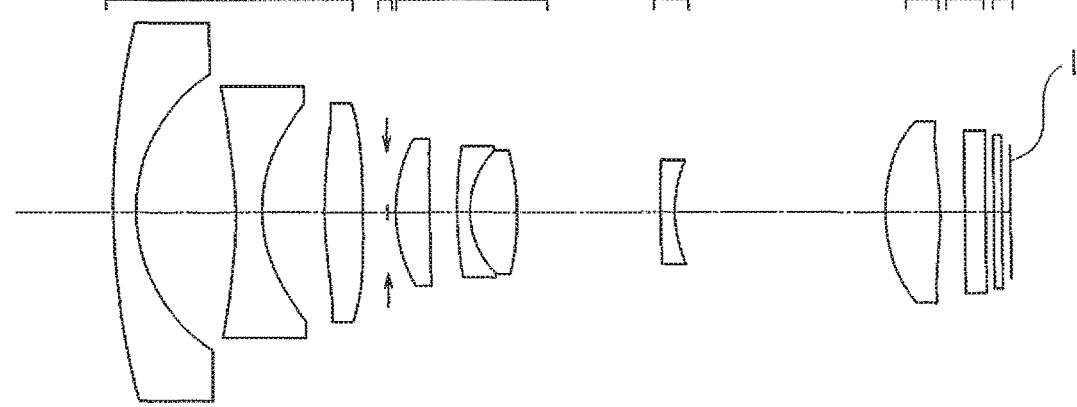
Figure 7A:
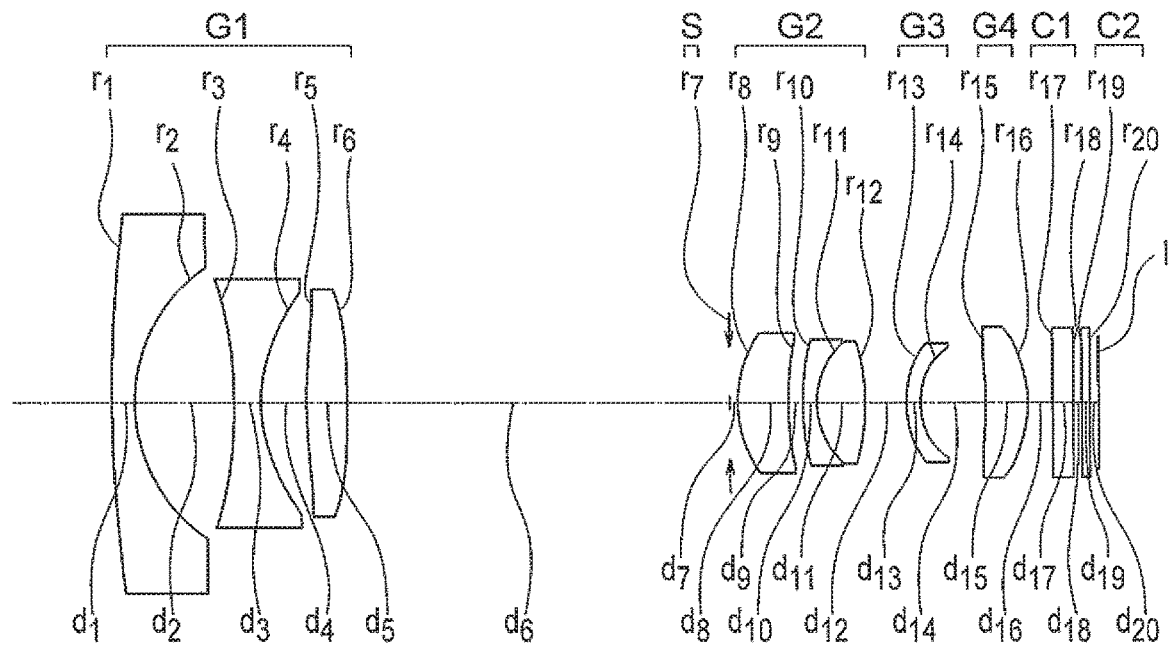
FIG. 7A, FIG. 7B, and FIG. 7C are lens cross-sectional views of a zoom lens according to an example 7, at the time of focusing to an object at infinity.
Figure 7B:
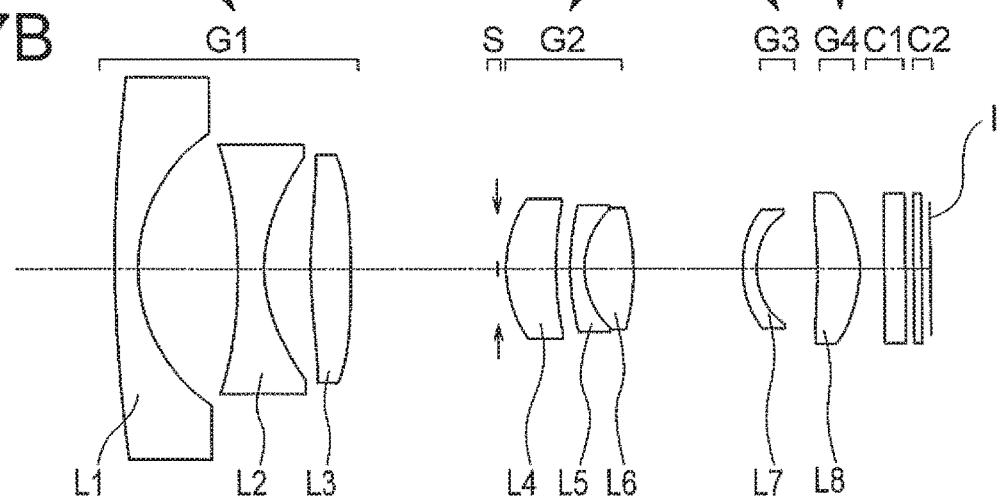
Figure 7C:
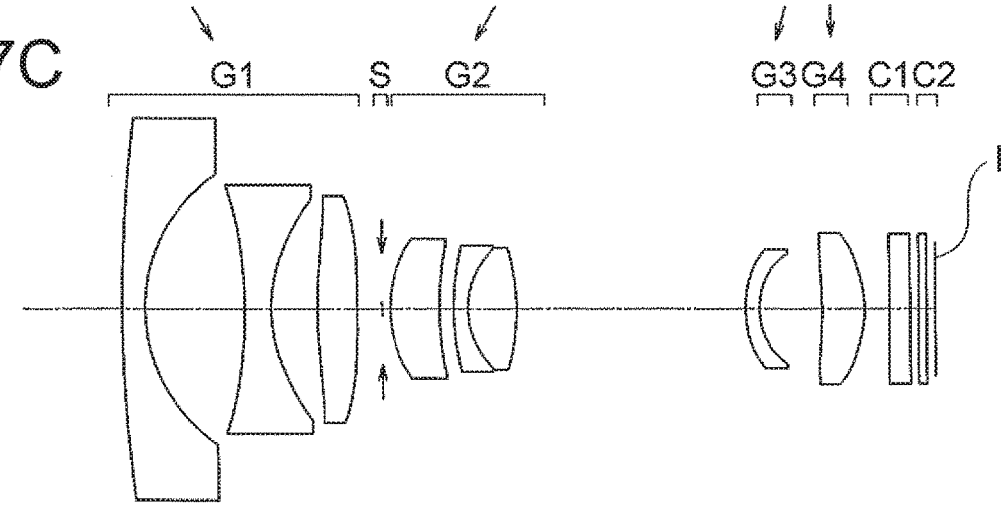
Figure 8A:
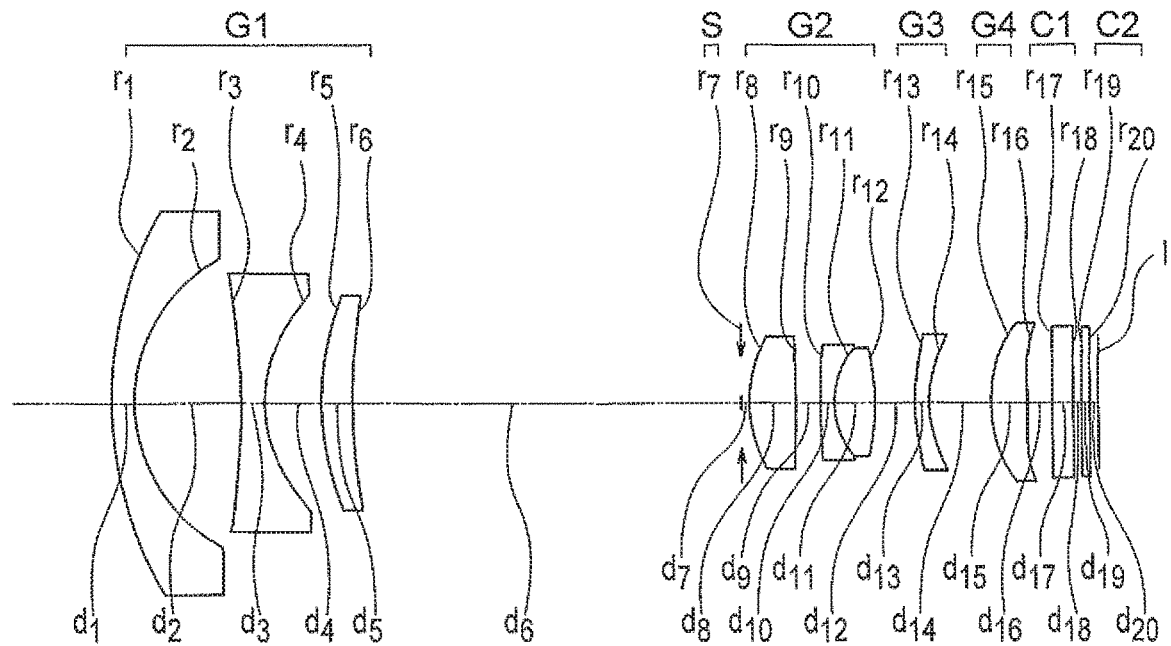
FIG. 8A, FIG. 8B, and FIG. 8C are lens cross-sectional views of a zoom lens according to an example 8, at the time of focusing to an object at infinity.
Figure 8B:
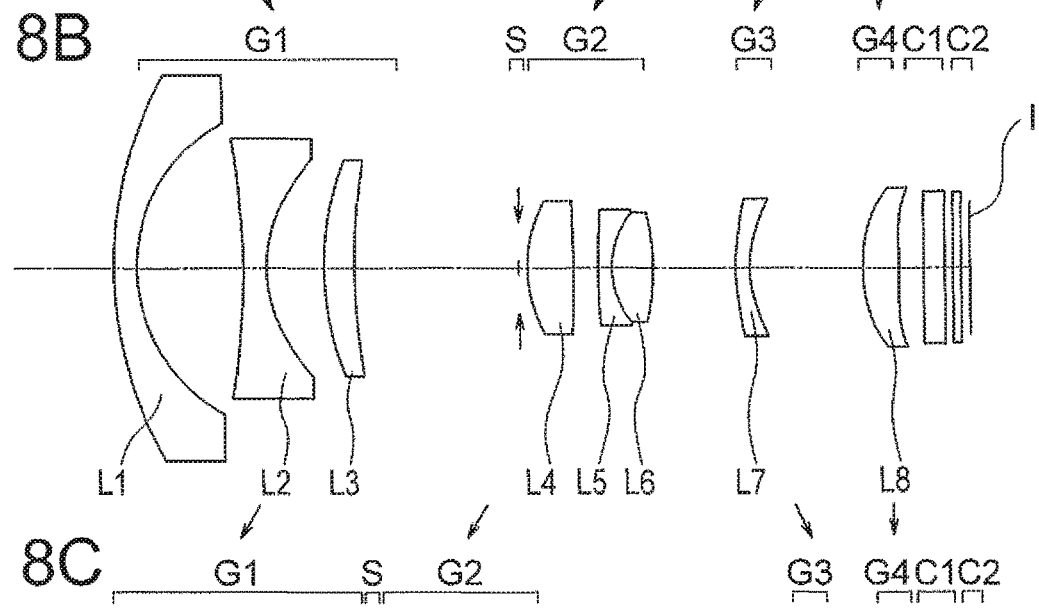
Figure 8C:
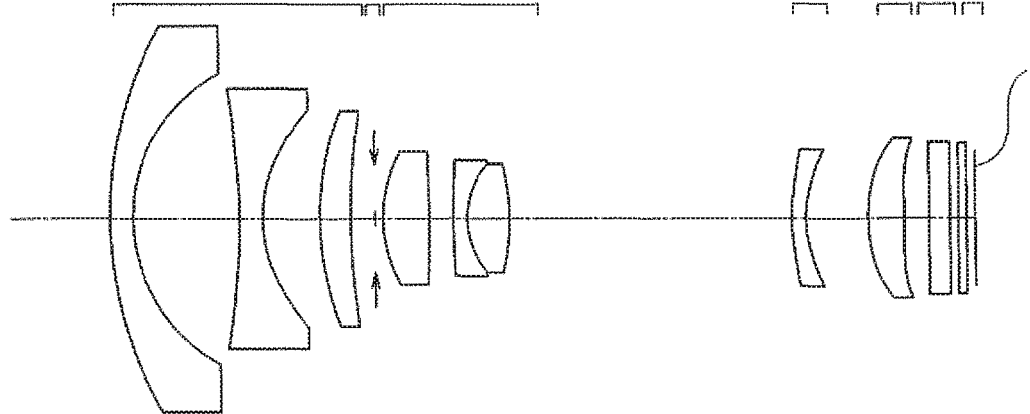
Figure 9A:
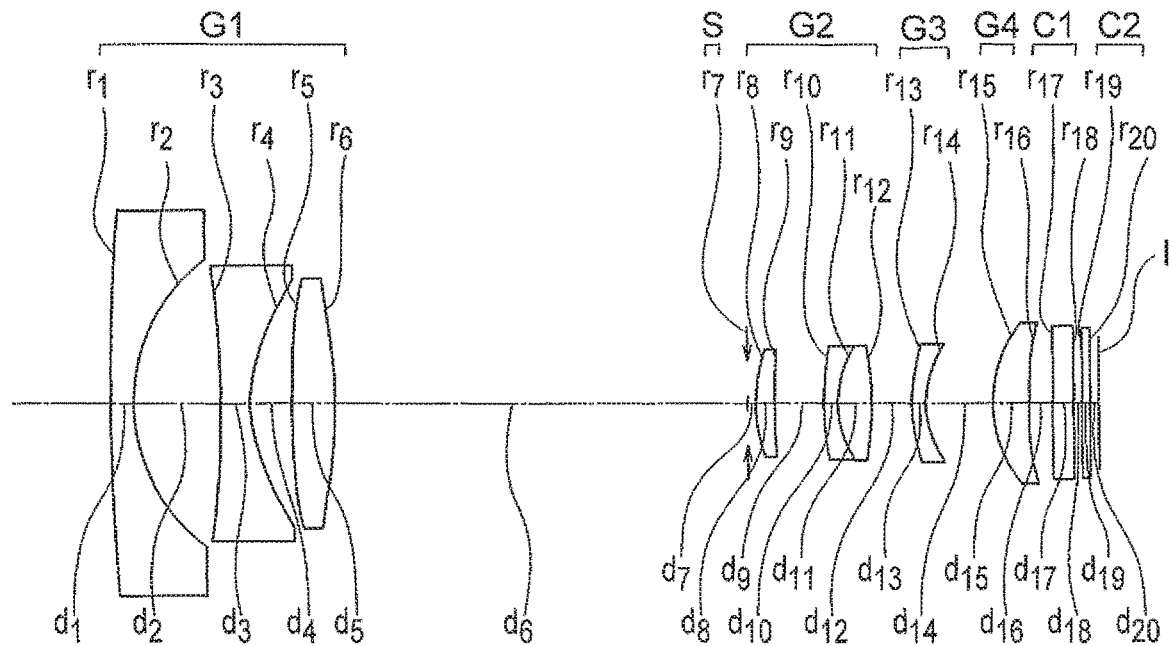
FIG. 9A, FIG. 9B, and FIG. 9C are lens cross-sectional views of a zoom lens according to an example 9, at the time of focusing to an object at infinity.
Figure 9B:
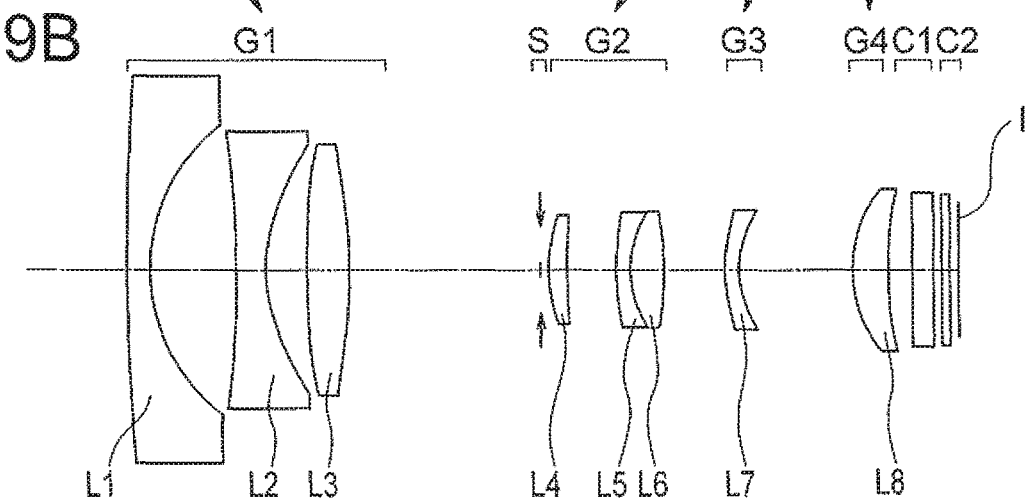
Figure 9C:
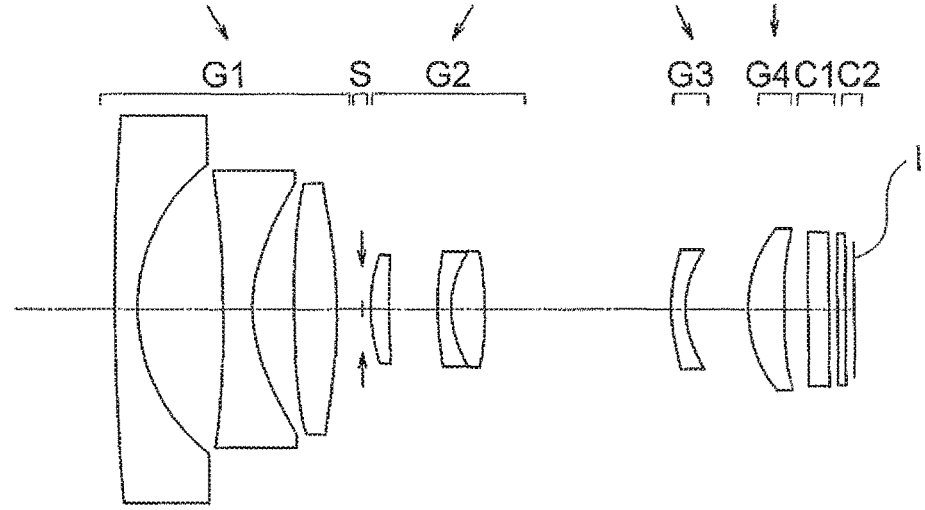
Figure 10A:
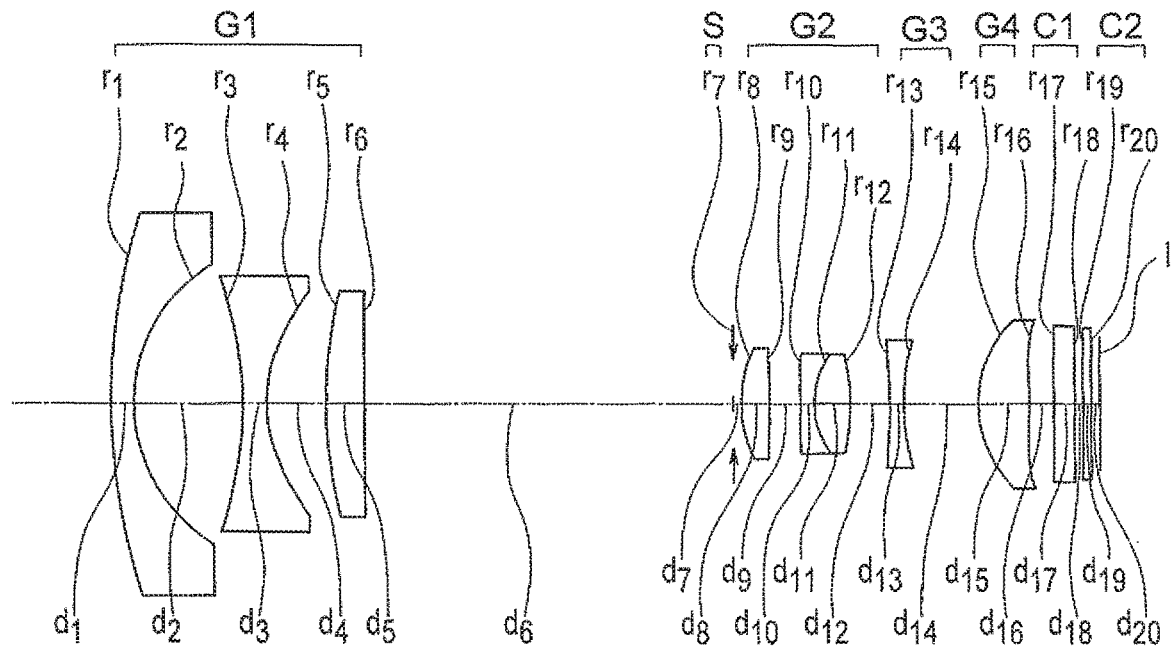
FIG. 10A, FIG. 10B, and FIG. 10C are lens cross-sectional views of a zoom lens according to an example 10, at the time of focusing to an object at infinity.
Figure 10B:
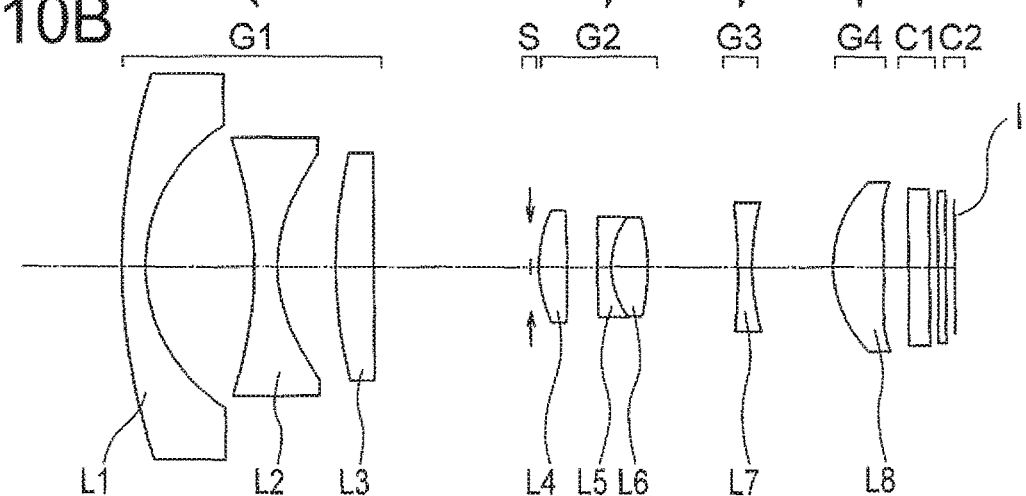
Figure 10C:
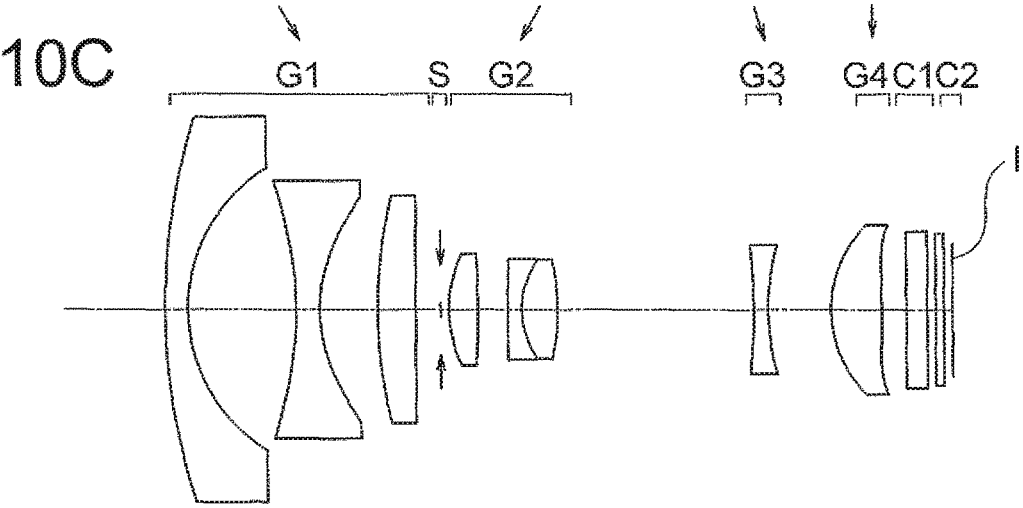
Figure 11A:
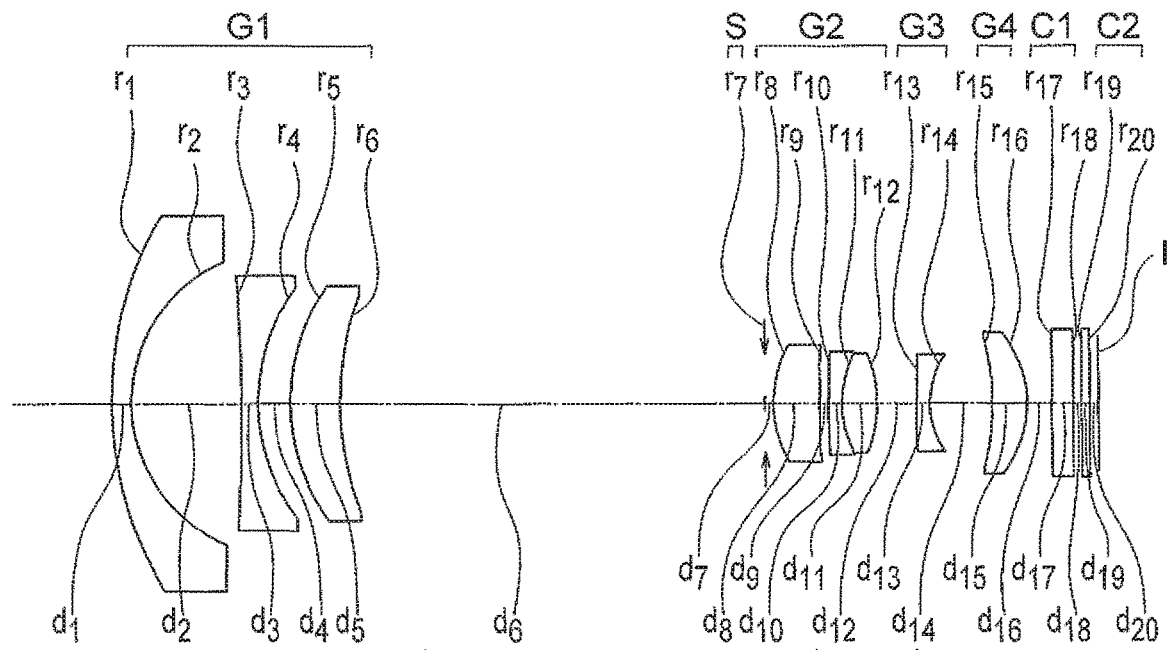
FIG. 11A, FIG. 11B, and FIG. 11C are lens cross-sectional views of a zoom lens according to an example 11, at the time of focusing to an object at infinity.
Figure 11B:
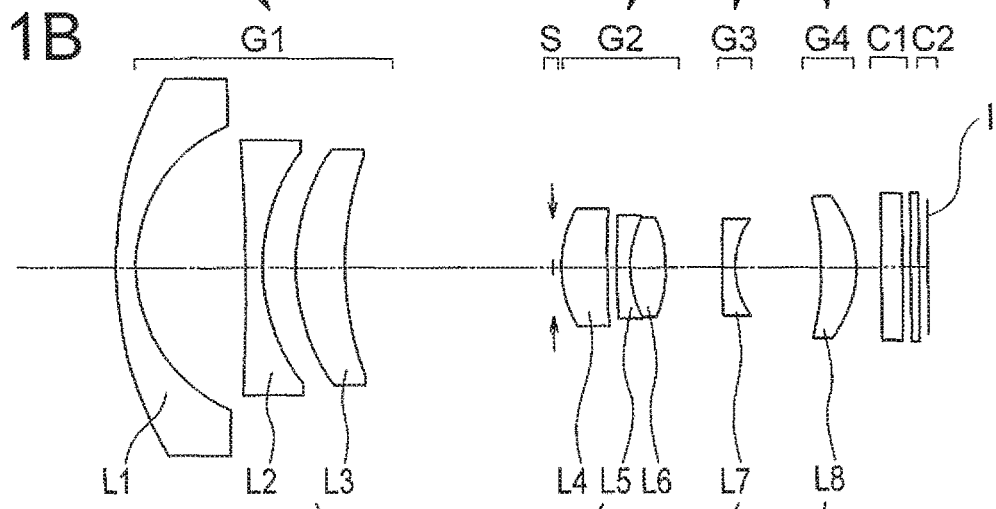
Figure 11C:
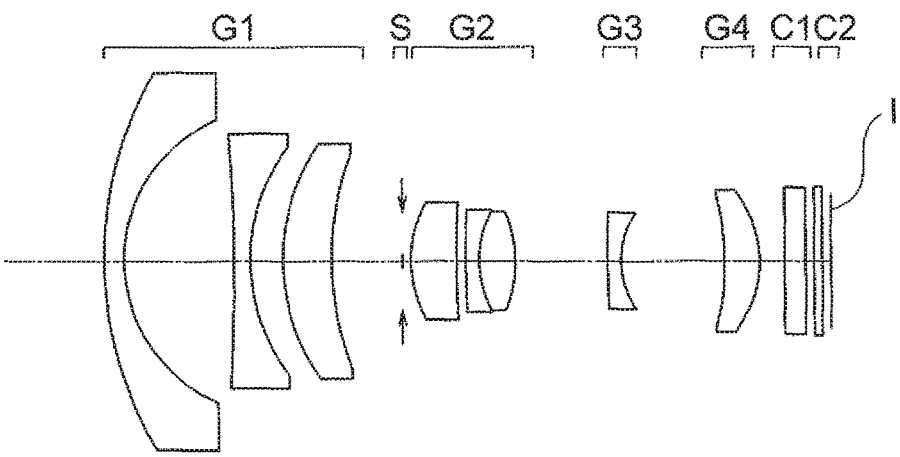
Figure 12A:
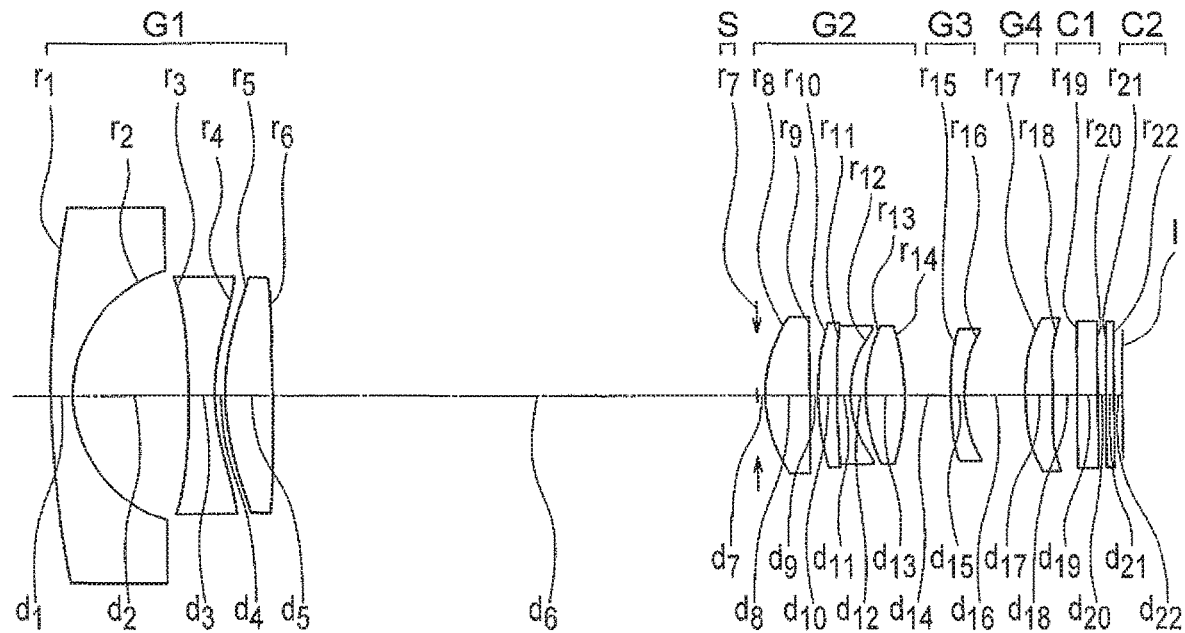
FIG. 12A, FIG. 12B, and FIG. 12C are lens cross-sectional views of a zoom lens according to an example 12, at the time of focusing to an object at infinity.
Figure 12B:
Figure 12C:
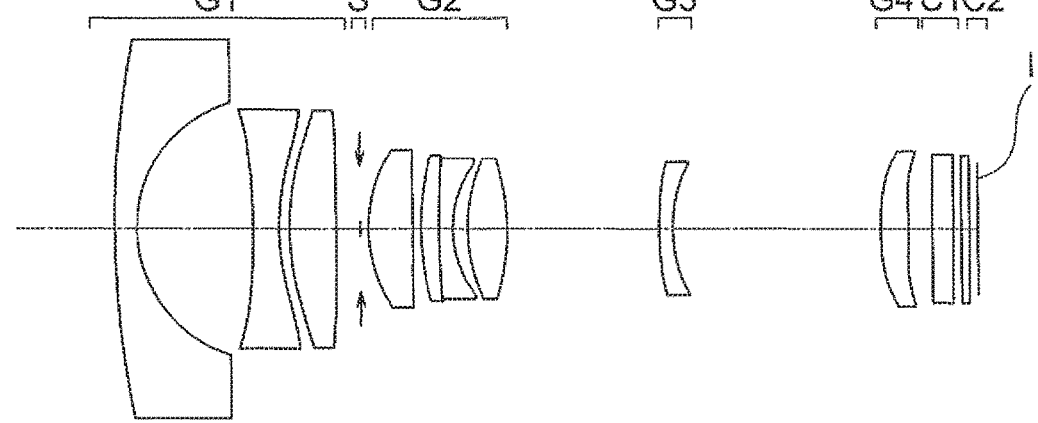
Figure 13A:
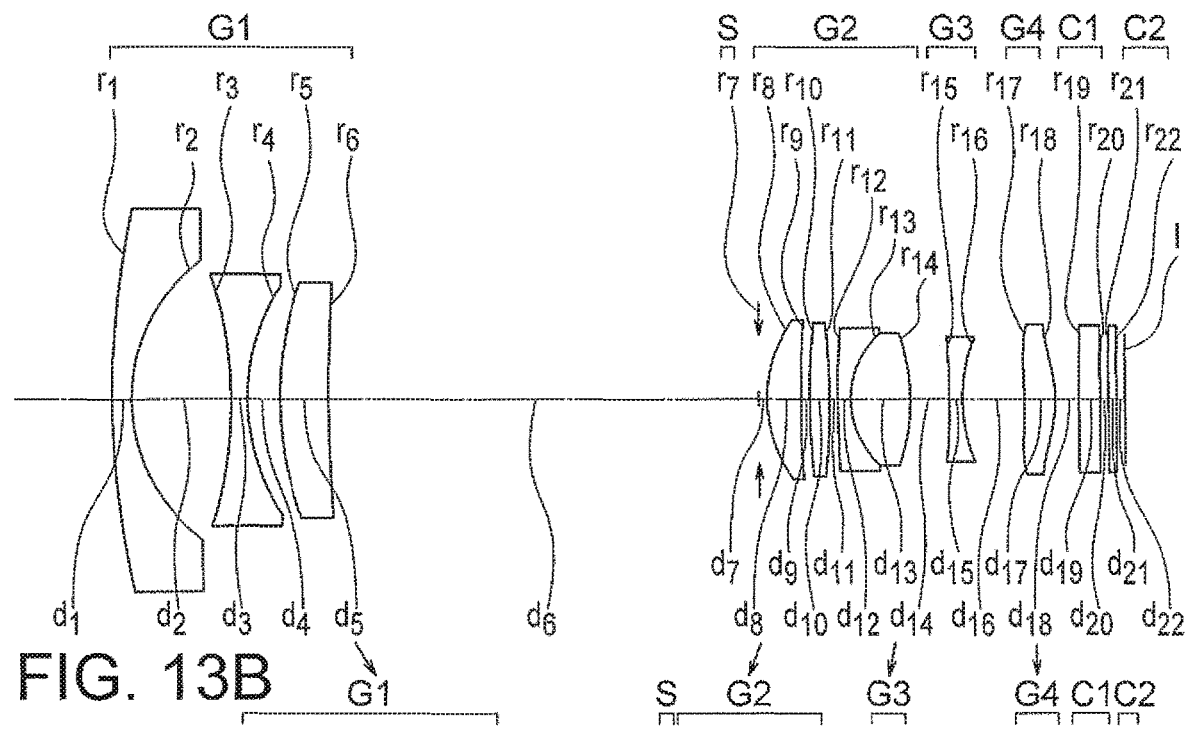
FIG. 13A, FIG. 13B, and FIG. 13C are lens cross-sectional views of a zoom lens according to an example 13, at the time of focusing to an object at infinity.
Figure 13B:
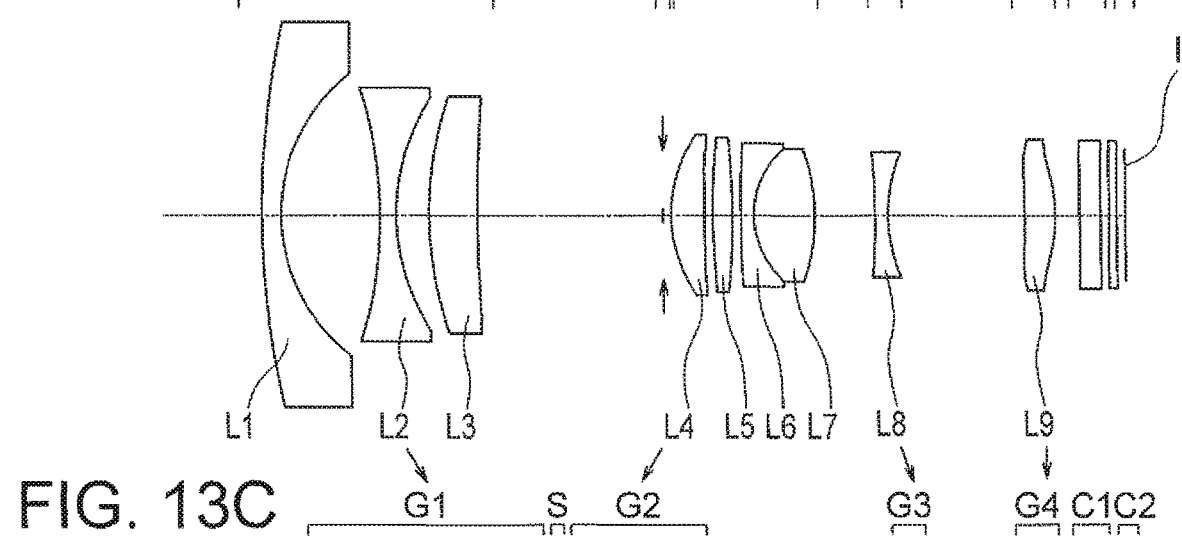
Figure 13C:
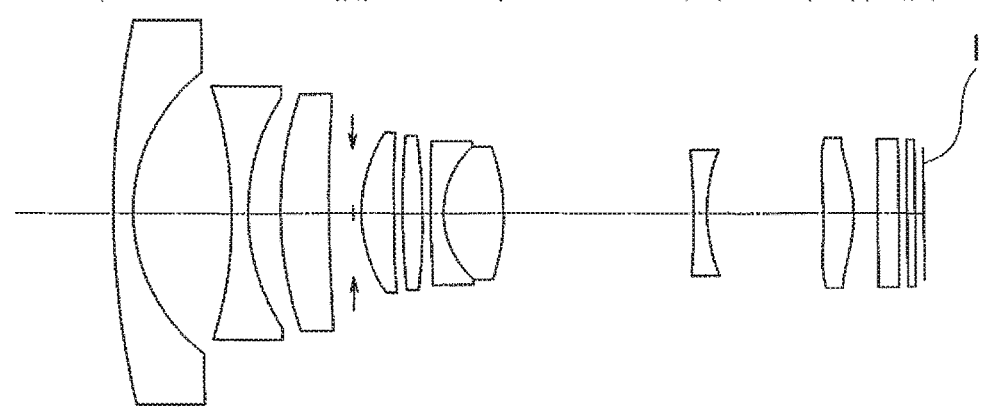
Figure 14A:
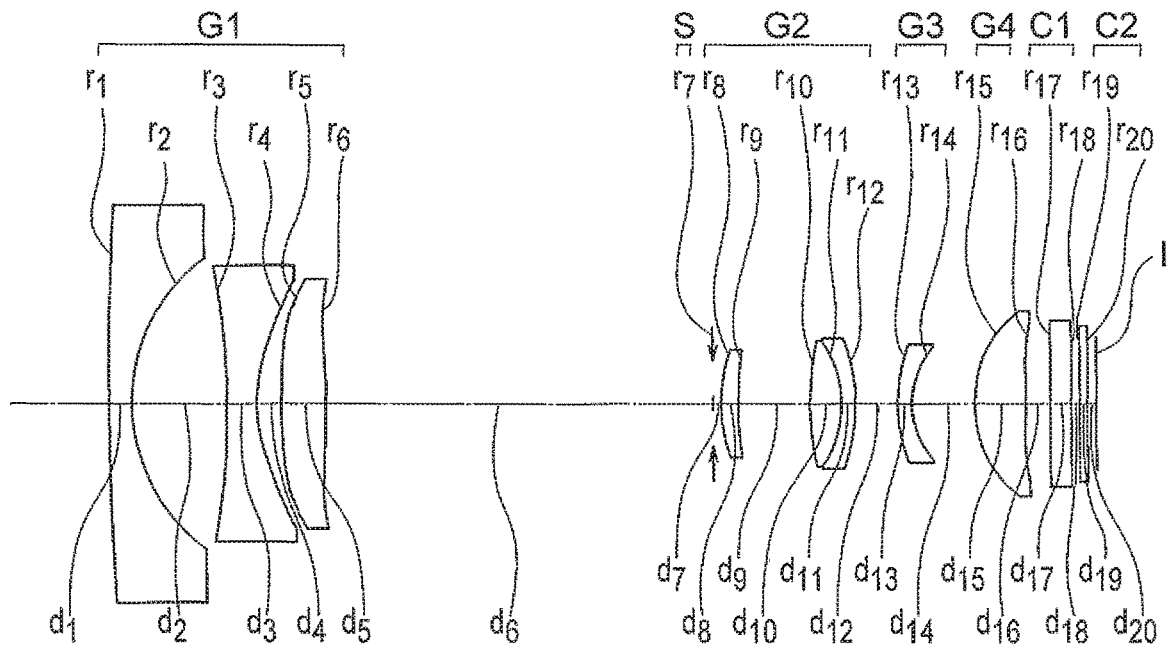
FIG. 14A, FIG. 14B, and FIG. 14C are lens cross-sectional views of a zoom lens according to an example 14, at the time of focusing to an object at infinity.
Figure 14B:
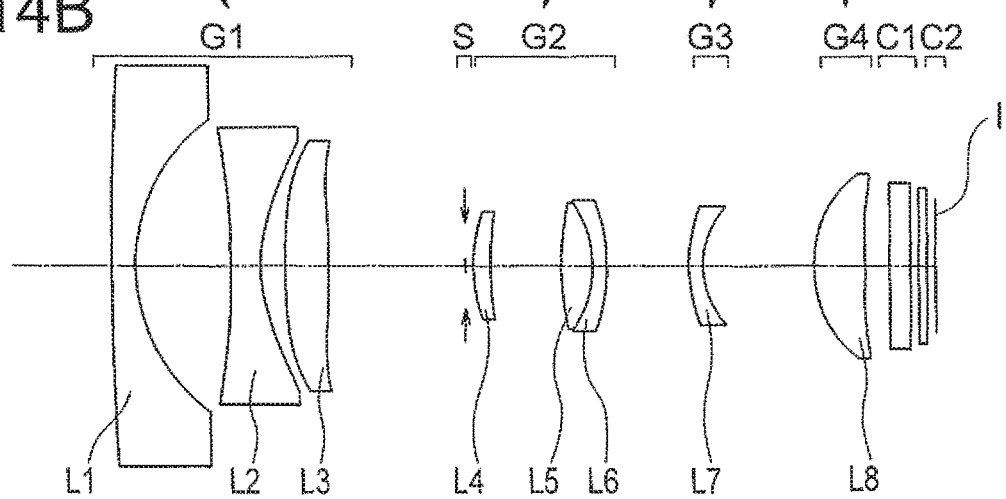
Figure 14C:
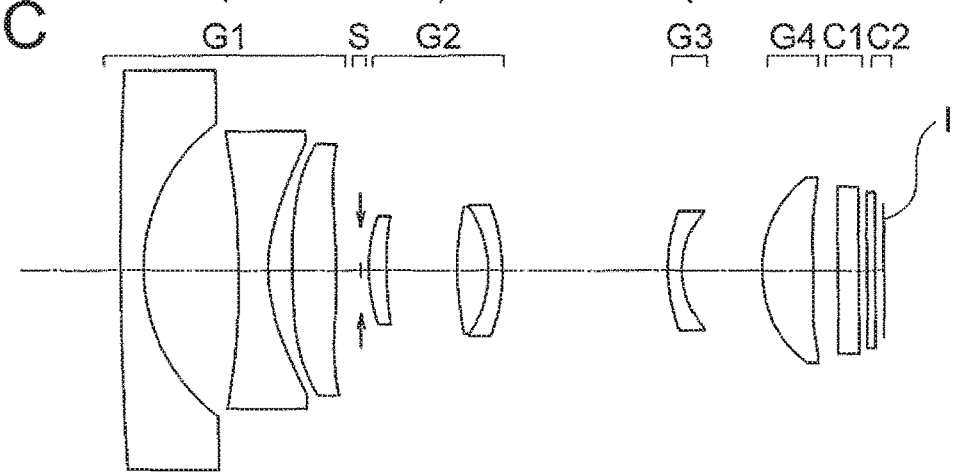
Figure 15A:
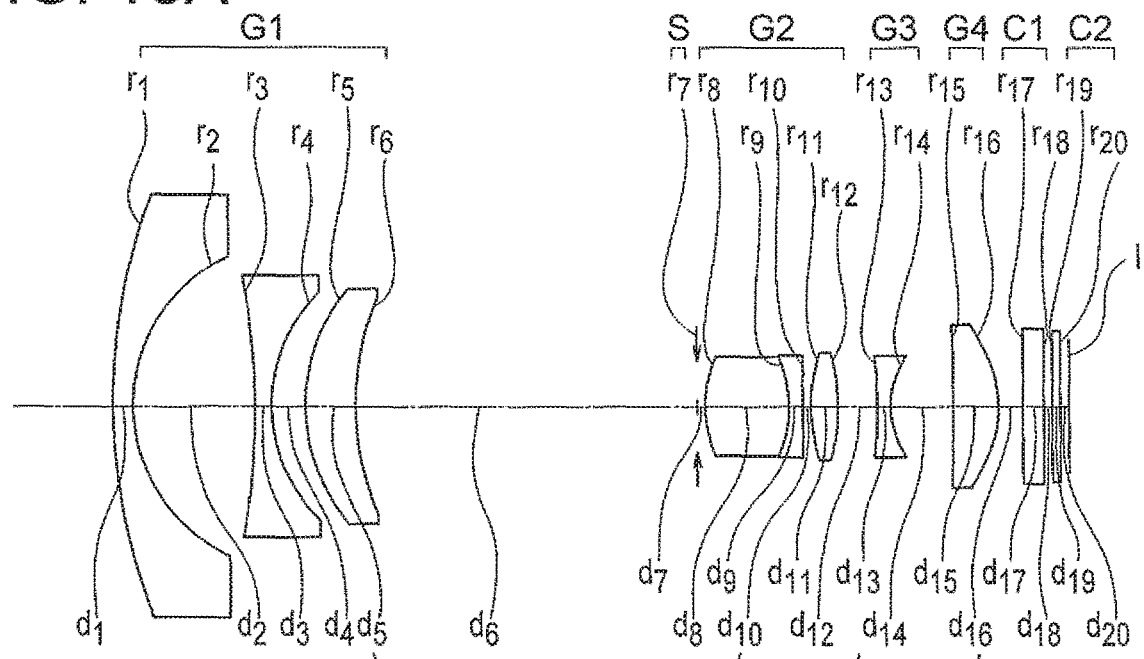
FIG. 15A, FIG. 15B, and FIG. 15C are lens cross-sectional views of a zoom lens according to an example 15, at the time of focusing to an object at infinity.
Figure 15B:
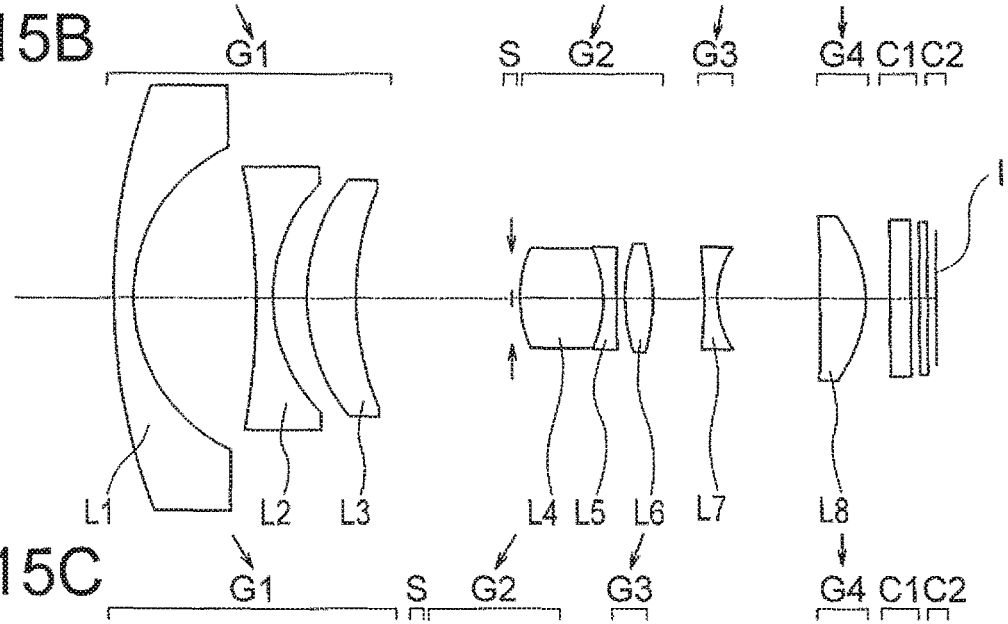
Figure 15C:
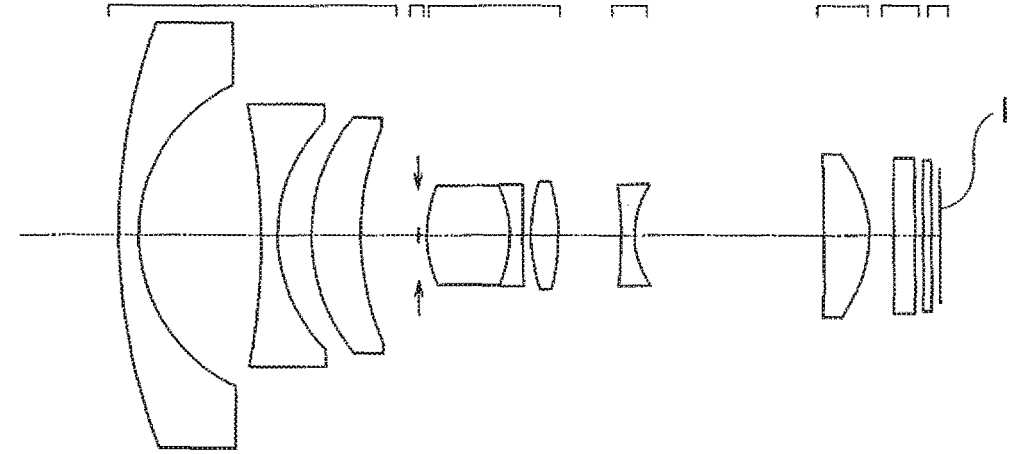
Figure 16A:
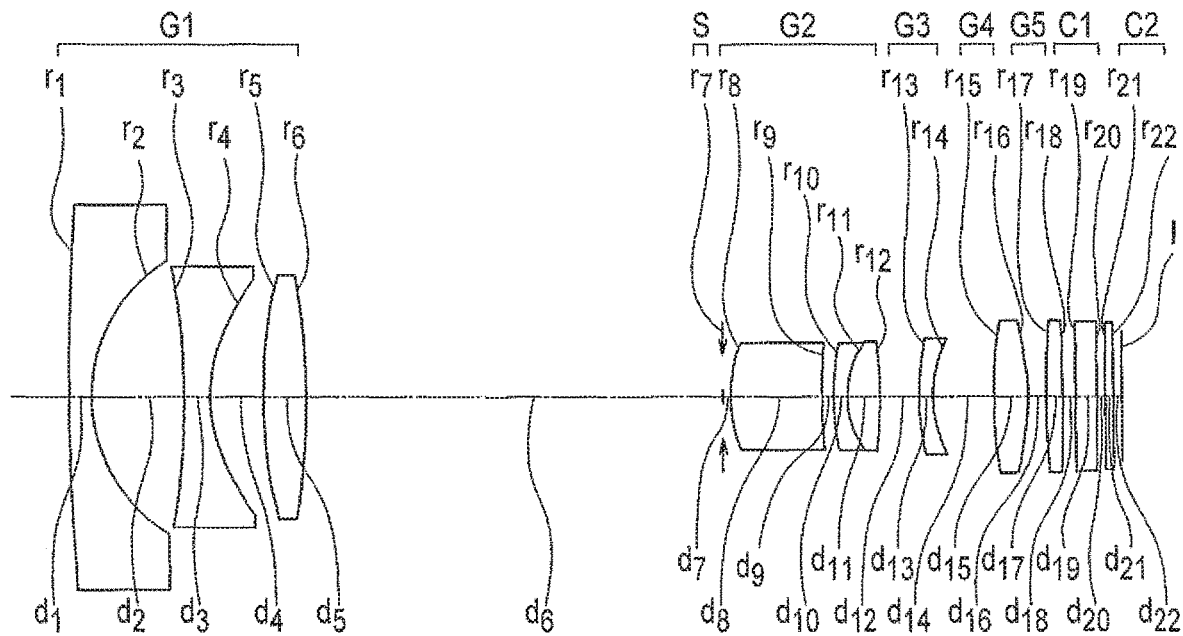
FIG. 16A, FIG. 16B, and FIG. 16C are lens cross-sectional views of a zoom lens according to an example 16, at the time of focusing to an object at infinity.
Figure 16B:
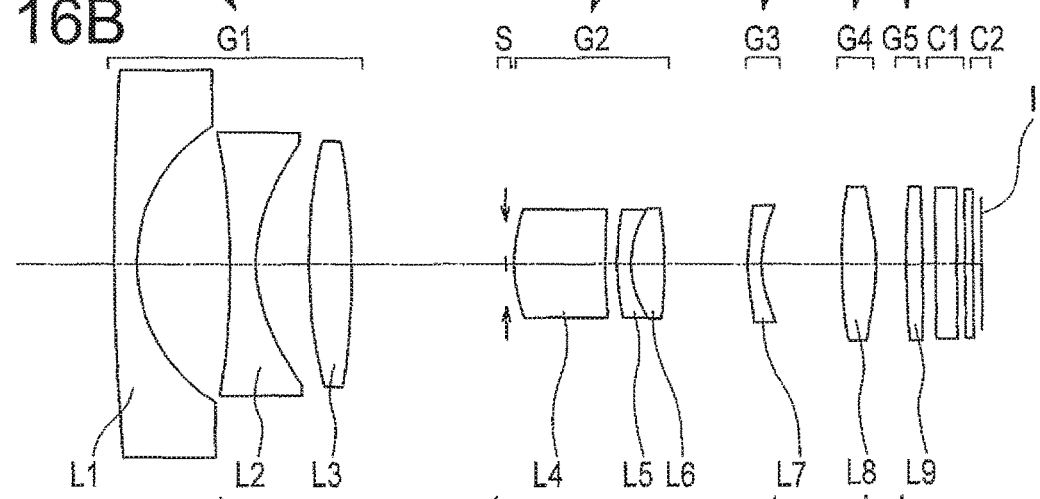
Figure 16C:
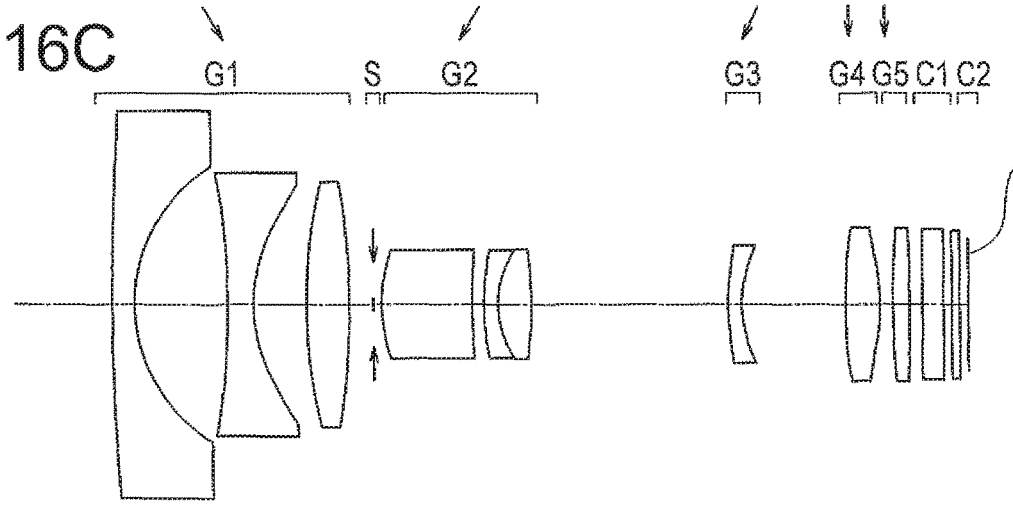
Figure 17A:
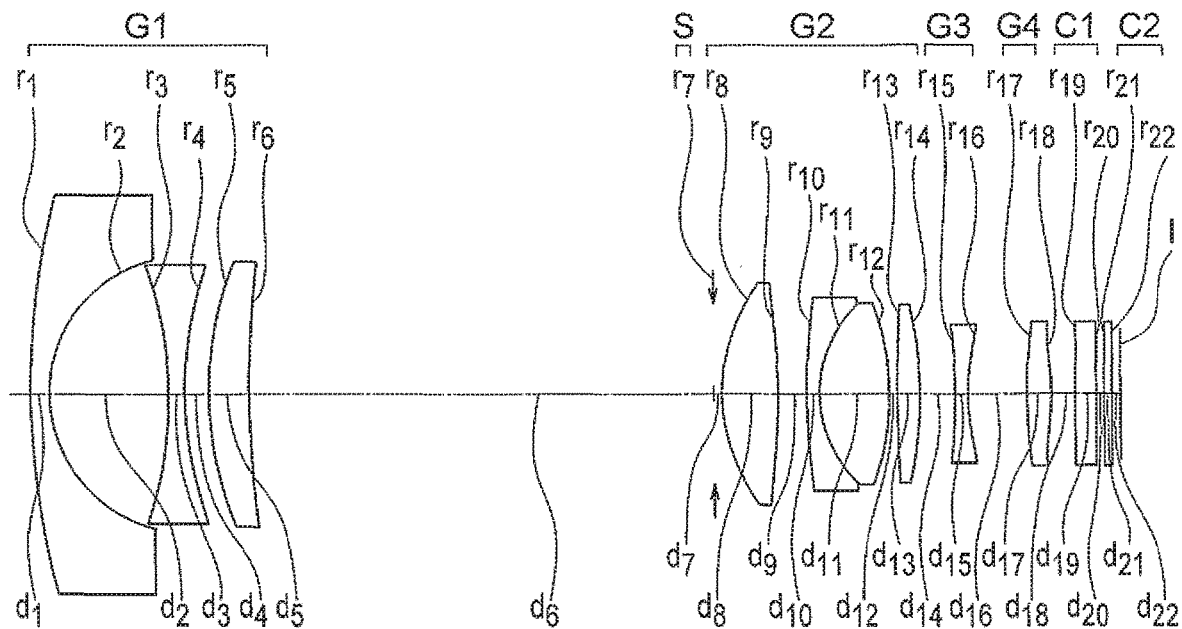
FIG. 17A, FIG. 17B, and FIG. 17C are lens cross-sectional views of a zoom lens according to an example 17, at the time of focusing to an object at infinity.
Figure 17B:
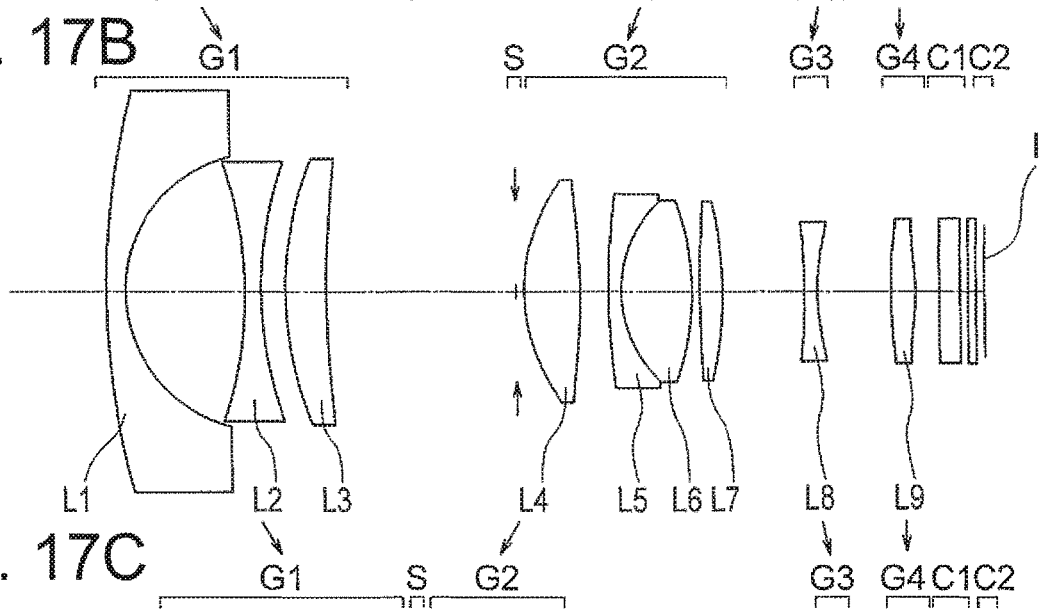
Figure 17C:
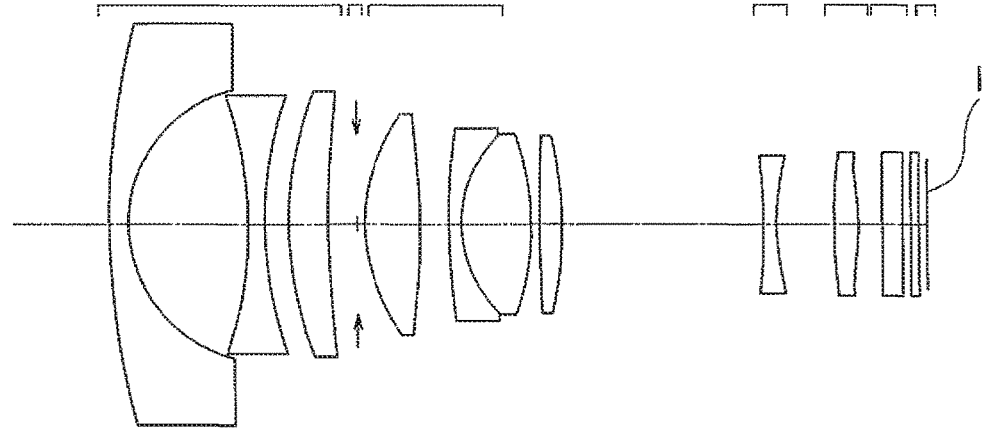
Figure 18A:
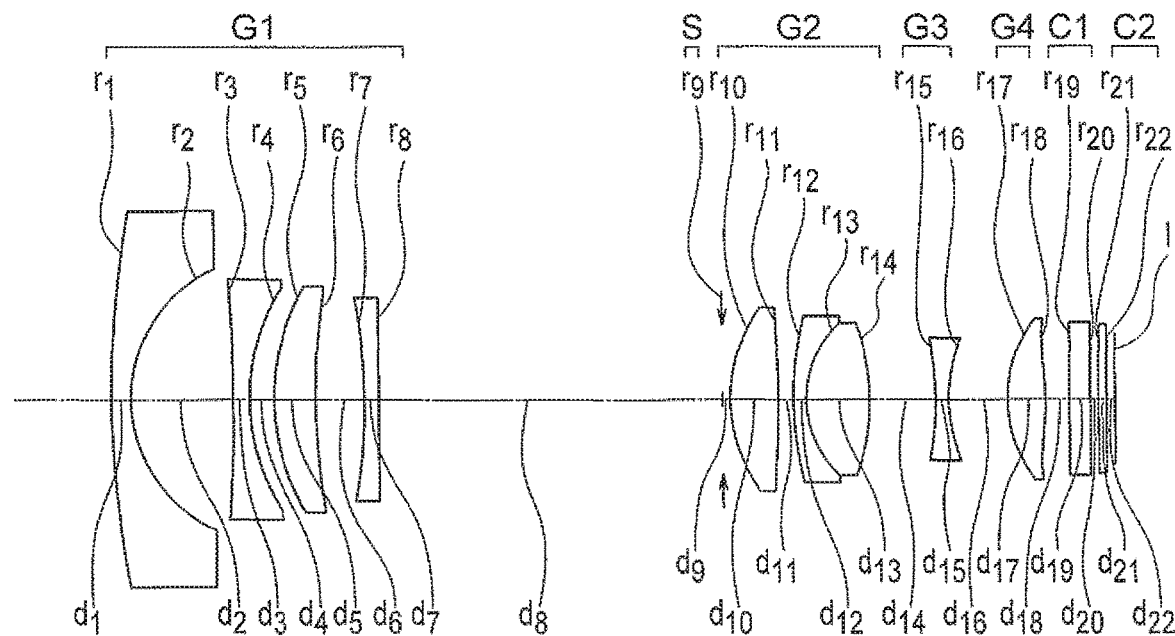
FIG. 18A, FIG. 18B, and FIG. 18C are lens cross-sectional views of a zoom lens according to an example 18, at the time of focusing to an object at infinity.
Figure 18B:
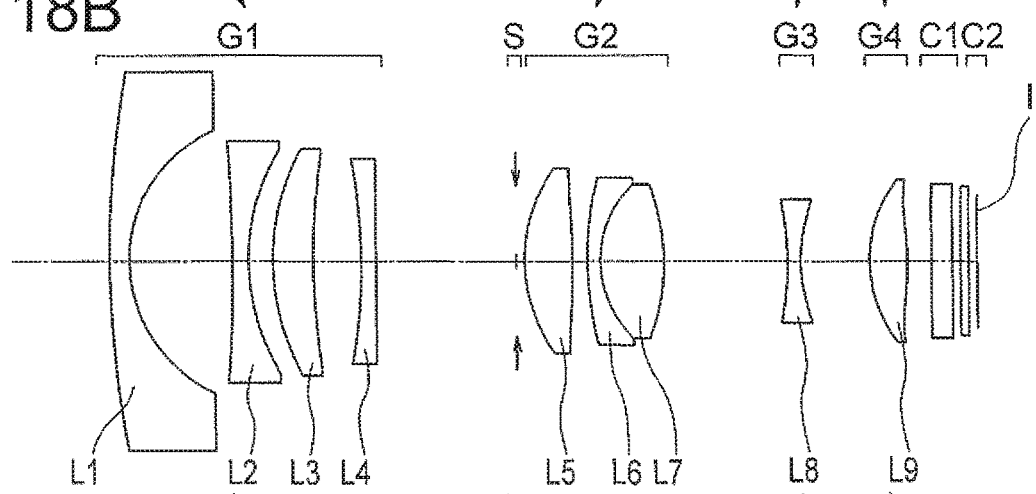
Figure 18C:
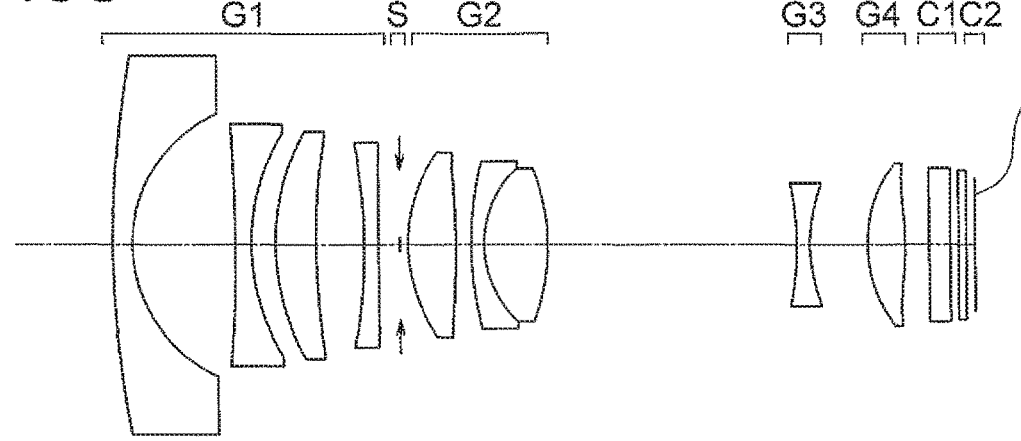
Figure 22A:
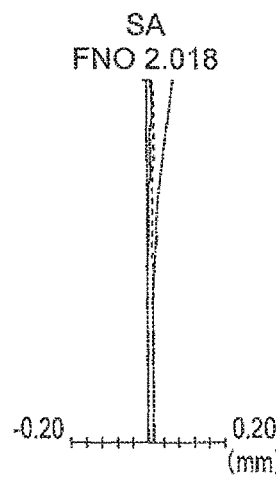
FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams of the zoom lens according to the example 4, at the time of focusing to an object at infinity.
Figure 22B:
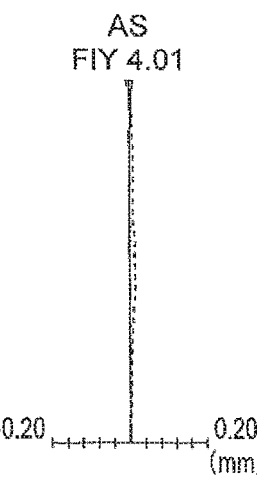
Figure 22C:
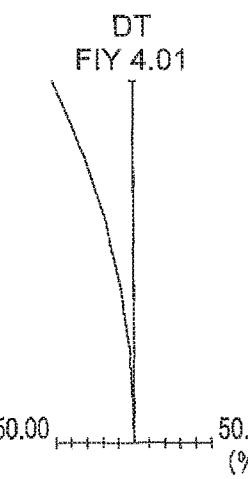
Figure 22D:
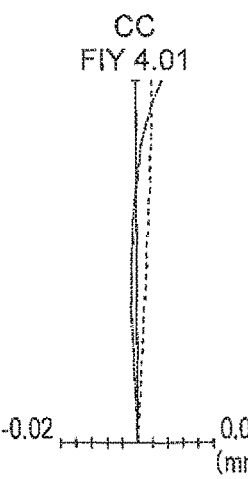
Figure 22E:
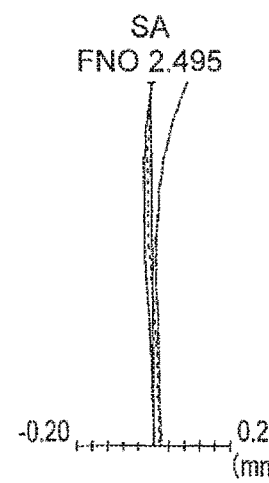
Figure 22F:
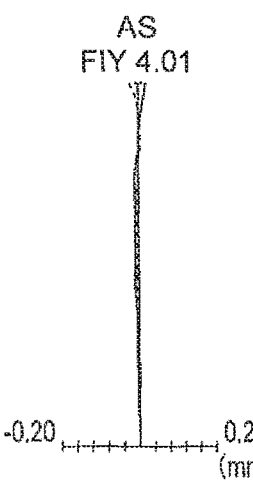
Figure 22G:
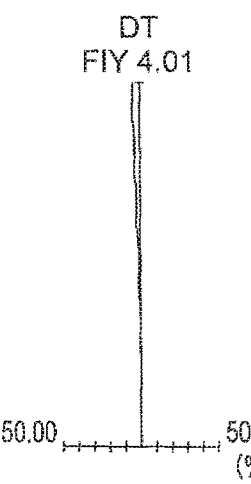
Figure 22H:
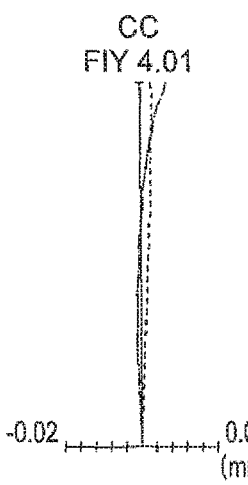
Figure 22I:
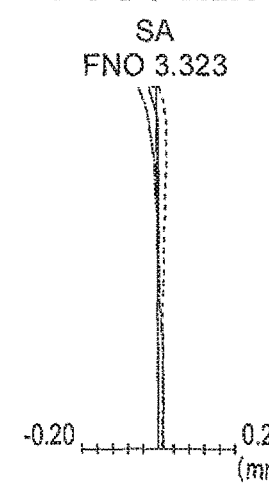
Figure 22J:
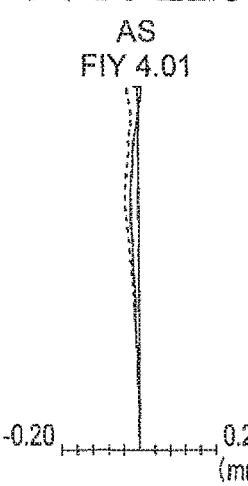
Figure 22K:
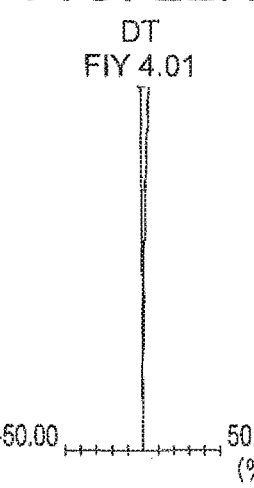
Figure 22L:
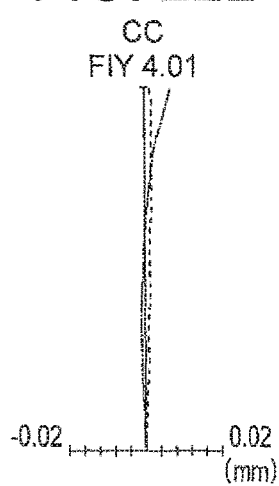
Figure 24A:
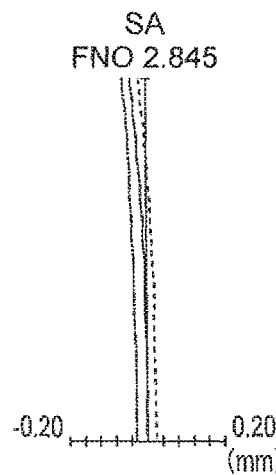
FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams of the zoom lens according to the example 6, at the time of focusing to an object at infinity.
Figure 24B:
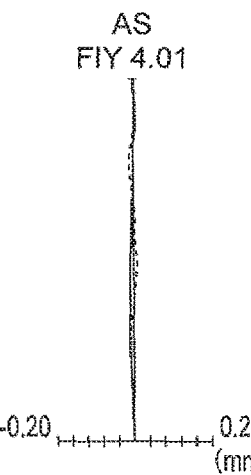
Figure 24C:
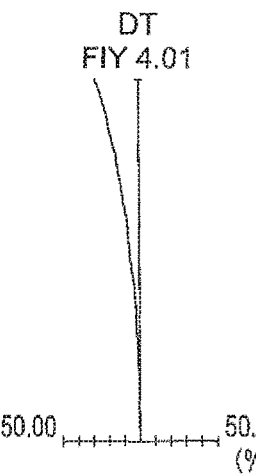
Figure 24D:
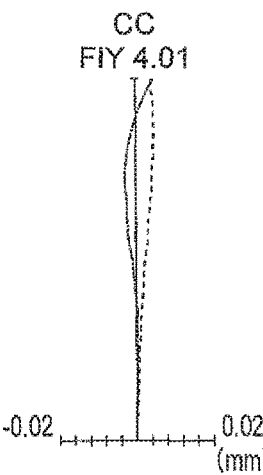
Figure 24E:
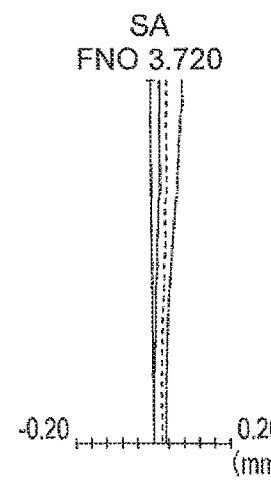
Figure 24F:
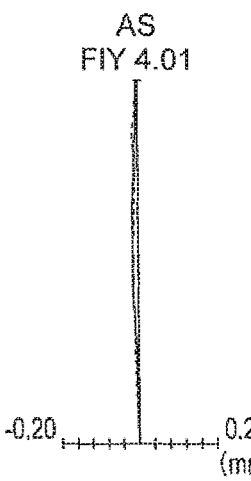
Figure 24G:
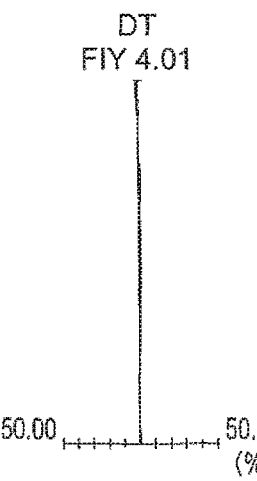
Figure 24H:
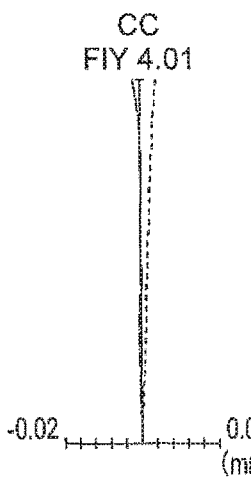
Figure 24I:
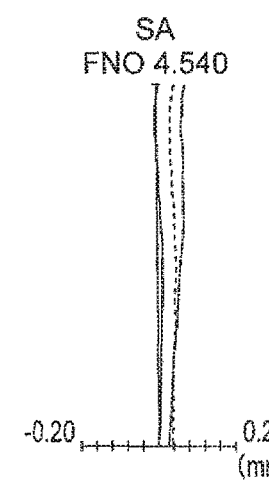
Figure 24J:
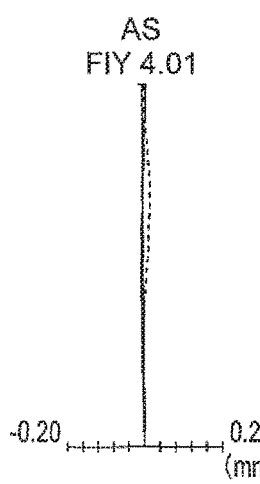
Figure 24K:
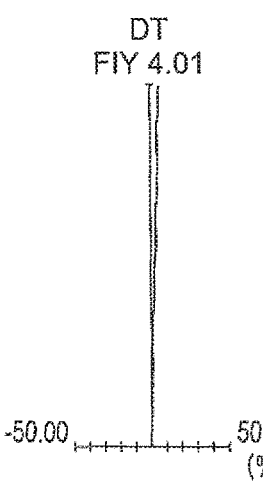
Figure 24L:
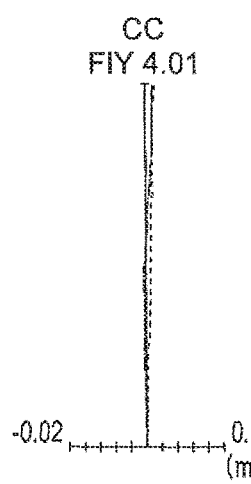
Figure 25A:
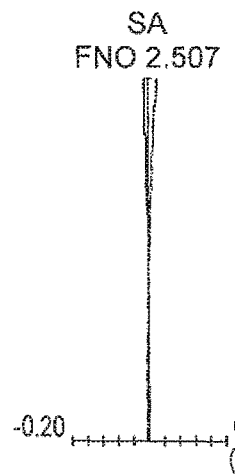
FIG. 25A, FIG. 25B, FIG. 25C, FIG. 25D, FIG. 25E, FIG. 25F, FIG. 25G, FIG. 25H, FIG. 25I, FIG. 25J, FIG. 25K, and FIG. 25L are aberration diagrams of the zoom lens according to the example 7, at the time of focusing to an object at infinity.
Figure 25B:
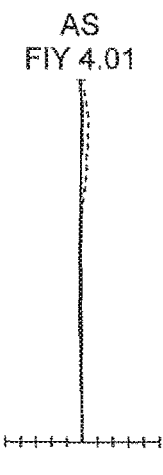
Figure 25C:
Figure 25D:
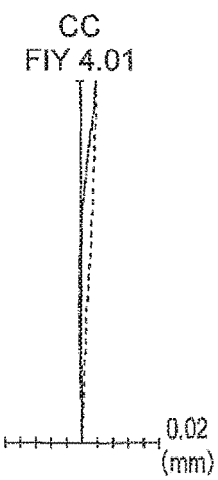
Figure 25E:
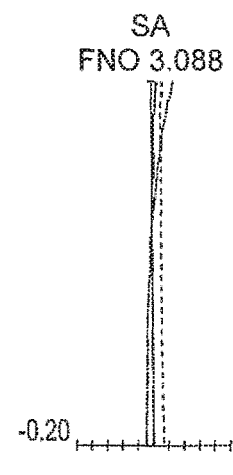
Figure 25F:
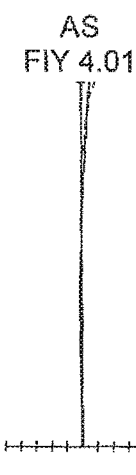
Figure 25G:
Figure 25H:
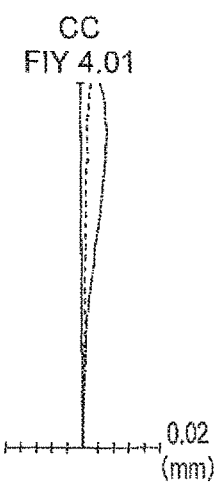
Figure 25I:
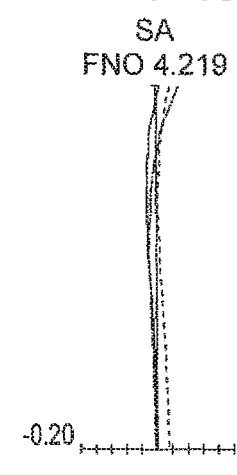
Figure 25J:
Figure 25K:
Figure 25L:
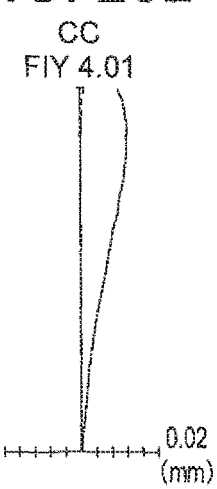
Figure 27A:
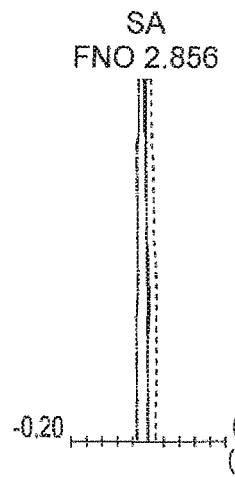
FIG. 27A, FIG. 27B, FIG. 27C, FIG. 27D, FIG. 27E, FIG. 27F, FIG. 27G, FIG. 27H, FIG. 27I, FIG. 27J, FIG. 27K, and FIG. 27L are aberration diagrams of the zoom lens according to the example 9, at the time of focusing to an object at infinity.
Figure 27B:
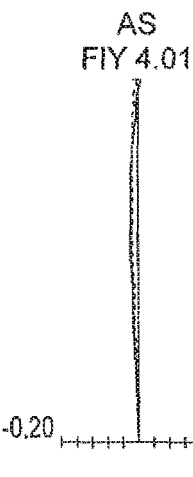
Figure 27C:
Figure 27D:
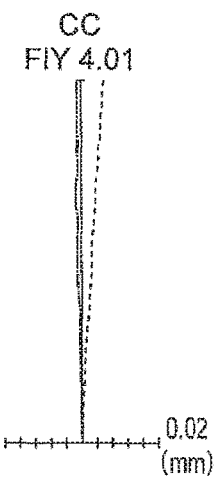
Figure 27E:
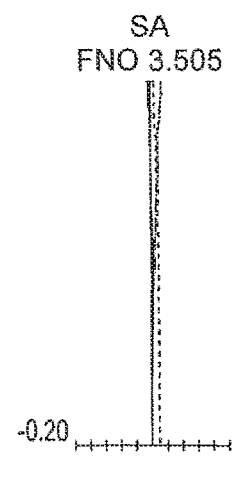
Figure 27F:
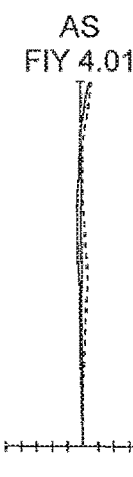
Figure 27G:
Figure 27H:
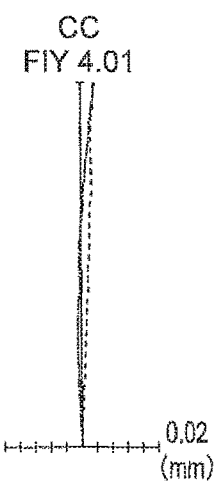
Figure 27I:
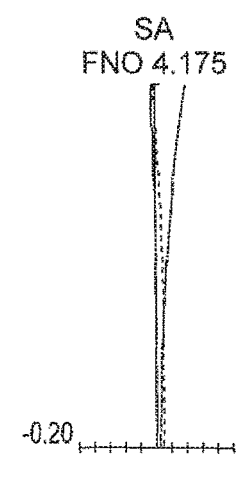
Figure 27J:
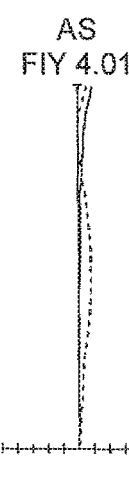
Figure 27K:
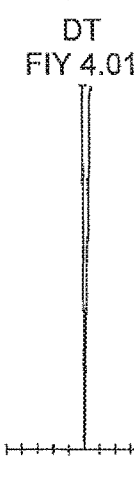
Figure 27L:
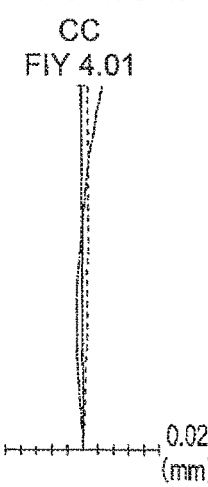
Figure 29A:
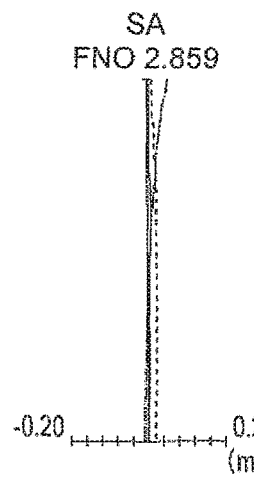
FIG. 29A, FIG. 29B, FIG. 29C, FIG. 29D, FIG. 29E, FIG. 29F, FIG. 29G, FIG. 29H, FIG. 29I, FIG. 29J, FIG. 29K, and FIG. 29L are aberration diagrams of the zoom lens according to the example 11, at the time of focusing to an object at infinity.
Figure 29B:
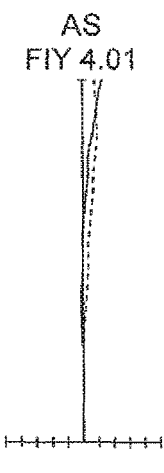
Figure 29C:
Figure 29D:
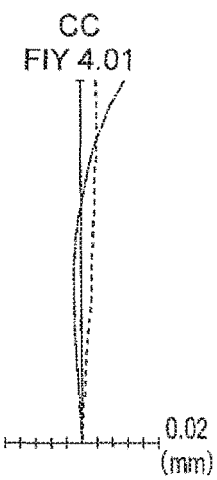
Figure 29E:
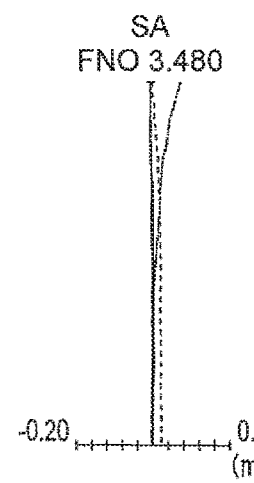
Figure 29F:
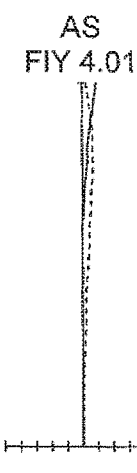
Figure 29G:
Figure 29H:
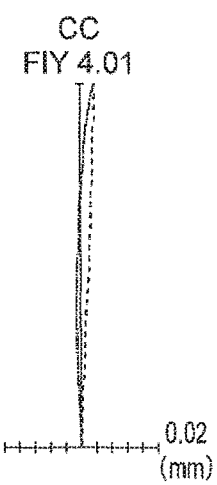
Figure 29I:
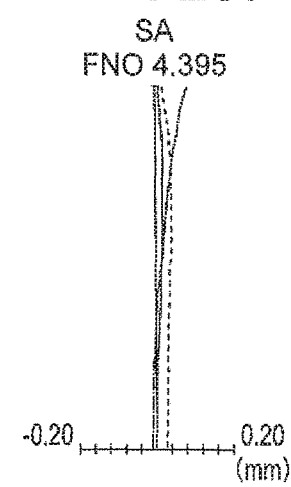
Figure 29J:
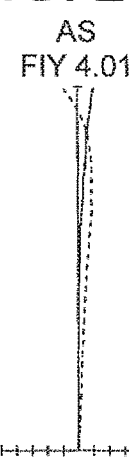
Figure 29K:
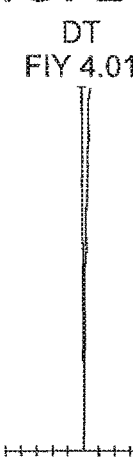
Figure 29L:
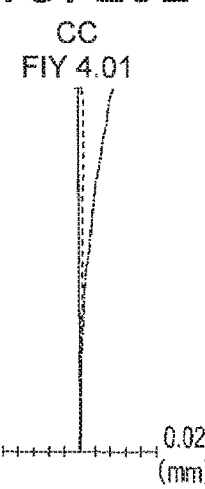
Figure 30A:
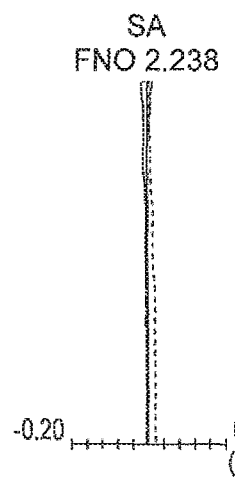
FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L are aberration diagrams of the zoom lens according to the example 12, at the time of focusing to an object at infinity.
Figure 30B:
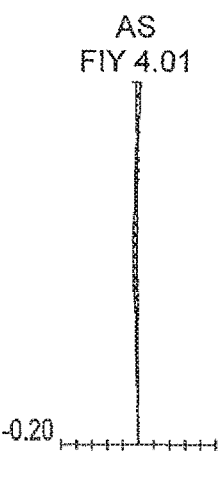
Figure 30C:
Figure 30D:
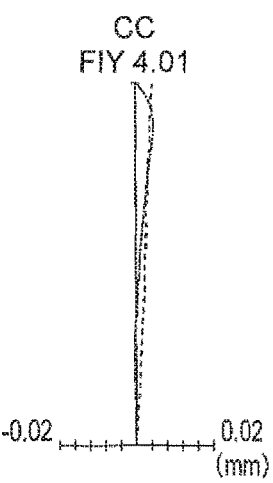
Figure 30E:
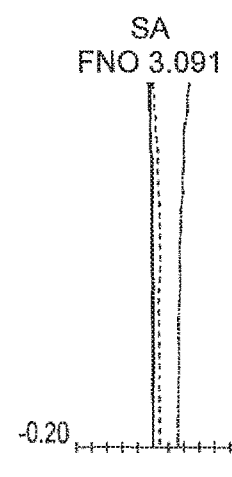
Figure 30F:
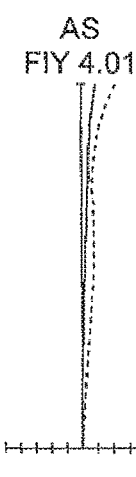
Figure 30G:
Figure 30H:
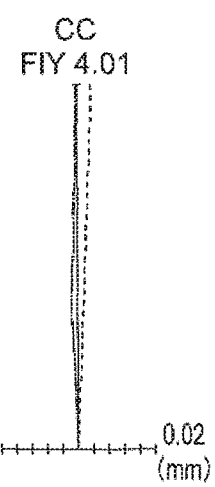
Figure 30I:
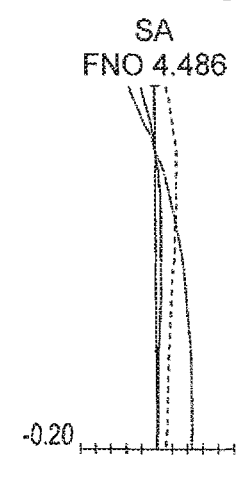
Figure 30J:
Figure 30K:
Figure 30L:
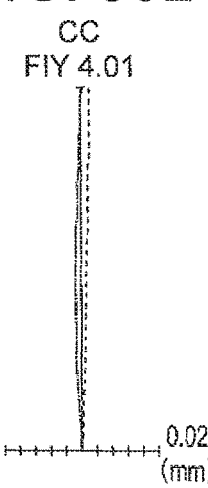
Figure 31A:
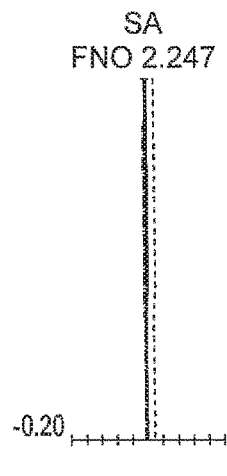
FIG. 31A, FIG. 31B, FIG. 31C, FIG. 31D, FIG. 31E, FIG. 31F, FIG. 31G, FIG. 31H, FIG. 31I, FIG. 31J, FIG. 31K, and FIG. 31L are aberration diagrams of the zoom lens according to the example 13, at the time of focusing to an object at infinity.
Figure 31B:
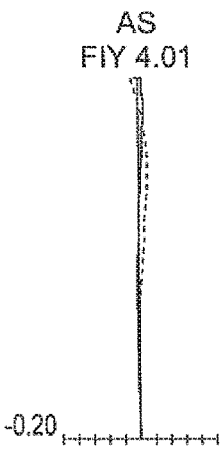
Figure 31C:
Figure 31D:
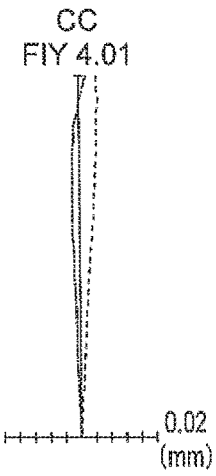
Figure 31E:
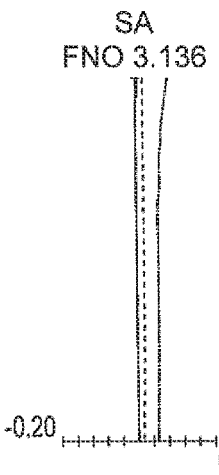
Figure 31F:
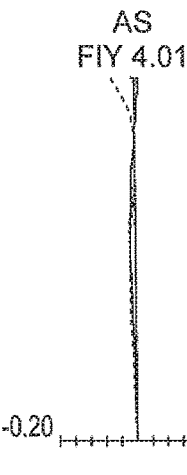
Figure 31G:
Figure 31H:
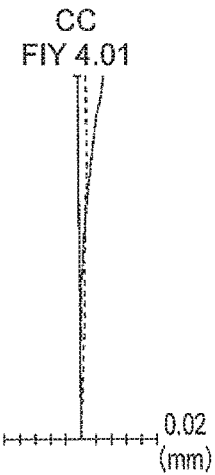
Figure 31I:
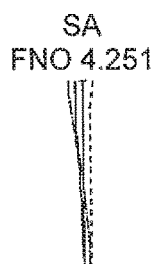
Figure 31J:
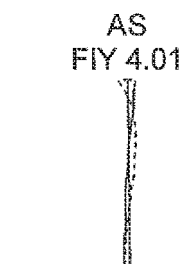
Figure 31K:
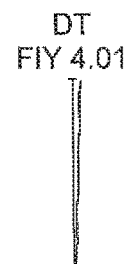
Figure 31L:
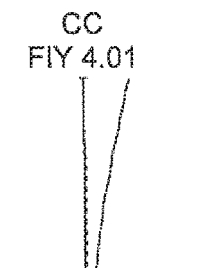
Figure 34A:
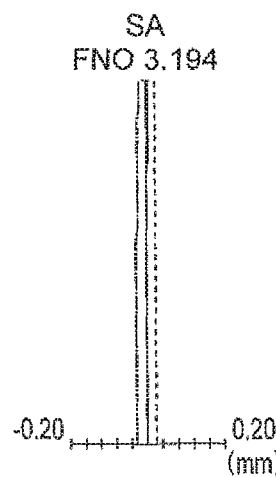
FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L are aberration diagrams of the zoom lens according to the example 16, at the time of focusing to an object at infinity.
Figure 34B:
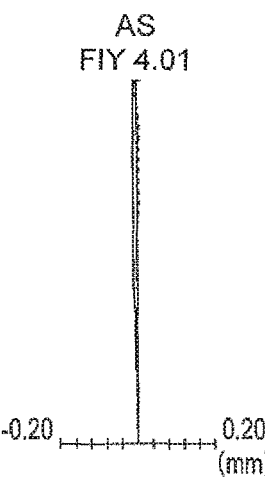
Figure 34C:
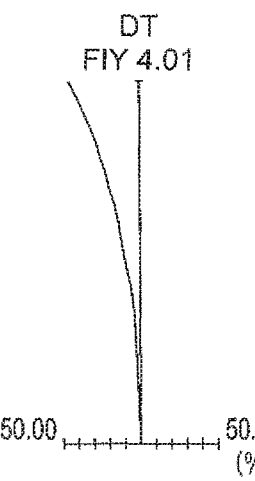
Figure 34D:
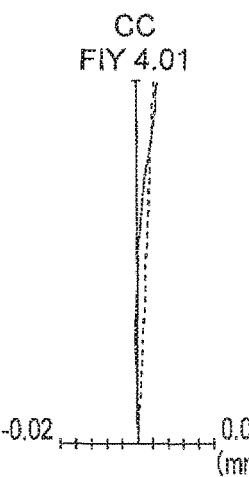
Figure 34E:
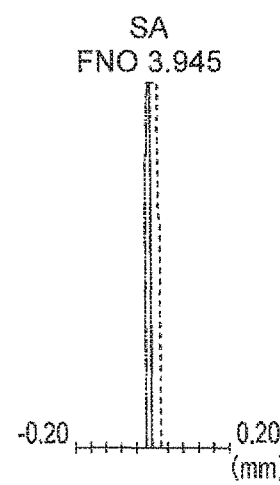
Figure 34F:
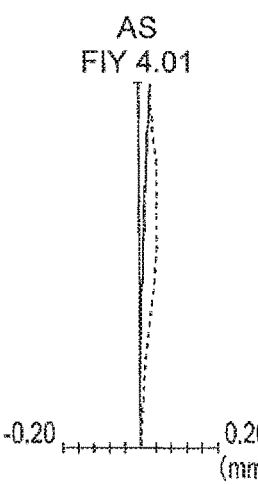
Figure 34G:
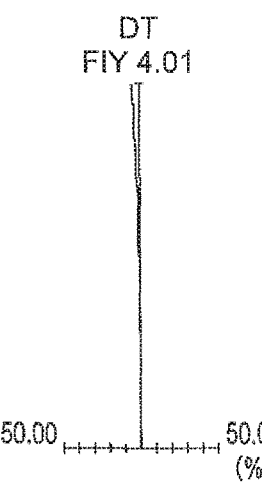
Figure 34H:
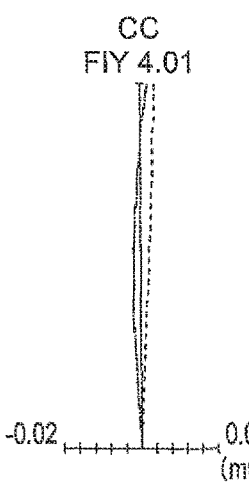
Figure 34I:
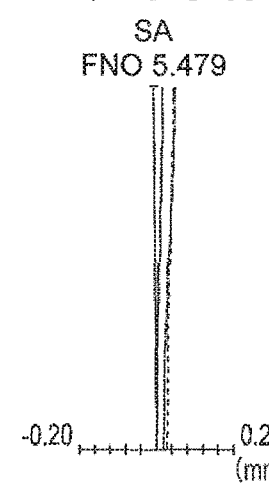
Figure 34J:
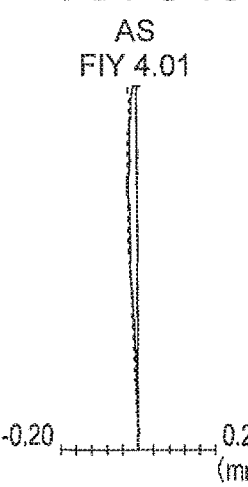
Figure 34K:
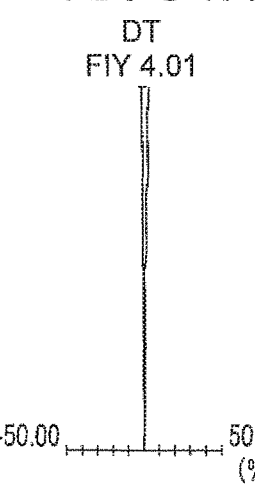
Figure 34L:
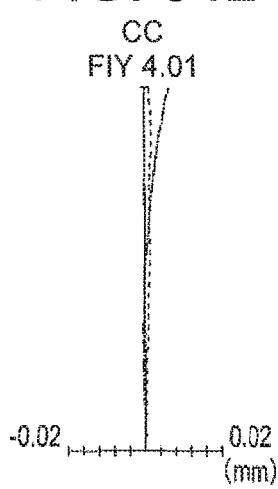

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A zoom lens of the present embodiment includes in order from an object side, a first lens unit having a negative refractive power, a second lens unit having a positive refractive power, a third lens unit having a negative refractive power, and a fourth lens unit having a positive refractive power. At a time of zooming, distances between lens units vary. A distance between the first lens unit and the second lens unit becomes smaller at a telephoto end than at a wide angle end, and a distance between the second lens unit and the third lens unit becomes longer at the telephoto end than at the wide angle end, and the following conditional expressions (1), (2), and (3) are satisfied:

$$0.4 < |f1|/|f2| < 1.2 \qquad (1)$$

$$0.3 < L2/L1 < 0.95 \qquad (2)$$

$$0.6 < Lt/Lw < 1 \qquad (3)$$

where, f1 denotes a focal length of the first lens unit, f2 denotes a focal length of the second lens unit, L1 denotes a thickness on an optical axis of the first lens unit, L2 denotes a thickness on an optical axis of the second lens unit, Lw denotes an overall length of the zoom lens at the wide angle end, and Lt denotes an overall length of the zoom lens at the telephoto end, and here the overall length is a distance from a lens surface nearest to object up to a paraxial image plane, and is a distance in a case in which no air conversion is carried out.

The zoom lens of the present embodiment includes in order from the object side, the first lens unit having a negative refractive power, the second lens unit having a positive refractive power, the third lens unit having a negative refractive power, and the fourth lens unit having a positive refractive power.

In the zoom lens of the present embodiment, a lens unit having a negative refractive power is disposed nearest to object. Thus, in the zoom lens of the present embodiment, an optical system of a negative-lead type has been adopted. Consequently, it is possible to make wide an angle of view at the wide angle end.

Moreover, the refractive power of the second lens unit is a positive refractive power and the refractive power of the third lens unit is a negative refractive power. Consequently, an optical system of a telephoto type is formed by the second lens unit and the third lens unit. Accordingly, since it is possible to shorten a distance between the third lens unit and the fourth lens unit, it is possible to make the optical system small-sized.

Moreover, since distances between the lens units vary at the time of zooming, it is possible to make small a variation in a curvature of field accompanied by the zooming.

In conditional expression (1), a ratio of the focal length of the first lens unit and the focal length of the second lens unit is used. By exceeding a lower limit value of conditional expression (1), it is possible to correct an astigmatism while achieving small-sizing of the first lens unit. By a value falling below an upper limit value of conditional expression (1), it is possible to correct a coma while securing a wide angle of view.

In conditional expression (2), a ratio of the thickness on the optical axis of the first lens unit and the thickness on the optical axis of the second lens unit is used. The thickness on the optical axis of the first lens unit (hereinafter, referred to as 'thickness of the first lens unit') is a distance in an optical axial direction from a lens surface nearest to object of the first lens unit up to a lens surface nearest to image of the first lens unit. The thickness on the optical axis of the second lens unit (hereinafter, referred to as 'thickness of the second lens unit') is a distance in the optical axial direction from a lens surface nearest to object of the second lens unit up to a lens surface nearest to image of the second lens unit.

By exceeding a lower limit value of conditional expression (2), it is possible to suppress an occurrence of the astigmatism in the first lens unit while maintaining a wide angle of view. By a value falling below an upper limit value of conditional expression (2), it is possible to secure adequately a space in which the second lens unit moves at the time of zooming. As a result, it is possible to secure a large zooming ratio as well as to suppress a fluctuation in an image-plane position.

In conditional expression (3), a ratio of the overall length of the zoom lens at the wide angle end and the overall length of the zoom lens at the telephoto end is used. The overall length of the zoom lens is a distance from a surface nearest to object up to a paraxial image plane, and is a distance in a case in which no air conversion is carried out.

By exceeding a lower limit value of conditional expression (3), it is possible to secure adequately a space in which the second lens unit moves at the time of zooming. As a result, it is possible to secure a large zooming ratio as well as to suppress a fluctuation in the image-plane position.

As the angle of view at the wide angle end becomes wider, a light ray is more susceptible to be vignetted by a member holding the optical system. Moreover, when the overall length of the zoom lens at the telephoto end becomes longer than the overall length of the zoom lens at the wide angle end, a light ray is susceptible to be vignetted by the member holding the optical system. By a value falling below an upper limit value of conditional expression (3), it is possible to prevent vignetting of a light ray. As a result, it is possible to secure a high optical performance throughout the entire zoom range.

It is preferable that the following conditional expression (1') be satisfied instead of conditional expression (1)

$$0.5<|f1|/|f2|<1.1 \quad (1')$$

It is more preferable that the following conditional expression (1") be satisfied instead of conditional expression (1).

$$0.55<|f1|/|f2|<1.05 \quad (1'')$$

It is preferable that the following conditional expression (2') be satisfied instead of conditional expression (2).

$$0.35<L2/L1<0.945 \quad (2')$$

It is more preferable that the following conditional expression (2") be satisfied instead of conditional expression (2).

$$0.4<L2/L1<0.945 \quad (2'')$$

It is preferable that the following conditional expression (3') be satisfied instead of conditional expression (3).

$$0.65<Lt/Lw<0.95 \quad (3')$$

It is more preferable that the following conditional expression (3") be satisfied instead of conditional expression (3).

$$0.7<Lt/Lw<0.9 \quad (3'')$$

In the zoom lens of the present embodiment, it is preferable that the following conditional expression (4) be satisfied:

$$-5<f1/fw<-2.15 \quad (4)$$

where, f1 denotes the focal length of the first lens unit, and fw denotes a focal length of the overall zoom lens system at the wide angle end.

In conditional expression (4), a ratio of the focal length of the first lens unit and the focal length of the overall zoom lens at the wide angle end is used.

When a lower limit value of conditional expression (4) is exceeded, it is possible to make the focal length of the first lens unit short (to make the negative refractive power large). In this case, since it is possible to bring a position of an entrance pupil closer to the object side, it is possible to make a diameter of the first lens unit small. As a result, it is possible to make the first lens unit and the optical system small-sized.

When a value falls below a lower limit value of conditional expression (4), it is possible to make the focal length of the first lens unit long (to make the negative refractive power small). As a result, it is possible to suppress an occurrence of a chromatic aberration of magnification and an occurrence of the astigmatism at the wide angle end. Moreover, it is possible to suppress an occurrence of the chromatic aberration of magnification at the telephoto end.

It is preferable that the following conditional expression (4') be satisfied instead of conditional expression (4).

$$-4.5<f1/fw<-2.2 \quad (4')$$

It is more preferable that the following conditional expression (4") be satisfied instead of conditional expression (4).

$$-4<f1/fw<-2.25 \quad (4'')$$

In the zoom lens of the present embodiment, it is preferable that the following conditional expression (5) be satisfied:

$$-10<L1/(y\times\tan 2\omega w)<-0.5 \quad (5)$$

where,

L1 denotes the thickness on the optical axis of the first lens unit, y denotes the maximum image height at an image forming surface in the zoom lens, and ωw denotes a half angle of view at the wide angle end of the zoom lens.

Conditional expression (5) is a conditional expression related to the thickness of the first lens unit. In conditional expression (5), the thickness of the first lens unit is normalized by the maximum image height of the image forming surface in the zoom lens, and a result of normalization is divided further by a tangent of the angle of view of the zoom lens.

By exceeding a lower limit value of conditional expression (5), it is possible to suppress an increase in the thickness of the first lens unit. As a result, it is possible to make the zoom lens compact. By a value falling below an upper limit value of conditional expression (5), it is possible to secure a wide angle of view at the wide angle end.

It is preferable that the following conditional expression (5') be satisfied instead of conditional expression (5).

$$-9<L1/(y\times\tan 2\omega w)<-0.7 \quad (5')$$

It is more preferable that the following conditional expression (5") be satisfied instead of conditional expression (5).

$$-7<L1/(y\times\tan 2\omega w)<-1 \quad (5'')$$

In the zoom lens of the present embodiment, it is preferable that the following conditional expression (6) be satisfied:

$$-2.5<L1/f1<-0.8 \quad (6)$$

where,

L1 denotes the thickness on the axial axis of the first lens unit, and f1 denotes the focal length of the first lens unit.

In conditional expression (6), a ratio of the thickness of the first lens unit and the focal length of the first lens unit is used. By satisfying conditional expression (6), it is possible to suppress an increase in the thickness of the first lens unit. As a result, it is possible to facilitate shortening the overall length of the zoom lens and to correct the astigmatism favorably.

By exceeding a lower limit value of conditional expression (6), it is possible to correct the astigmatism while maintaining a wide angle of view. By a value falling below an upper limit value of conditional expression (6), it is possible to suppress the increase in the first lens unit. As a result, it is possible to make the zoom lens compact.

It is preferable the following conditional expression (6') be satisfied instead of conditional expression (6).

$$-2.4<L1/f1<-0.9 \quad (6')$$

It is more preferable that the following conditional expression (6") be satisfied instead of conditional expression (6).

$$-2.3<L1/f1<-1 \quad (6'')$$

In the zoom lens of the present embodiment, it is preferable that the following conditional expression (7) be satisfied:

$$-8<L2/(y\times\tan 2\omega w)<-0.4 \quad (7)$$

where,

L2 denotes the thickness on the optical axis of the second lens unit, y denotes the maximum image height at an image forming surface in the zoom lens, and ωw denotes the half angle of view at the wide angle end of the zoom lens.

Conditional expression (7) is a conditional expression related to the thickness of the second lens unit. In conditional expression (7), the thickness of the second lens unit is normalized by the maximum image height of the image forming surface in the zoom lens, and a result of normalization is divided further by a tangent of the angle of view of the zoom lens.

By exceeding a lower limit value of conditional expression (7), it is possible to suppress an increase in the thickness of the second lens unit. As a result, it is possible to make the zoom lens compact. By a value falling below an upper limit value of conditional expression (7), it is possible to secure a wide angle of view at the wide angle end.

It is preferable that the following conditional expression (7') be satisfied instead of conditional expression (7).

$$-7<L2/(y\times\tan 2\omega w)<-0.45 \quad (7')$$

It is more preferable that the following conditional expression (7") be satisfied instead of conditional expression (7).

$$-5<L2/(y\times\tan 2\omega w)<-0.5 \quad (7'')$$

In the zoom lens of the present embodiment, it is preferable that the following conditional expression (8) be satisfied:

$$0.3<L2/f2<1.5 \quad (8)$$

where,

L2 denotes the thickness on the optical axis of the second lens unit, and f2 denotes the focal length of the second lens unit.

In conditional expression (8), a ratio of the thickness of the second lens unit and the focal length of the second lens unit is used. By satisfying conditional expression (8), it is possible to suppress the increase in the thickness of the second lens unit. As a result, it is possible to facilitate shortening the overall length of the zoom lens and to correct a spherical aberration and the coma favorably.

By exceeding a lower limit value of conditional expression (8), it is possible to correct the spherical aberration and the coma. By a value falling below an upper limit value of conditional expression (8), it is possible to suppress the increase in the thickness of the second lens unit. As a result, it is possible to make the zoom lens compact.

It is preferable that the following conditional expression (8') be satisfied instead of conditional expression (8).

$$0.4 < L2/f2 < 1.3 \quad (8')$$

It is more preferable that the following conditional expression (8") be satisfied instead of conditional expression (8).

$$0.5 < L2/f2 < 1.2 \quad (8'')$$

In the zoom lens of the present embodiment, it is preferable that the following conditional expression (9) be satisfied:

$$0 < L12airt/L2 < 0.9 \quad (9)$$

where,

L12airt denotes an air space between the first lens unit and the second lens unit at the telephoto end, and L2 denotes the thickness on the optical axis of the second lens unit.

In conditional expression (9), a ratio of a predetermined air space at the telephoto end and the thickness of the second lens unit, is used. The predetermined air space is the air space between the first lens unit and the second lens unit.

By exceeding a lower limit value of conditional expression (9), it is possible to avoid a physical interference between the first lens unit and the second lens unit. By a value falling below an upper limit value of conditional expression (9), it is possible to secure a high zooming ratio while achieving small-sizing of the zoom lens at the telephoto end.

It is preferable that the following conditional expression (9') be satisfied instead of conditional expression (9).

$$0.1 < L12airt/L2 < 0.8 \quad (9')$$

It is more preferable that the following conditional expression (9") be satisfied instead of conditional expression (9).

$$0.1 < L12airt/L2 < 0.77 \quad (9'')$$

In the zoom lens of the present embodiment, it is preferable that the following conditional expression (10) be satisfied:

$$0.5 < f3/f1 < 6 \quad (10)$$

where, f1 denotes the focal length of the first lens unit, and
f3 denotes a focal length of the third lens unit.

In conditional expression (10), a ratio of the focal length of the third lens unit and the focal length of the first lens unit is used. As mentioned above, an optical system of a telephoto type is formed by the second lens unit and the third lens unit. Accordingly, it is possible to achieve an effect of the optical system of a telephoto type (hereinafter, referred to as 'telephoto effect'). An example of the telephoto effect is shortening of the overall length of the optical system.

By exceeding a lower limit value of conditional expression (10), it is possible to correct the astigmatism while maintaining a wide angle of view. By a value falling below an upper limit value of conditional expression (10), it is possible to make the telephoto effect strong. As a result, it is possible to shorten the overall length of the zoom lens.

It is preferable that the following conditional expression (10') be satisfied instead of conditional expression (10).

$$0.6 < f3/f1 < 5 \quad (10')$$

It is more preferable that the following conditional expression (10") be satisfied instead of conditional expression (10).

$$0.7 < f3/f1 < 4 \quad (10'')$$

In the zoom lens of the present embodiment, it is preferable that the following conditional expression (11) be satisfied:

$$0.5 < f4/L1 < 3.5 \quad (11)$$

where,

L1 denotes the thickness on the optical axis of the first lens unit, and f4 denotes a focal length of the fourth lens unit.

In conditional expression (11), a ratio of the focal length of the fourth lens unit and the thickness of the first lens unit is used. By exceeding a lower limit value of conditional expression (11), it is possible to suppress an occurrence of the coma in the fourth lens unit. By a value falling below an upper limit value of conditional expression (11), it is possible to correct the chromatic aberration of magnification in the fourth lens unit. Moreover, since it is possible to secure the thickness of the first lens unit adequately, it is possible to correct the astigmatism.

It is preferable that the following conditional expression (11') be satisfied instead of conditional expression (11).

$$0.6 < f4/L1 < 3 \quad (11')$$

It is more preferable that the following conditional expression (11") be satisfied instead of conditional expression (11).

$$0.625 < f4/L1 < 2.5 \quad (11'')$$

In the zoom lens of the present embodiment, it is preferable that the following conditional expression (12) be satisfied:

$$0.8 < \beta 3t/\beta 3w < 1.8 \quad (12)$$

where, $\beta 3w$ denotes a lateral magnification of the third lens unit at the wide angle end, and $\beta 3t$ denotes a lateral magnification of the third lens unit at the telephoto end.

In conditional expression (12) a ratio of the lateral magnification of the third lens unit at the wide angle end and the lateral magnification of the third lens unit at the telephoto end is used. For securing a high zooming ratio, it is preferable that a value does not fall below a lower limit value of conditional expression (12). By a value falling below an upper limit value of conditional expression (12), it is possible to suppress a fluctuation in the astigmatism accompanied by zooming.

It is preferable that the following conditional expression (12') be satisfied instead of conditional expression (12).

$$0.85 < \beta 3t/\beta 3w < 1.7 \quad (12')$$

It is more preferable that the following conditional expression (12") be satisfied instead of conditional expression (12).

$$0.9 < \beta 3t/\beta 3w < 1.4 \quad (12'')$$

In the zoom lens of the present embodiment, it is preferable that the following conditional expression (13) be satisfied:

$$-0.6 < \beta 2w < -0.15 \quad (13)$$

where,

β2w denotes a lateral magnification of the second lens unit at the wide angle end.

Conditional expression (13) is a conditional expression related to the lateral magnification of the second lens unit at the wide angle end. By exceeding a lower limit value of conditional expression (13), an absolute value of the lateral magnification becomes small (the absolute value of lateral magnification comes closer to zero). In this case, it is possible to widen the distance between the first lens unit and the second lens unit. Making such arrangement is advantageous for securing a high zooming ratio.

By a value falling below an upper limit value of conditional expression (13), it is possible not to let the distance between the first lens unit and the second lens unit to be widened excessively. As a result, it is possible to shorten the overall length of the optical system. Moreover, since it is possible to suppress the increase in the distance between the first lens unit and the second lens unit, it is possible to suppress a height of an axial light ray that passes through the second lens unit. Consequently, it is possible to suppress an occurrence of the spherical aberration.

It is preferable that the following conditional expression (13') be satisfied instead of conditional expression (13).

$$-0.5 < \beta 2w < -0.2 \quad (13')$$

It is more preferable that the following conditional expression (13") be satisfied instead of conditional expression (13).

$$-0.45 < \beta 2w < -0.22 \quad (13")$$

In the zoom lens of the present embodiment, it is preferable that the following conditional expression (14) be satisfied:

$$1.5 < \beta 2t/\beta 2w < 5 \quad (14)$$

β2w denotes the lateral magnification of the second lens unit at the wide angle end, and β2t denotes a lateral magnification of the second lens unit at the telephoto end.

In conditional expression (14), a ratio of the lateral magnification of the second lens unit at the wide angle end and the lateral magnification of the second lens unit at the telephoto end is used. By exceeding a lower limit value of conditional expression (14), it is possible to secure the zooming ratio adequately.

By a value falling an upper limit value of conditional expression (14), it is possible to suppress an increase in the overall length of the optical system at the wide angle end. The overall length of the optical system is susceptible to become long at the telephoto end. However, since the increase in the overall length of the optical system at the wide angle end has been suppressed, it is possible to suppress the overall length of the optical system at the telephoto end.

It is preferable that the following conditional expression (14') be satisfied instead of conditional expression (14).

$$1.6 < \beta 2t/\beta 2w < 4.7 \quad (14')$$

It is more preferable that the following conditional expression (14") be satisfied instead of conditional expression (14).

$$1.8 < \beta 2t/\beta 2w < 4.3 \quad (14")$$

In the zoom lens of the present embodiment, it is preferable that the following conditional expression (15) be satisfied:

$$0.6 < (\beta 2t/\beta 2w)/(ft/fw) < 1.1 \quad (15)$$

where,

β2w denotes the lateral magnification of the second lens unit at the wide angle end, β2t denotes the lateral magnification of the second lens unit at the telephoto end, fw denotes the focal length of the overall zoom lens system at the wide angle end, and ft denotes a focal length of the overall zoom lens system at the telephoto end.

In conditional expression (15), a ratio of a zooming ratio of the second lens unit and a zooming ratio of the overall zoom lens is used.

By exceeding a lower limit value of conditional expression (15), a load of zooming on the second lens unit does not become excessively small. In this case, since it is possible to make a load of zooming on the other lens unit small, it is possible to secure a high zooming ratio while suppressing an occurrence of aberration in the overall optical system.

By a value falling below an upper limit value of conditional expression (15), the load of zooming on the second lens unit does not become excessively large. In this case, it is possible to suppress a fluctuation in an axial aberration. As a result, it is possible to maintain a favorable imaging performance while securing a high zooming ratio.

It is preferable that the following conditional expression (15') be satisfied instead of conditional expression (15).

$$0.65 < (\beta 2t/\beta 2w)/(ft/fw) < 1.1 \quad (15')$$

It is more preferable that the following conditional expression (15") be satisfied instead of conditional expression (15).

$$0.68 < (\beta 2t/\beta 2w)/(ft/fw) < 1.05 \quad (15")$$

In the zoom lens of the present embodiment, it is preferable that the following conditional expression (16) be satisfied:

$$1.0 < (\beta 2t/\beta 2w)/(\beta 3t/\beta 3w) < 6 \quad (16)$$

where,

β2w denotes the lateral magnification of the second lens unit at the wide angle end, β2t denotes the lateral magnification of the second lens unit at the telephoto end, β3w denotes the lateral magnification of the third lens unit at the wide angle end, and β3t denotes the lateral magnification of the third lens unit at the telephoto end.

In conditional expression (16), the ratio of the zooming ratio of the second lens unit and the zooming ratio of the third lens unit is used.

By exceeding a lower limit value of conditional expression (16), it is possible to make the zooming ratio of the second lens unit high. In this case, it is possible to suppress an increase in the zooming ratio of the third lens unit. Moreover, it is possible to suppress an increase in the lateral magnification of the third lens unit at the telephoto end. Consequently, it is possible to suppress an increase in a distance from the third lens unit up to an image plane. As a result, it is possible to shorten the overall length of the optical system.

By a value falling below an upper limit value of conditional expression (16), it is possible to suppress a fluctuation in the astigmatism and a fluctuation in the coma in the second lens unit.

It is preferable that the following conditional expression (16') be satisfied instead of conditional expression (16).

$$1.2<(\beta 2t/\beta 2w)/(\beta 3t/\beta 3w)<5 \quad (16')$$

It is more preferable that the following conditional expression (16") be satisfied instead of conditional expression (16).

$$1.4<(\beta 2t/\beta 2w)/(\beta 3t/\beta 3w)<4.5 \quad (16'')$$

In the zoom lens of the present embodiment, it is preferable that focusing from an object at infinity to an object at a close distance be carried out only by the third lens unit, and the following conditional expression (17) be satisfied:

$$0.2<|fct|<4 \quad (17)$$

where,
fct is indicated by the following expression $$fct=(1-\beta t\times\beta t)\times\beta't\times\beta t, \text{ and here}$$

βt denotes a lateral magnification of the third lens unit at the telephoto end, and β't denotes a lateral magnification of a predetermined lens unit at the telephoto end, and here the predetermined lens unit is a lens unit which includes all lenses positioned on an image side of the third lens unit.

Conditional expression (17) is a conditional expression related to a focusing sensitivity at the telephoto end. The focusing sensitivity is expressed as an amount of movement of an image plane with respect to an amount of movement of a lens at the time of focusing, and is obtained paraxially.

By exceeding a lower limit value of conditional expression (17), the focusing sensitivity does not become excessively low. In this case, since it is possible to make small the amount of movement of a lens at the time of focusing, it is possible to suppress a fluctuation in the astigmatism and a fluctuation in the curvature of field at the time of focusing. Moreover, the amount of movement of a lens being small, it is possible to reduce a space for moving the lens. As a result, it is possible to shorten the overall length of the optical system.

By a value falling below an upper limit value of conditional expression (17), the focusing sensitivity does not become excessively high. Consequently, it is possible to suppress an occurrence of the astigmatism and an occurrence of the curvature of field due to the movement of the lens.

It is preferable that the following conditional expression (17') be satisfied instead of conditional expression (17).

$$0.25<|fct|<3.5 \quad (17')$$

It is more preferable that the following conditional expression (17") be satisfied instead of conditional expression (17).

$$0.3<|fct|<3 \quad (17'')$$

In the zoom lens of the present embodiment, it is preferable that the focusing from the object at infinity to the object at a close distance be carried out only by the third lens unit, and the following conditional expression (18) be satisfied:

$$0.7<|fct|/|fcw|<4 \quad (18)$$

where,
fct and fcw are indicated by the following expressions, $$fct=(1-\beta t\times\beta t)\times\beta't\times\beta't,$$

$$fcw=(1-\beta w\times\beta w)\times\beta'w\times\beta'w, \text{ and here}$$

βt denotes the lateral magnification of the third lens unit at the telephoto end, β't denotes the lateral magnification of the predetermined lens unit at the telephoto end, βw denotes a lateral magnification of the third lens unit at the wide angle end, and β'w denotes a lateral magnification of the predetermined lens unit at the wide angle end, and here the predetermined lens unit is a lens unit which includes all lenses positioned on an image side of the third lens unit.

In conditional expression (18), a ratio of the focusing sensitivity at the telephoto end and the focusing sensitivity at the telephoto end is used. By satisfying conditional expression (18), a fluctuation in the focusing sensitivity at the telephoto end and as well as a fluctuation in the focusing sensitivity at the wide angle end are suppressed. Consequently, the amount of movement of the image plane with respect to the amount of movement of the lens does not vary largely according to the focusing state. As a result, it is possible to control the movement of the lens easily.

It is preferable that the following conditional expression (18') be satisfied instead of conditional expression (18).

$$0.8<|fct|/|fcw|<3.5 \quad (18')$$

It is more preferable that the following conditional expression (18") be satisfied instead of conditional expression (18).

$$0.9<|fct|/|fcw|<2.5 \quad (18'')$$

In the zoom lens of the present embodiment, it is preferable that the third lens unit include one negative lens.

By making such arrangement, it is possible to make the third lens unit small-sized and light-weight. In a case of carrying out focusing by the third lens unit, since it is possible to narrow a space necessary for the movement of lenses, it is possible to make the optical system small-sized. Moreover, since the lens to be moved is one lens, it is possible to carry out focusing at a high speed.

In a case of moving the third lens unit toward the object side, the distance between the third lens unit and the fourth lens unit becomes wide. Consequently, a magnification of an image on the image plane varies. However, when the third lens unit is moved toward the object side, a height of a chief light ray incident on the third lens unit becomes high. Consequently, the magnification of an image on the image plane varies.

The variation in magnification of an image in the latter is a variation that cancels the variation in magnification of an image in the former. In other words, it is possible to suppress the variation in magnification of an image at the time of focusing.

In the zoom lens of the present embodiment, it is preferable that the following conditional expression (19) be satisfied:

$$0<L12airt/Lt<0.2 \quad (19)$$

where,
L12airt denotes the air space between the first lens unit and the second lens unit at the telephoto end, and Lt denotes the overall length of the zoom lens at the telephoto end, and here the overall length is a distance from a lens surface nearest to object up to a paraxial image plane, and is a distance in a case in which no air conversion is carried out.

In conditional expression (19), a ratio of the predetermined air space at the telephoto end and the overall length of the zoom lens at the telephoto end is used.

By exceeding a lower limit value of conditional expression (19), it is possible to avoid a physical interference between the first lens unit and the second lens unit. By a value falling below an upper limit value of conditional expression (19), it is possible to secure a high zooming ratio while achieving small-sizing of the optical system at the telephoto end. Moreover, it is possible to suppress an increase in the air space between the first lens unit and the second lens unit. In this case, since it is possible suppress an increase in a height of an axial light ray that passes through the second lens unit, it is possible to suppress an occurrence of the spherical aberration.

It is preferable that the following conditional expression (19') be satisfied instead of conditional expression (19).

$$0.01 < L12air_t/Lt < 0.15 \quad (19')$$

It is more preferable that the following conditional expression (19") be satisfied instead of conditional expression (19).

$$0.015 < L12air_t/Lt < 0.12 \quad (19'')$$

In the zoom lens of the present embodiment, it is preferable that the first lens unit include an object-side negative lens which is nearest to object, and the following conditional expression (20) be satisfied:

$$0.6 < (r1nf + r1nb)/(r1nf - r1nb) < 4 \quad (20)$$

where, $r1nf$ denotes a radius of curvature of an object-side surface of the object-side negative lens, and $r1nb$ denotes a radius of curvature of an image-side surface of the object-side negative lens.

Conditional expression (20) is a conditional expression related to a shaping factor of the object-side negative lens. By exceeding a lower limit value of conditional expression (20), it is possible to suppress an increase in an outer diameter of the first lens unit. When a value falls below an upper limit value of conditional expression (20), it is possible to suppress an occurrence of the astigmatism.

It is preferable that the following conditional expression (20') be satisfied instead of conditional expression (20).

$$0.8 < (r1nf + r1nb)/(r1nf - r1nb) < 3 \quad (20')$$

It is more preferable that the following conditional expression (20") be satisfied instead of conditional expression (20).

$$1.0 < (r1nf + r1nb)/(r1nf - r1nb) < 2.6 \quad (20'')$$

In the zoom lens of the present embodiment, it is preferable that the first lens unit include an image-side positive lens which is nearest to image, and the following conditional expression (21) be satisfied:

$$-8 < (r1pf + r1pb)/(r1pf - r1pb) < 2 \quad (21)$$

where, $r1pf$ denotes a radius of curvature of an object-side surface of the image-side positive lens, and $r1pb$ denotes a radius of curvature of an image-side surface of the image-side positive lens.

Conditional expression (21) is a conditional expression related to a shaping factor of the image-side positive lens.

By satisfying conditional expression (21), it is possible to correct the spherical aberration favorably.

It is preferable that the following conditional expression (21') be satisfied instead of conditional expression (21).

$$-7 < (r1pf + r1pb)/(r1pf - r1pb) < 1.5 \quad (21')$$

It is more preferable that the following conditional expression (21") be satisfied instead of conditional expression (21).

$$-6 < (r1pf + r1pb)/(r1pf - r1pb) < 1 \quad (21'')$$

In the zoom lens of the present embodiment, it is preferable that the third lens unit include one negative lens, and the negative lens be the focusing lens, and a focusing lens move toward the object side at the time of focusing to an object at a close distance, and the following conditional expression (22) be satisfied:

$$0.1 < (r3ff + r3fb)/(r3ff - r3fb) < 10 \quad (22)$$

where, $r3ff$ denotes a radius of curvature of an object-side surface of the focusing lens, and $r3fb$ denotes a radius of curvature of an image-side surface of the focusing lens.

Conditional expression (22) is a conditional expression related to a shaping factor of the focusing lens. By satisfying conditional expression (22), it is possible to suppress a fluctuation in the spherical aberration at the time of focusing.

It is preferable that the following conditional expression (22') be satisfied instead of conditional expression (22).

$$0.15 < (r3ff + r3fb)/(r3ff - r3fb) < 7.5 \quad (22')$$

It is more preferable that the following conditional expression (22") be satisfied instead of conditional expression (22).

$$0.2 < (r3ff + r3fb)/(r3ff - r3fb) < 5.5 \quad (22'')$$

In the zoom lens of the present embodiment, it is preferable that the following conditional expression (23) be satisfied:

$$1.1 < L1/L1air < 4.00 \quad (23)$$

where,

L1 denotes the thickness on the optical axis of the first lens unit, and

L1air denotes a sum total of an air space on the optical axis in the first lens unit.

In conditional expression (23), a ratio of the thickness of the first lens unit and the sum total of the air space in the first lens unit is used.

By exceeding a lower limit value of conditional expression (23), it is possible to suppress an increase in the air space in the first lens unit. As a result, it is possible to correct the chromatic aberration of magnification and the astigmatism favorably while small-sizing the first lens unit.

By a value falling below an upper limit value of conditional expression (23), it is possible to provide an appropriate air space in the first lens unit. As a result, it is possible to suppress an occurrence of the astigmatism and an occurrence of the chromatic aberration of magnification while small-sizing the first lens unit.

It is preferable that the following conditional expression (23') be satisfied instead of conditional expression (23).

$$1.2 < L1/L1air < 3.0 \quad (23')$$

It is more preferable that the following conditional expression (23″) be satisfied instead of conditional expression (23).

$$1.3 < L1/L1air < 2.5 \quad (23″)$$

In the zoom lens of the present embodiment, it is preferable that the following conditional expression (24) be satisfied:

$$1.1 < L2/L2air < 20.0 \quad (24)$$

where,

L2 denotes the thickness on the optical axis of the second lens unit, and

L2air denotes a sum total of an air space on the optical axis in the second lens unit.

In conditional expression (24), a ratio of the thickness of the second lens unit and the sum total of the air space in the second lens unit is used.

By exceeding a lower limit value of conditional expression (24), it is possible to suppress an increase in the air space in the second lens unit. As a result, it is possible to correct the spherical aberration and the coma favorably while small-sizing the second lens unit.

By a value falling below an upper limit value of conditional expression (24), it is possible to provide an appropriate air space in the second lens unit. As a result, it is possible to suppress an occurrence of the coma while small-sizing the second lens unit.

It is preferable that the following conditional expression (24′) be satisfied instead of conditional expression (24).

$$1.6 < L2/L2air < 18.0 \quad (24′)$$

It is more preferable that the following conditional expression (24″) be satisfied instead of conditional expression (24).

$$1.8 < L2/L2air < 17.0 \quad (24″)$$

In the zoom lens of the present embodiment, it is preferable that the following conditional expression (25) be satisfied:

$$-0.60 < f1/L12airw < -0.20 \quad (25)$$

where,

L12airw denotes an air space between the first lens unit and the second lens unit at the wide angle end, and f1 denotes the focal length of the first lens unit.

In conditional expression (25), a ratio of the focal length of the first lens unit and the predetermined air space at the wide angle end is used.

By exceeding a lower limit value of conditional expression (25), it is possible to make the refractive power of the first lens unit large. Consequently, it is possible to make the angle of view wide. Moreover, since it is possible to widen the air space between the first lens unit and the second lens unit, it is possible to secure a high zooming ratio.

By a value falling below an upper limit value of conditional expression (25), the air space between the first lens unit and the second lens unit is suppressed from being widened at the wide angle end. Consequently, it is possible to shorten the overall length of the optical system. Moreover, since widening of the air space between the first lens unit and the second lens unit is suppressed, it is possible to suppress an increase in the height of an axial light ray that passes through the second lens unit. As a result, it is possible to suppress an occurrence of the spherical aberration.

It is preferable that the following conditional expression (25′) be satisfied instead of conditional expression (25).

$$-0.50 < f1/L12airw < -0.25 \quad (25′)$$

It is more preferable that the following conditional expression (25″) be satisfied instead of conditional expression (25).

$$-0.42 < f1/L12airw < -0.30 \quad (25″)$$

In the zoom lens of the present embodiment, it is preferable that the following conditional expression (26) be satisfied:

$$0.30 < f2/L12airw < 0.70 \quad (26)$$

where,

L12airw denotes the air space between the first lens unit and the second lens unit at the wide angle end, f2 denotes the focal length of the second lens unit.

In conditional expression (26), a ratio of the focal length of the second lens unit and the predetermined space at the wide angle end is used.

By exceeding a lower limit value of conditional expression (26), the air space between the first lens unit and the second lens unit is suppressed from being widened at the wide angle end. Consequently, it is possible to shorten the overall length of the optical system. Moreover, since widening of the air space between the first lens unit and the second lens unit is suppressed, it is possible to suppress an increase in the height of an axial light ray that passes through the second lens unit. As a result, it is possible to suppress an occurrence of the spherical aberration.

By a value falling below a lower limit value of conditional expression (26), the second lens unit does not become excessively small. Consequently, it is possible to correct the spherical aberration. Moreover, since it is possible to widen the air space between the first lens unit and the second lens unit, it is possible to secure a high zooming ratio.

It is preferable that the following conditional expression (26′) be satisfied instead of conditional expression (26).

$$0.32 < f2/L12airw < 0.60 \quad (26′)$$

It is more preferable that the following conditional expression (26″) be satisfied instead of conditional expression (26).

$$0.33 < f2/L12airw < 0.56 \quad (26″)$$

In the zoom lens of the present embodiment, it is preferable that the first lens unit include a plurality of lenses, and the plurality of lenses include at least two negative lenses and one positive lens.

By making such arrangement, it is possible to correct the astigmatism and the chromatic aberration of magnification which occur at the wide angle end, and the longitudinal chromatic aberration which occurs at the telephoto end.

In the zoom lens of the present embodiment, it is preferable that the second lens unit include an object-side lens component and an image-side lens component, and the following conditional expression (27) be satisfied:

$$-0.5 < f2f/f2b < 9 \quad (27)$$

where, f2f denotes a focal length of the object-side lens component, and f2b denotes a focal length of an image-side lens component, and here, the lens component is one of a single lens and a cemented lens.

In conditional expression (27), a ratio of the focal length of the object-side lens component and the focal length of the image-side lens component is used. By satisfying conditional expression (27), it is possible to correct the spherical aberration and the coma.

It is preferable that the following conditional expression (27') be satisfied instead of conditional expression (27).

$$-0.4<f2f/f2b<8 \tag{27'}$$

It is more preferable that the following conditional expression (27") be satisfied instead of conditional expression (27).

$$-0.3<f2f/f2b<7 \tag{27"}$$

In the zoom lens of the present embodiment, it is preferable that the first lens unit move from the object side to the image side only, at the time of zooming.

By making such arrangement, the movement of the lens unit at the time of zooming becomes a monotonous movement. Consequently, it is possible to simplify a mechanism that moves the lens unit, and moreover, it is possible to make the control of the movement easy.

The first lens unit can also move toward the object side after moving from the object side to the image side at the time of zooming.

In the zoom lens of the present embodiment, it is preferable that the following conditional expression (28) be satisfied:

$$-80\%<DTw<-8\% \tag{28}$$

where,

DTw denotes an amount of distortion at the maximum image height at the wide angle end.

By satisfying conditional expression (28), it is possible to make a diameter of the first lens unit small. Moreover, it is possible to secure a wide angle of view.

It is preferable that the following conditional expression (28') be satisfied instead of conditional expression (28).

$$-75\%<DTw<-15\% \tag{28'}$$

It is more preferable that the following conditional expression (28") be satisfied instead of conditional expression (28).

$$-70\%<DTw<-20\% \tag{28"}$$

In the zoom lens of the present embodiment, it is preferable that the third lens unit include one negative lens, and the fourth lens unit include one positive lens, and the following conditional expressions (29), (30), and (31) be satisfied:

$$nd3<1.7 \tag{29}$$

$$nd4<1.7 \tag{30}$$

$$|vd3-vd4|<33 \tag{31}$$

where, nd3 denotes a refractive index for a d-line of the negative lens in the third lens unit, vd3 denotes Abbe number for the negative lens in the third lens unit, nd4 denotes a refractive index for the d-line of the positive lens in the fourth lens unit, and vd4 denotes Abbe number for the positive lens in the fourth lens unit.

By satisfying conditional expressions (29) and (30), it is possible to suppress both the refractive index of the negative lens (hereinafter, referred to as 'third lens') in the third lens unit and the refractive index of the positive lens (hereinafter, referred to as 'fourth lens') in the fourth lens unit from becoming excessively high. As a result, even when decentering occurs between the third lens and the fourth lens, it is possible to suppress a degradation of imaging performance due to decentering.

Moreover, since it is possible to suppress the degradation of imaging performance due to decentering, manufacturing of a lens unit becomes easy and also it is possible to make the lens unit compact. A lens unit includes a zoom lens and a lens barrel.

Moreover, since it is possible to suppress the degradation of imaging performance due to decentering, it is possible to bring the third lens and the fourth lens closer. Consequently, it is possible to make the optical system compact.

By satisfying conditional expression (31), it is possible to correct favorably the chromatic aberration that occurs in the third lens unit. Consequently, it is possible to reduce a load of aberration correction on a predetermined lens unit. As a result, it is possible to form a compact optical system.

It is preferable that the following conditional expression (29') be satisfied instead of conditional expression (29).

$$nd3<1.67 \tag{29'}$$

It is more preferable that the following conditional expression (29") be satisfied instead of conditional expression (29).

$$nd3<1.64 \tag{29"}$$

It is preferable that the following conditional expression (30') be satisfied instead of conditional expression (30).

$$nd4<1.60 \tag{30'}$$

It is more preferable that the following conditional expression (30") be satisfied instead of conditional expression (30).

$$nd4<1.55 \tag{30"}$$

Moreover, it is preferable that both nd3 and nd4 exceed 1.5, as it is easy to suppress an aberration of the respective lenses.

It is preferable that the following conditional expression (31') be satisfied instead of conditional expression (31).

$$|vd3-vd4|<32.0 \tag{31'}$$

It is more preferable that the following conditional expression (31") be satisfied instead of conditional expression (31).

$$|vd3-vd4|<10 \tag{31"}$$

In the zoom lens of the present embodiment, it is preferable that the second lens unit include a negative lens, and an object-side surface of the negative lens in the second lens unit is convex toward the object side.

By making such arrangement, it is possible to correct the spherical aberration. As a result, it is possible to secure a high imaging performance from the wide angle end up to the telephoto end.

In the zoom lens of the present embodiment, it is preferable that the second lens unit include in order from the object side, a positive lens and a cemented lens, and the cemented lens includes a negative lens and a positive lens, and an object-side surface of the negative lens in the cemented lens is convex toward the object side.

By disposing the positive lens on the object side, it is possible to lower a height of a light ray incident on the cemented lens. Consequently, it is possible to correct the spherical aberration and the coma effectively by the negative lens in the cemented lens. Moreover, it is possible to correct the chromatic aberration by the cemented lens. Consequently, it is possible to secure a high imaging performance from the wide angle end up to the telephoto end.

In the zoom lens of the present embodiment, it is preferable that the following conditional expression (32) be satisfied:

$$-35 < Lt/(y \times \tan 2\omega w) < -2 \quad (32)$$

where,

Lt denotes the overall length of the zoom lens at the telephoto end, y denotes the maximum image height at an image forming surface in the zoom lens, and ωw denotes the half angle of view at the wide angle end of the zoom lens, and here the overall length is a distance from a lens surface nearest to object up to a paraxial image plane, and is a distance in a case in which no air conversion is carried out.

Conditional expression (32) is a conditional expression related to the overall length of the zoom lens. In conditional expression (32), the overall length of the zoom lens is normalized by the maximum image height of the image forming surface in the zoom lens, and a result of normalization is divided further by a tangent of the angle of view of the zoom lens.

By exceeding a lower limit value of conditional expression (32), it is possible to suppress an increase in the overall length of the zoom lens at the telephoto end. As a result, it is possible to make the zoom lens compact. By a value falling below an upper limit value of conditional expression (32), it is possible to secure a wide angle of view at the wide angle end.

It is preferable that the following conditional expression (32') be satisfied instead of conditional expression (32).

$$-30 < Lt/(y \times \tan 2\omega w) < -3 \quad (32')$$

It is more preferable that the following conditional expression (32") be satisfied instead of conditional expression (32).

$$-24 < Lt/(y \times \tan 2\omega w) < -4 \quad (32")$$

An image pickup apparatus of the present embodiment includes the abovementioned zoom lens, and an image pickup element which converts an image formed by the zoom lens to an electric signal.

According to the image pickup apparatus of the present embodiment, it is possible to achieve a wide angle image with a high resolution, while the image pickup apparatus being small-sized.

The abovementioned zoom lens and the image pickup apparatus may satisfy a plurality of arrangements simultaneously. Making such arrangement is preferable for achieving a favorable zoom lens and image pickup apparatus. Moreover, combinations of preferable arrangements are arbitrary. For each conditional expression, only the upper limit value or the lower limit value of a numerical range of a conditional expression further restricted, may be limited.

Examples of zoom lenses will be described below in detail by referring to the accompanying diagrams. However, the present invention is not restricted to the examples described below.

Lens cross-sectional views of each example will be described below.

FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, FIG. 17A, and FIG. 18A are lens cross-sectional views at a wide angle end, FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, FIG. 15B, FIG. 16B, FIG. 17B, and FIG. 18B are lens cross-sectional views in an intermediate focal length state, and FIG. 1C, FIG. 2C, FIG. 3C, FIG. 4C, FIG. 5C, FIG. 6C, FIG. 7C, FIG. 8C, FIG. 9C, FIG. 10C, FIG. 11C, FIG. 12C, FIG. 13C, FIG. 14C, FIG. 15C, FIG. 16C, FIG. 17C, and FIG. 18C are lens cross-sectional views at a telephoto end.

Aberration diagrams of each example will be described below.

FIG. 19A, FIG. 20A, FIG. 21A, FIG. 22A, FIG. 23A, FIG. 24A, FIG. 25A, FIG. 26A, FIG. 27A, FIG. 28A, FIG. 29A, FIG. 30A, FIG. 31A, FIG. 32A, FIG. 33A, FIG. 34A, FIG. 35A, and FIG. 36A show a spherical aberration (SA) at the wide angle end.

FIG. 19B, FIG. 20B, FIG. 21B, FIG. 22B, FIG. 23B, FIG. 24B, FIG. 25B, FIG. 26B, FIG. 27B, FIG. 28B, FIG. 29B, FIG. 30B, FIG. 31B, FIG. 32B, FIG. 33B, FIG. 34B, FIG. 35B, and FIG. 36B show an astigmatism (AS) at the wide angle end.

FIG. 19C, FIG. 20C, FIG. 21C, FIG. 22C, FIG. 23C, FIG. 24C, FIG. 25C, FIG. 26C, FIG. 27C, FIG. 28C, FIG. 29C, FIG. 30C, FIG. 31C, FIG. 32C, FIG. 33C, FIG. 34C, FIG. 35C, and FIG. 36C show a distortion (DT) at the wide angle end.

FIG. 19D, FIG. 20D, FIG. 21D, FIG. 22D, FIG. 23D, FIG. 24D, FIG. 25D, FIG. 26D, FIG. 27D, FIG. 28D, FIG. 29D, FIG. 30D, FIG. 31D, FIG. 32D, FIG. 33D, FIG. 34D, FIG. 35D, and FIG. 36D show a chromatic aberration of magnification (CC) at the wide angle end.

FIG. 19E, FIG. 20E, FIG. 21E, FIG. 22E, FIG. 23E, FIG. 24E, FIG. 25E, FIG. 26E, FIG. 27E, FIG. 28E, FIG. 29E, FIG. 30E, FIG. 31E, FIG. 32E, FIG. 33E, FIG. 34E, FIG. 35E, and FIG. 36E show a spherical aberration (SA) in the intermediate focal length state.

FIG. 19F, FIG. 20F, FIG. 21F, FIG. 22F, FIG. 23F, FIG. 24F, FIG. 25F, FIG. 26F, FIG. 27F, FIG. 28F, FIG. 29F, FIG. 30F, FIG. 31F, FIG. 32F, FIG. 33F, FIG. 34F, FIG. 35F, and FIG. 36F show an astigmatism (AS) in the intermediate focal length state.

FIG. 19G, FIG. 20G, FIG. 21G, FIG. 22G, FIG. 23G, FIG. 24G, FIG. 25G, FIG. 26G, FIG. 27G, FIG. 28G, FIG. 29G, FIG. 30G, FIG. 31G, FIG. 32G, FIG. 33G, FIG. 34G, FIG. 35G, and FIG. 36G show a distortion (DT) in the intermediate focal length state.

FIG. 19H, FIG. 20H, FIG. 21H, FIG. 22H, FIG. 23H, FIG. 24H, FIG. 25H, FIG. 26H, FIG. 27H, FIG. 28H, FIG. 29H, FIG. 30H, FIG. 31H, FIG. 32H, FIG. 33H, FIG. 34H, FIG. 35H, and FIG. 36H show a chromatic aberration of magnification (CC) in the intermediate focal length state.

FIG. 19I, FIG. 20I, FIG. 21I, FIG. 22I, FIG. 23I, FIG. 24I, FIG. 25I, FIG. 26I, FIG. 27I, FIG. 28I, FIG. 29I, FIG. 30I, FIG. 31I, FIG. 32I, FIG. 33I, FIG. 34I, FIG. 35I, and FIG. 36I show a spherical aberration (SA) at the telephoto end.

FIG. 19J, FIG. 20J, FIG. 21J, FIG. 22J, FIG. 23J, FIG. 24J, FIG. 25J, FIG. 26J, FIG. 27J, FIG. 28J, FIG. 29J, FIG. 30J, FIG. 31J, FIG. 32J, FIG. 33J, FIG. 34J, FIG. 35J, and FIG. 36J show an astigmatism (AS) at the telephoto end.

FIG. 19K, FIG. 20K, FIG. 21K, FIG. 22K, FIG. 23K, FIG. 24K, FIG. 25K, FIG. 26K, FIG. 27K, FIG. 28K, FIG. 29K, FIG. 30K, FIG. 31K, FIG. 32K, FIG. 33K, FIG. 34K, FIG. 35K, and FIG. 36K show a distortion (DT) at the telephoto end.

FIG. 19L, FIG. 20L, FIG. 21L, FIG. 22L, FIG. 23L, FIG. 24L, FIG. 25L, FIG. 26L, FIG. 27L, FIG. 28L, FIG. 29L, FIG. 30L, FIG. 31L, FIG. 32L, FIG. 33L, FIG. 34L, FIG.

Figure 36A:
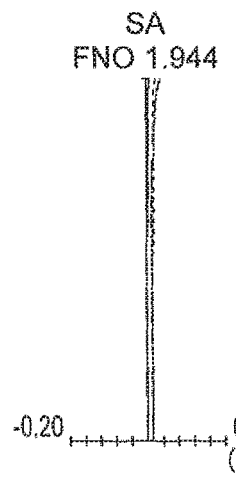
FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L are aberration diagrams of the zoom lens according to the example 18, at the time of focusing to an object at infinity.
Figure 36B:
Figure 36C:
Figure 36D:
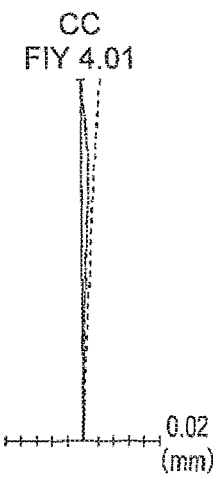
Figure 36E:
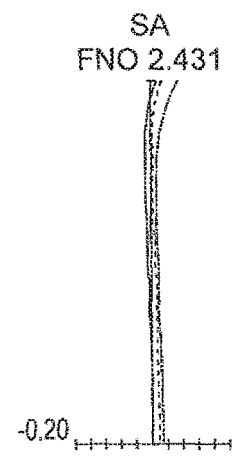
Figure 36F:
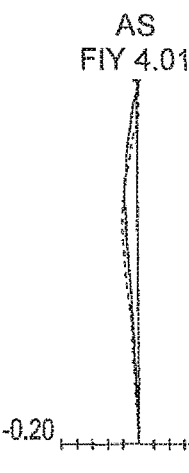
Figure 36G:
Figure 36H:
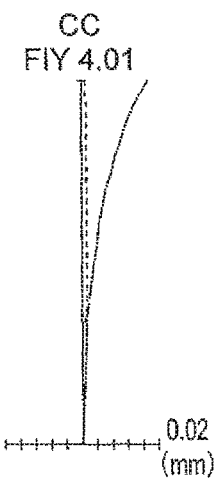
Figure 36I:
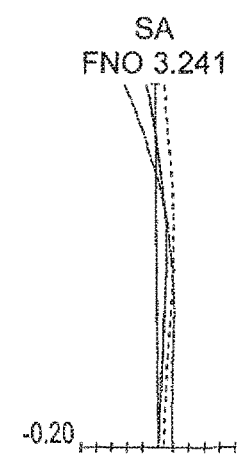
Figure 36J:
Figure 36K:
Figure 36L:
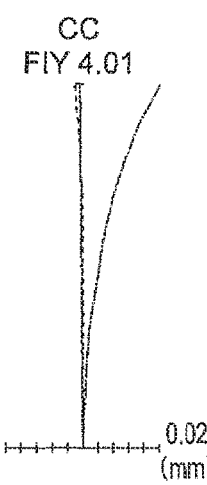

35L, and FIG. 36L show a chromatic aberration of magnification (CC) at the telephoto end.

The lens cross-sectional views are lens cross-sectional views at the time of focusing to an object at infinity. The aberration diagrams are aberration diagrams at the time of focusing to the object at infinity.

A first lens unit is denoted by G1, a second lens unit is denoted by G2, a third lens unit is denoted by G3, a fourth lens unit is denoted by G4, a fifth lens unit is denoted by G5, an aperture stop is denoted by S, and an image plane (image pickup surface) is denoted by I. Moreover, a cover glass C1 and a cover glass C2 are disposed between the fourth lens unit G4 and the image plane I or between the fifth lens unit G5 and the image plane I.

A zoom lens of an example 1 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a biconcave negative lens L7.

The fourth lens unit G4 includes a biconvex positive lens L8.

At a time of zooming from a wide angle end to a telephoto end, the first lens unit G1 moves toward an image side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of six surfaces which are, both surfaces of the biconvex positive lens L4, both surfaces of the biconcave negative lens L7, and both surfaces of the biconvex positive lens L8.

A zoom lens of an example 2 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a biconvex positive lens L8.

At a time of zooming from a wide angle end to a telephoto end, the first lens unit G1 moves toward an image side, the second lens unit G2 moves toward an object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of 10 surfaces which are, both surfaces of the biconcave negative lens L2, both surfaces of the biconvex positive lens L3, both surfaces of the biconvex positive lens L4, both surfaces of the negative meniscus lens L7, and both surfaces of the biconvex positive lens L8.

A zoom lens of an example 3 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a positive meniscus lens L4 having a convex surface directed toward the object side, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a biconvex positive lens L8.

At a time of zooming from a wide angle end to a telephoto end, the first lens unit G1 moves toward an image side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of 10 surfaces which are, both surfaces of the biconcave negative lens L2, both surfaces of the biconvex positive lens L3, both surfaces of the positive meniscus lens L4, both surfaces of the negative meniscus lens L7, and both surfaces of the biconvex positive lens L8.

A zoom lens of an example 4 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a positive meniscus lens L8 having a convex surface directed toward the object side.

At a time of zooming from a wide angle end to a telephoto end, the first lens unit G1 moves toward an image side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of six surfaces which are, both surfaces of the biconvex positive lens L4, both surfaces of the negative meniscus lens L7, and both surfaces of the positive meniscus lens L8.

A zoom lens of an example 5 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a positive meniscus lens L8 having a convex surface directed toward the object side.

At a time of zooming from a wide angle end to a telephoto end, the first lens unit G1 moves toward an image side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of six surfaces which are, both surfaces of the positive meniscus lens L4, both surfaces of the negative meniscus lens L7, and both surfaces of the positive meniscus lens L8.

A zoom lens of an example 6 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a positive meniscus lens L4 having a convex surface directed toward the object side, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a biconvex positive lens L8.

At a time of zooming from a wide angle end to a telephoto end, the first lens unit G1 moves toward an image side, the second lens unit G2 moves toward the object side, the third lens unit G3 moves toward the object side, and the fourth lens unit G4 is fixed.

At a time of focusing from an object at infinity to an object at a close distance, the third lens unit G3 moves toward the image side.

An aspheric surface is provided to a total of 10 surfaces which are, both surfaces of the biconcave negative lens L2, both surfaces of the biconvex positive lens L3, both surfaces of the positive meniscus lens L4, both surfaces of the negative meniscus lens L7, and both surfaces of the biconvex positive lens L8.

A zoom lens of an example 7 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a positive meniscus lens L4 having a convex surface directed toward the object side, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a positive meniscus lens L8 having a convex surface directed toward an image side.

At a time of zooming from a wide angle end to a telephoto end, the first lens unit G1 moves toward the image side, the second lens unit G2 moves toward the object side, the third lens unit G3, after moving toward the image side, moves toward the object side, and the fourth lens unit G4 is fixed.

At a time of focusing from an object at infinity to an object at a close distance, the third lens unit G3 moves toward the image side.

An aspheric surface is provided to a total of 10 surfaces which are, both surfaces of the biconcave negative lens L2, both surfaces of the biconvex positive lens L3, both surfaces of the positive meniscus lens L4, both surfaces of the negative meniscus lens L7, and both surfaces of the positive meniscus lens L8.

A zoom lens of an example 8 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a biconvex positive lens L8.

At a time of zooming from a wide angle end to a telephoto end, the first lens unit G1, after moving toward an image side, moves toward the object side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of eight surfaces which are, both surfaces of the biconcave negative lens L2, both surfaces of the biconvex positive lens L4, both surfaces of the negative meniscus lens L7, and both surfaces of the biconvex positive lens L8.

A zoom lens of an example 9 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a positive meniscus lens L4 having a convex surface directed toward the object side, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a biconvex positive lens L8.

At a time of zooming from a wide angle end to a telephoto end, the first lens unit G1 moves toward an image side, a second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of 10 surfaces which are, both surfaces of the biconcave negative lens L2, both surfaces of the biconvex positive lens L3, both surfaces of the positive meniscus lens L4, both surfaces of the negative meniscus lens L7, and both surfaces of the biconvex positive lens L8.

A zoom lens of an example 10 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a biconcave negative lens L7.

The fourth lens unit G4 includes a biconvex positive lens L8.

At a time of zooming from a wide angle end to a telephoto end, the first lens unit G1 moves toward an image side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of eight surfaces which are, both surfaces of the biconcave negative lens L2, both surfaces of the biconvex positive lens L4, both surfaces of the biconcave negative lens L7, and both surfaces of the biconvex positive lens L8.

A zoom lens of an example 11 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a positive meniscus lens L8 having a convex surface directed toward an image side.

At a time of zooming from a wide angle end to a telephoto end, the first lens unit G1 moves toward the image side, the second lens unit G2 moves toward the object side, the third lens unit G3 moves toward the object side, and the fourth lens unit G4 is fixed.

At a time of focusing from an object at infinity to an object at a close distance, the third lens unit G3 moves toward the image side.

An aspheric surface is provided to a total of six surfaces which are, both surfaces of the biconvex positive lens L4, both surfaces of the negative meniscus lens L7, and both surfaces of the positive meniscus lens L8.

A zoom lens of an example 12 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a biconvex positive lens L4, a positive meniscus lens L5 having a convex surface directed toward the object side, a negative meniscus lens L6 having a convex surface directed toward the object side, and a biconvex positive lens L7. Here, the positive meniscus lens L5 and the negative meniscus lens L6 are cemented.

The third lens unit G3 includes a negative meniscus lens L8 having a convex surface directed toward the object side.

The fourth lens unit G4 includes a biconvex positive lens L9.

At a time of zooming from a wide angle end to a telephoto end, the first lens unit G1 moves toward an image side, the second lens unit G2 moves toward the object side, the third lens unit G3 moves toward the object side, and the fourth lens unit G4 is fixed.

At a time of focusing from an object at infinity to an object at a close distance, the third lens unit G3 moves toward the image side.

An aspheric surface is provided to a total of 10 surfaces which are, both surfaces of the biconcave negative lens L2, both surfaces of the biconvex positive lens L3, both surfaces of the biconvex positive lens L4, both surfaces of the negative meniscus lens L8, and both surfaces of the biconvex positive lens L9.

A zoom lens of an example 13 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a biconvex positive lens L5, a negative meniscus lens L6 having a convex surface directed toward the object side, and a biconvex positive lens L7. Here, the negative meniscus lens L6 and the biconvex positive lens L7 are cemented.

The third lens unit G3 includes a biconcave negative lens L8.

The fourth lens unit G4 includes a positive meniscus lens L9 having a convex surface directed toward an image side.

At a time of zooming from a wide angle end to a telephoto end, the first lens unit G1 moves toward the image side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of six surfaces which are, both surfaces of the biconvex positive lens L4, both surfaces of the biconcave negative lens L8, and both surfaces of the positive meniscus lens L9.

A zoom lens of an example 14 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a positive meniscus lens L4 having a convex surface directed toward the object side, a biconvex positive lens L5, and a negative meniscus lens L6 having a convex surface directed toward an image side. Here, the biconvex positive lens L5 and the negative meniscus lens L6 are cemented.

The third lens unit G3 includes a negative meniscus lens L7 having a convex surface directed toward the object side.

The fourth lens unit G4 includes a biconvex positive lens L8.

At a time of zooming from a wide angle end to a telephoto end, the first lens unit G1 moves toward the image side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of 10 surfaces which are, both surfaces of the biconcave negative lens L2, both surfaces of the biconvex positive lens L3, both surfaces of the positive meniscus lens L4, both surfaces of the negative meniscus lens L7, and both surfaces of the biconvex positive lens L8.

A zoom lens of an example 15 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a biconcave negative lens L5, and a biconvex positive lens L6. Here, the biconvex positive lens L4 and the biconcave negative lens L5 are cemented.

The third lens unit G3 includes a biconcave negative lens L7.

The fourth lens unit G4 includes a biconvex positive lens L8.

At a time of zooming from a wide angle end to a telephoto end, the first lens unit G1 moves toward an image side, the second lens unit G2 moves toward the object side, the third lens unit G3 moves toward the object side, and the fourth lens unit G4 is fixed.

At a time of focusing from an object at infinity to an object at a close distance, the third lens unit G3 moves toward the image side.

An aspheric surface is provided to a total of seven surfaces which are, an object-side surface of the biconvex positive lens L4, both surfaces of the biconvex positive lens L6, both surfaces of the biconcave negative lens L7, and both surfaces of the biconvex positive lens L8.

A zoom lens of an example 16 includes in order from an object side, a first lens unit G1 having a negative refractive power, a second lens unit G2 having a positive refractive power, a third lens unit G3 having a negative refractive power, a fourth lens unit G4 having a positive refractive power, and a fifth lens unit G5 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a biconvex positive lens L3.

The second lens unit G2 includes a positive meniscus lens L4 having a convex surface directed toward the object side, a negative meniscus lens L5 having a convex surface directed toward an image side, and a biconvex positive lens L6. Here, the negative meniscus lens L5 and the biconvex positive lens L6 are cemented.

The third lens unit G3 includes a negative meniscus lens L7 having a convex surface directed toward the object side.

The fourth lens unit G4 includes a biconvex positive lens L8.

The fifth lens unit G5 includes a biconvex positive lens L9.

At a time of zooming from a wide angle end to a telephoto end, the first lens unit G1 moves toward the image side, the second lens unit G2 moves toward the object side, the third lens unit G3 moves toward the object side, the fourth lens unit G4, after moving toward the object side, moves toward the image side, and the fifth lens unit G5 is fixed.

At a time of focusing from an object at infinity to an object at a close distance, the third lens unit G3 moves toward the image side.

An aspheric surface is provided to a total of 10 surfaces which are, both surfaces of the biconcave negative lens L2, both surfaces of the biconvex positive lens L3, both surfaces of the positive meniscus lens L4, both surfaces of the negative meniscus lens L7, and both surfaces of the biconvex positive lens L8.

A zoom lens of an example 17 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, a biconvex positive lens L6, and a biconvex positive lens L7. Here, the negative meniscus lens L5 and the biconvex positive lens L6 are cemented.

The third lens unit G3 includes a biconcave negative lens 8.

The fourth lens unit G4 includes a biconvex positive lens L9.

At a time of zooming from a wide angle end to a telephoto end, the first lens unit G1 moves toward an image side, the second lens unit G2 moves toward the object side, the third lens unit G3, after moving toward the object side, moves toward the image side, and the fourth lens unit G4 is fixed.

At a time of focusing from an object at infinity to an object at a close distance, the third lens unit G3 moves toward the image side.

An aspheric surface is provided to a total of six surfaces which are, both surfaces of the biconvex positive lens L4, both surfaces of the biconcave negative lens L8, and both surfaces of the biconvex positive lens L9.

A zoom lens of an example 18 includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop S is disposed between the first lens unit G1 and the second lens unit G2.

The first lens unit G1 includes a negative meniscus lens L1 having a convex surface directed toward the object side, a biconcave negative lens L2, a positive meniscus lens L3 having a convex surface directed toward the object side, and a negative meniscus lens L4 having a convex surface directed toward an image side.

The second lens unit G2 includes a biconvex positive lens L5, a negative meniscus lens L6 having a convex surface directed toward the object side, and a biconvex positive lens L7. Here, the negative meniscus lens L6 and the biconvex positive lens L7 are cemented.

The third lens unit G3 includes a biconcave negative lens L8.

The fourth lens unit G4 includes a biconvex positive lens L9.

At a time of zooming from a wide angle end to a telephoto end, the first lens unit G1 moves toward the image side, the second lens unit G2 moves toward the object side, the third lens unit G3, after moving toward the object side, moves toward the image side, and the fourth lens unit G4 is fixed.

At a time of focusing from an object at infinity to an object at a close distance, the negative meniscus lens L4 in the first lens unit G1 moves toward the object side.

An aspheric surface is provided to a total of six surfaces which are, both surfaces of the biconvex positive lens L5, both surfaces of the biconcave negative lens L8, and both surfaces of the biconvex positive lens L9.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and *denotes an aspherical surface.

In Zoom data, WE denotes a wide angle end, ST denotes a intermediate focal length state, TE denotes a telephoto end. f denotes a focal length of the entire system, FNO. denotes an F number, ω denotes a half angle of view, IH denotes an image height, BF denotes a back focus, LTL denotes a lens total length of the optical system. Further, back focus is a unit which is expressed upon air conversion of a distance from a rearmost lens surface to a paraxial image surface. The lens total length is a distance from a frontmost lens surface to the rearmost lens surface plus back focus. In Unit focal length, each of f1, f2 . . . is a focal length of each lens unit.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . .

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspherical surface coefficients, 'e-n' (where, n is an integral number) indicates '$10^{-n}$'. Moreover, these symbols are commonly used in the following numerical data for each example.

Example 1

| | | Unit mm | | |
|---|---|---|---|---|
| | | Surface data | | |
| Surface no. | r | d | nd | vd |
| Object plane | ∞ | ∞ | | |
| 1 | 115.244 | 1.20 | 1.81600 | 46.62 |
| 2 | 9.050 | 6.46 | | |
| 3 | −26.934 | 1.00 | 1.65160 | 58.55 |
| 4 | 21.191 | 1.50 | | |
| 5 | 20.344 | 2.50 | 1.89286 | 20.36 |
| 6 | 65.066 | Variable | | |
| 7(Stop) | ∞ | 0.50 | | |
| 8* | 8.865 | 3.58 | 1.74320 | 49.34 |
| 9* | −37.387 | 0.97 | | |
| 10 | 21.431 | 0.80 | 2.00100 | 29.13 |
| 11 | 6.094 | 4.05 | 1.43875 | 94.66 |
| 12 | −11.401 | Variable | | |
| 13* | −39.154 | 0.80 | 1.53071 | 55.69 |
| 14* | 14.001 | Variable | | |
| 15* | 15.009 | 1.50 | 1.53071 | 55.69 |
| 16* | −66.936 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

8th surface
k = −0.073
A4 = −1.15189e−04, A6 = 1.85692e−07, A8 = −4.07128e−09
9th surface
k = 0.000
A4 = 2.30009e−04, A6 = −4.84996e−07, A8 = 2.84944e−09
13th surface
k = 0.000
A4 = −2.82008e−04, A6 = 2.32231e−05
14th surface
k = 0.000
A4 = −7.12837e−04, A6 = 2.19498e−05
15th surface
k = 0.000
A4 = −3.52012e−04, A6 = −2.50287e−05
16th surface
k = 0.000
A4 = 3.52271e−04, A6 = −4.65822e−06

Zoom data
Zoom ratio 3.50

| | WE | ST | TE |
|---|---|---|---|
| f | 3.53 | 7.01 | 12.35 |
| FNO. | 1.85 | 2.29 | 2.94 |
| 2ω | 148.07 | 62.08 | 34.57 |
| IH | 4.01 | 4.01 | 4.01 |
| BF(in air) | 3.73 | 3.73 | 3.73 |
| LTL(in air) | 59.37 | 47.17 | 45.25 |
| d6 | 24.98 | 8.93 | 1.51 |
| d12 | 2.20 | 5.48 | 11.28 |
| d14 | 3.60 | 4.17 | 3.87 |

Unit focal length

| f1 = −8.73 | f2 = 11.08 | f3 = −19.33 | f4 = 23.25 |
|---|---|---|---|

Example 2

| | | Unit mm | | |
|---|---|---|---|---|
| | | Surface data | | |
| Surface no. | r | d | nd | vd |
| Object plane | ∞ | ∞ | | |
| 1 | 85.638 | 1.40 | 1.65160 | 58.55 |
| 2 | 8.000 | 6.88 | | |
| 3* | −40.057 | 1.60 | 1.53071 | 55.69 |
| 4* | 8.000 | 2.16 | | |
| 5* | 23.822 | 2.45 | 1.63493 | 23.89 |
| 6* | −66.569 | Variable | | |
| 7 (Stop) | ∞ | 0.50 | | |
| 8* | 9.546 | 2.56 | 1.85400 | 40.39 |
| 9* | −598.662 | 1.55 | | |
| 10 | 17.341 | 0.85 | 2.00069 | 25.46 |
| 11 | 5.756 | 4.39 | 1.45650 | 90.27 |
| 12 | −14.055 | Variable | | |
| 13* | 85.891 | 0.85 | 1.53071 | 55.69 |
| 14* | 9.071 | Variable | | |
| 15* | 13.277 | 2.86 | 1.53071 | 55.69 |
| 16* | −13.247 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

3rd surface
k = 0.000
A4 = 7.67638e−05, A6 = −2.50591e−06
4th surface
k = −0.128
A4 = −2.48684e−04, A6 = −7.24288e−06
5th surface
k = 0.000
A4 = −9.65078e−06, A6 = −2.91069e−06
6th surface
k = 0.000
A4 = −6.27705e−05, A6 = −1.97747e−06
8th surface
k = 0.000
A4 = −4.20754e−05, A6 = 1.60369e−08
9th surface
k = 0.000
A4 = 1.38009e−04, A6 = −5.03704e−08
13th surface
k = 0.000
A4 = −1.15901e−03, A6 = 1.53246e−05
14th surface
k = 0.000
A4 = −1.06286e−03, A6 = 7.08004e−06
15th surface
k = 0.000
A4 = 3.75300e−04, A6 = 7.09008e−10
16th surface
k = 0.000
A4 = 1.15059e−03, A6 = −9.39135e−06, A8 = 9.13311e−08

Zoom data
Zoom ratio 3.50

| | WE | ST | TE |
|---|---|---|---|
| f | 3.43 | 6.42 | 12.01 |
| FNO. | 1.84 | 2.46 | 3.27 |
| 2ω | 131.97 | 66.67 | 35.37 |
| IH | 4.01 | 4.01 | 4.01 |
| BF (in air) | 3.73 | 3.73 | 3.73 |
| LTL (in air) | 59.36 | 53.86 | 52.16 |
| d6 | 21.38 | 9.93 | 1.50 |

-continued

Unit mm

| | | | |
|---|---|---|---|
| d12 | 2.40 | 4.14 | 11.69 |
| d14 | 3.80 | 8.01 | 7.19 |

Unit focal length

| | | | |
|---|---|---|---|
| f1 = −8.09 | f2 = 11.87 | f3 = −19.18 | f4 = 12.98 |

Example 3

Unit mm

Surface data

| Surface no. | r | d | nd | vd |
|---|---|---|---|---|
| Object plane | ∞ | ∞ | | |
| 1 | 106.833 | 1.40 | 1.72916 | 54.68 |
| 2 | 10.000 | 5.71 | | |
| 3* | −37.476 | 1.60 | 1.53071 | 55.69 |
| 4* | 8.700 | 2.55 | | |
| 5* | 25.907 | 2.74 | 1.63493 | 23.89 |
| 6* | −77.885 | Variable | | |
| 7 (Stop) | ∞ | 0.50 | | |
| 8* | 7.666 | 2.44 | 1.85400 | 40.39 |
| 9* | 238.702 | 0.98 | | |
| 10 | 25.110 | 0.85 | 2.00100 | 29.13 |
| 11 | 4.842 | 3.72 | 1.49700 | 81.61 |
| 12 | −13.399 | Variable | | |
| 13* | 459.996 | 0.85 | 1.53071 | 55.69 |
| 14* | 13.913 | Variable | | |
| 15* | 12.918 | 1.65 | 1.53071 | 55.69 |
| 16* | −71.557 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

3rd surface
k = 0.000
A4 = 1.21078e−04, A6 = −1.49989e−06
4th surface
k = −1.505
A4 = 3.64113e−04, A6 = −4.31785e−06
5th surface
k = 0.000
A4 = 1.44294e−04, A6 = −2.58598e−06
6th surface
k = 0.000
A4 = 1.44117e−05, A6 = −1.92182e−06
8th surface
k = 0.000
A4 = −7.74716e−05, A6 = −1.84248e−07
9th surface
k = 0.000
A4 = 1.84935e−04, A6 = 1.05261e−07
13th surface
k = 0.000
A4 = −5.44665e−04, A6 = 2.08158e−05
14th surface
k = 0.000
A4 = −3.75204e−04, A6 = 1.15393e−05
15th surface
k = 0.000
A4 = 1.32007e−03, A6 = 2.07288e−05
16th surface
k = 0.000
A4 = 2.10795e−03, A6 = 4.52739e−05

-continued

Unit mm

Zoom data
Zoom ratio 3.50

| | WE | ST | TE |
|---|---|---|---|
| f | 3.43 | 6.42 | 12.00 |
| FNO. | 2.03 | 2.60 | 3.43 |
| 2ω | 131.02 | 66.67 | 35.30 |
| IH | 4.01 | 4.01 | 4.01 |
| BF (in air) | 3.73 | 3.73 | 3.73 |
| LTL (in air) | 59.36 | 49.97 | 46.97 |
| d6 | 24.44 | 10.56 | 1.50 |
| d12 | 2.40 | 4.04 | 11.28 |
| d14 | 3.80 | 6.65 | 5.47 |

Unit focal length

| | | | |
|---|---|---|---|
| f1 = −9.08 | f2 = 11.64 | f3 = −27.05 | f4 = 20.76 |

Example 4

Unit mm

Surface data

| Surface no. | r | d | nd | vd |
|---|---|---|---|---|
| Object plane | ∞ | ∞ | | |
| 1 | 32.210 | 1.20 | 1.88300 | 40.76 |
| 2 | 9.749 | 6.76 | | |
| 3 | −27.638 | 1.00 | 1.72916 | 54.68 |
| 4 | 12.398 | 2.00 | | |
| 5 | 16.137 | 3.00 | 1.92286 | 18.90 |
| 6 | 41.450 | Variable | | |
| 7 (Stop) | ∞ | 0.50 | | |
| 8* | 8.128 | 3.56 | 1.74320 | 49.34 |
| 9* | −69.100 | 0.63 | | |
| 10 | 32.311 | 0.80 | 1.90366 | 31.32 |
| 11 | 5.463 | 3.62 | 1.49700 | 81.61 |
| 12 | −12.006 | Variable | | |
| 13* | 10.924 | 0.80 | 1.53071 | 55.69 |
| 14* | 5.518 | Variable | | |
| 15* | 9.201 | 1.39 | 1.53071 | 55.69 |
| 16* | 39.826 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

8th surface
k = 0.000
A4 = −1.02723e−04, A6 = −9.19949e−08
9th surface
k = 0.000
A4 = 2.76596e−04, A6 = −2.31887e−08
13th surface
k = 0.000
A4 = −3.31698e−03, A6 = 9.95905e−05
14th surface
k = 0.000
A4 = −4.38301e−03, A6 = 8.45256e−05
15th surface
k = 0.000
A4 = 1.64846e−03, A6 = −2.56048e−05
16th surface
k = 0.000
A4 = 2.87943e−03, A6 = −6.70306e−06

-continued

Unit mm

Zoom data
Zoom ratio 3.50

|  | WE | ST | TE |
|---|---|---|---|
| f | 3.43 | 6.42 | 12.01 |
| FNO. | 2.02 | 2.50 | 3.32 |
| 2ω | 135.29 | 66.67 | 35.29 |
| IH | 4.01 | 4.01 | 4.01 |
| BF (in air) | 3.73 | 3.73 | 3.73 |
| LTL (in air) | 57.34 | 48.10 | 47.32 |
| d6 | 22.16 | 9.10 | 1.66 |
| d12 | 2.40 | 5.59 | 12.89 |
| d14 | 3.80 | 4.42 | 3.80 |

Unit focal length

| f1 = −8.12 | f2 = 10.97 | f3 = −22.14 | f4 = 22.20 |

Example 5

Unit mm

Surface data

| Surface no. | r | d | nd | vd |
|---|---|---|---|---|
| Object plane | ∞ | ∞ | | |
| 1 | 31.592 | 1.20 | 1.88300 | 40.76 |
| 2 | 9.004 | 7.06 | | |
| 3 | −37.634 | 1.00 | 1.72916 | 54.68 |
| 4 | 14.488 | 2.00 | | |
| 5 | 16.122 | 3.00 | 1.92286 | 18.90 |
| 6 | 35.733 | Variable | | |
| 7 (Stop) | ∞ | 0.50 | | |
| 8 | 7.403 | 3.27 | 1.74320 | 49.34 |
| 9 | 172.057 | 0.73 | | |
| 10 | 22.593 | 0.80 | 1.90366 | 31.32 |
| 11 | 5.000 | 2.30 | 1.49700 | 81.61 |
| 12 | −12.266 | Variable | | |
| 13* | 10.749 | 0.80 | 1.53071 | 55.69 |
| 14* | 5.400 | Variable | | |
| 15* | 10.027 | 1.31 | 1.53071 | 55.69 |
| 16* | 35.824 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

8th surface
k = 0.000
A4 = −9.13858e−05, A6 = 4.53390e−07
9th surface
k = 0.000
A4 = 3.47611e−04, A6 = 1.46303e−06
13th surface
k = 0.000
A4 = −2.75651e−03, A6 = 9.67312e−05
14th surface
k = 0.000
A4 = −3.71920e−03, A6 = 8.13209e−05
15th surface
k = 0.000
A4 = 1.42758e−03, A6 = −3.35558e−05
16th surface
k = 0.000
A4 = 2.45893e−03, A6 = −1.97898e−05

-continued

Unit mm

Zoom data
Zoom ratio 3.50

|  | WE | ST | TE |
|---|---|---|---|
| f | 3.43 | 6.42 | 12.00 |
| FNO. | 2.83 | 3.46 | 4.58 |
| 2ω | 131.21 | 66.67 | 35.31 |
| IH | 4.01 | 4.01 | 4.01 |
| BF (in air) | 3.73 | 3.73 | 3.73 |
| LTL (in air) | 57.11 | 46.51 | 44.78 |
| d6 | 23.15 | 9.21 | 1.50 |
| d12 | 2.45 | 5.46 | 11.78 |
| d14 | 3.81 | 4.13 | 3.80 |

Unit focal length

| f1 = −8.52 | f2 = 10.63 | f3 = −21.56 | f4 = 25.78 |

Example 6

Unit mm

Surface data

| Surface no. | r | d | nd | vd |
|---|---|---|---|---|
| Object plane | ∞ | ∞ | | |
| 1 | 46.340 | 1.40 | 1.71300 | 53.87 |
| 2 | 10.000 | 6.17 | | |
| 3* | −19.848 | 1.60 | 1.53071 | 55.69 |
| 4* | 8.700 | 3.80 | | |
| 5* | 25.370 | 2.35 | 1.63493 | 23.89 |
| 6* | −89.673 | Variable | | |
| 7 (Stop) | ∞ | 0.50 | | |
| 8* | 8.834 | 2.13 | 1.88202 | 37.22 |
| 9* | 20622.747 | 1.65 | | |
| 10 | 23.060 | 0.85 | 2.00069 | 25.46 |
| 11 | 5.250 | 2.92 | 1.49700 | 81.61 |
| 12 | −15.362 | Variable | | |
| 13* | 73.314 | 0.85 | 1.53071 | 55.69 |
| 14* | 7.920 | Variable | | |
| 15* | 11.114 | 3.39 | 1.53071 | 55.69 |
| 16* | −14.804 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

3rd surface
k = 0.000
A4 = 4.56048e−04, A6 = −5.44367e−06, A8 = 1.69494e−08
4th surface
k = −4.840
A4 = 7.37515e−04, A6 = −7.59233e−06
5th surface
k = 0.000
A4 = −1.80249e−04, A6 = −2.13372e−06, A8 = 2.16895e−08
6th surface
k = 0.000
A4 = −9.89379e−05, A6 = −3.96257e−06, A8 = 3.46357e−08
8th surface
k = 0.000
A4 = −7.44920e−05, A6 = −1.94917e−07
9th surface
k = 0.000
A4 = 1.11034e−04, A6 = −5.22796e−08

Example 7

Unit mm

Surface data

| Surface no. | r | d | nd | vd |
|---|---|---|---|---|
| Object plane | ∞ | ∞ | | |
| 1 | 89.498 | 1.40 | 1.72916 | 54.68 |
| 2 | 10.000 | 6.04 | | |
| 3* | −28.721 | 1.60 | 1.53071 | 55.69 |
| 4* | 8.700 | 2.79 | | |
| 5* | 31.921 | 2.45 | 1.63493 | 23.89 |
| 6* | −69.187 | Variable | | |
| 7 (Stop) | ∞ | 0.50 | | |
| 8* | 7.489 | 3.04 | 1.85400 | 40.39 |
| 9* | 24.742 | 0.87 | | |
| 10 | 15.833 | 0.85 | 2.00100 | 29.13 |
| 11 | 5.017 | 2.95 | 1.49700 | 81.61 |
| 12 | −12.873 | Variable | | |
| 13* | 7.997 | 0.85 | 1.63493 | 23.89 |
| 14* | 5.400 | Variable | | |
| 15* | −15.529 | 2.58 | 1.53071 | 55.69 |
| 16* | −6.005 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

3rd surface
k = 0.000
A4 = −2.76663e−05, A6 = −2.34322e−07
4th surface
k = −2.241
A4 = 6.93114e−05, A6 = 3.90561e−07
5th surface
k = 0.000
A4 = −1.43731e−04, A6 = −5.92569e−07
6th surface
k = 0.000
A4 = −1.71791e−04, A6 = −1.00157e−06
8th surface
k = 0.000
A4 = −4.00937e−05, A6 = 5.29683e−07
9th surface
k = 0.000
A4 = 3.15199e−04, A6 = 1.75900e−06
13th surface
k = 0.000
A4 = −3.89309e−04, A6 = 3.21633e−05
14th surface
k = 0.000
A4 = −2.64558e−04, A6 = 2.72722e−05
15th surface
k = 0.000
A4 = 3.35144e−04, A6 = 1.62953e−06
16th surface
k = 0.000
A4 = 1.24088e−03, A6 = −1.27103e−05

Zoom data
Zoom ratio 4.00

| | WE | ST | TE |
|---|---|---|---|
| f | 3.43 | 6.86 | 13.72 |
| FNO. | 2.84 | 3.72 | 4.54 |
| 2ω | 117.06 | 61.46 | 31.11 |
| IH | 4.01 | 4.01 | 4.01 |
| BF (in air) | 3.73 | 3.73 | 3.73 |
| LTL (in air) | 61.87 | 56.68 | 54.60 |
| d6 | 24.27 | 11.30 | 1.50 |
| d12 | 2.45 | 3.25 | 8.80 |
| d14 | 3.80 | 10.78 | 12.95 |

Unit focal length

| f1 = −9.20 | f2 = 11.83 | f3 = −16.81 | f4 = 12.53 |

Example 8

Unit mm

Surface data

| Surface no. | r | d | nd | vd |
|---|---|---|---|---|
| Object plane | ∞ | ∞ | | |
| 1 | 23.542 | 1.40 | 1.85150 | 40.78 |
| 2 | 10.000 | 6.46 | | |
| 3* | −25.270 | 1.40 | 1.58313 | 59.38 |
| 4* | 8.700 | 3.48 | | |
| 5 | 17.547 | 1.86 | 1.92286 | 18.90 |
| 6 | 38.166 | Variable | | |
| 7 (Stop) | ∞ | 0.50 | | |
| 8* | 8.002 | 2.81 | 1.74320 | 49.34 |
| 9* | −64.968 | 1.51 | | |
| 10 | 53.322 | 0.85 | 1.90366 | 31.32 |
| 11 | 5.167 | 2.50 | 1.49700 | 81.61 |
| 12 | −13.919 | Variable | | |
| 13* | 10.225 | 0.85 | 1.53071 | 55.69 |
| 14* | 6.020 | Variable | | |
| 15* | 10.679 | 2.19 | 1.53071 | 55.69 |
| 16* | −48.044 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Zoom data
Zoom ratio 3.50

| | WE | ST | TE |
|---|---|---|---|
| f | 3.43 | 6.42 | 12.00 |
| FNO. | 2.51 | 3.09 | 4.22 |
| 2ω | 134.32 | 66.67 | 35.29 |
| IH | 4.01 | 4.01 | 4.01 |
| BF (in air) | 3.73 | 3.73 | 3.73 |
| LTL (in air) | 59.36 | 48.97 | 48.85 |
| d6 | 23.24 | 8.98 | 1.50 |
| d12 | 2.52 | 6.65 | 13.91 |
| d14 | 3.95 | 3.69 | 3.80 |

Unit focal length

| f1 = −8.30 | f2 = 11.68 | f3 = −30.00 | f4 = 16.86 |

-continued

Unit mm

Aspherical surface data

3rd surface
k = 0.000
A4 = 4.35939e−04, A6 = −7.45935e−06, A8 = 4.42850e−08
4th surface
k = 0.000
A4 = 1.70613e−04, A6 = −2.51674e−06, A8 = −2.21655e−07,
A10 = 2.75944e−09
8th surface
k = 0.000
A4 = −1.32021e−04, A6 = 7.14849e−07
9th surface
k = 0.000
A4 = 1.52985e−04, A6 = 1.41879e−06
13th surface
k = 0.000
A4 = −2.25996e−03, A6 = 6.34913e−05
14th surface
k = 0.000
A4 = −2.72435e−03, A6 = 5.56598e−05
15th surface
k = 0.000
A4 = 7.74350e−04, A6 = −2.83005e−06
16th surface
k = 0.000
A4 = 1.66781e−03, A6 = −1.33649e−05

Zoom data
Zoom ratio 4.00

|  | WE | ST | TE |
|---|---|---|---|
| f | 3.43 | 6.86 | 13.72 |
| FNO. | 2.86 | 3.83 | 4.55 |
| 2ω | 116.70 | 61.20 | 31.11 |
| IH | 4.01 | 4.01 | 4.01 |
| BF (in air) | 3.73 | 3.73 | 3.73 |
| LTL (in air) | 59.36 | 51.47 | 52.04 |
| d6 | 23.62 | 10.01 | 1.50 |
| d12 | 2.40 | 5.05 | 17.21 |
| d14 | 3.80 | 6.87 | 3.80 |

Unit focal length

| f1 = −8.85 | f2 = 12.07 | f3 = −29.66 | f4 = 16.68 |
|---|---|---|---|

Example 9

Unit mm

Surface data

| Surface no. | r | d | nd | vd |
|---|---|---|---|---|
| Object plane | ∞ | ∞ | | |
| 1 | 144.104 | 1.40 | 1.72916 | 54.68 |
| 2 | 11.000 | 5.22 | | |
| 3* | −82.207 | 1.80 | 1.53071 | 55.69 |
| 4* | 9.000 | 2.52 | | |
| 5* | 91.792 | 2.59 | 1.63493 | 23.89 |
| 6* | −28.650 | Variable | | |
| 7 (Stop) | ∞ | 0.50 | | |
| 8* | 9.855 | 1.13 | 1.80610 | 40.92 |
| 9* | 59.022 | 2.98 | | |
| 10 | 18.257 | 0.85 | 1.84666 | 23.78 |
| 11 | 6.398 | 2.04 | 1.49700 | 81.61 |
| 12 | −19.162 | Variable | | |
| 13* | 8.713 | 0.85 | 1.53071 | 55.69 |
| 14* | 5.400 | Variable | | |
| 15* | 8.814 | 2.22 | 1.53071 | 55.69 |
| 16* | −552.033 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

3rd surface
k = 0.000
A4 = −3.98119e−05, A6 = 2.21344e−07
4th surface
k = −2.514
5th surface
k = 0.000
A4 = 9.08045e−05, A6 = 2.86969e−07
6th surface
k = 0.000
A4 = 5.84778e−05, A6 = 1.90485e−07
8th surface
k = 0.000
A4 = −5.38736e−05, A6 = 5.04820e−06
9th surface
k = 0.000
A4 = 7.00302e−05, A6 = 5.86825e−06
13th surface
k = 0.000
A4 = −1.52456e−03, A6 = 2.65514e−05
14th surface
k = 0.000
A4 = −1.78340e−03, A6 = 2.10737e−05
15th surface
k = 0.000
A4 = 6.59352e−04, A6 = −9.52922e−06
16th surface
k = 0.000
A4 = 1.81712e−03, A6 = −3.56457e−05

Zoom data
Zoom ratio 3.00

|  | WE | ST | TE |
|---|---|---|---|
| f | 3.43 | 5.95 | 10.29 |
| FNO. | 2.86 | 3.50 | 4.18 |
| 2ω | 116.84 | 70.36 | 40.72 |
| IH | 4.01 | 4.01 | 4.01 |
| BF (in air) | 3.73 | 3.73 | 3.73 |
| LTL (in air) | 59.37 | 49.96 | 44.39 |
| d6 | 25.08 | 11.60 | 1.50 |
| d12 | 2.42 | 3.67 | 11.27 |
| d14 | 4.05 | 6.87 | 3.80 |

Unit focal length

| f1 = −10.51 | f2 = 12.34 | f3 = −29.37 | f4 = 16.37 |
|---|---|---|---|

Example 10

Unit mm

Surface data

| Surface no. | r | d | nd | vd |
|---|---|---|---|---|
| Object plane | ∞ | ∞ | | |
| 1 | 37.733 | 1.40 | 1.72916 | 54.68 |
| 2 | 10.000 | 6.61 | | |
| 3* | −17.996 | 1.40 | 1.51633 | 64.14 |
| 4* | 8.718 | 3.53 | | |
| 5 | 27.935 | 2.35 | 1.92119 | 23.96 |
| 6 | −2989.658 | Variable | | |
| 7 (Stop) | ∞ | 0.50 | | |
| 8* | 7.813 | 1.72 | 1.74320 | 49.34 |

-continued

Unit mm

| | | | | |
|---|---|---|---|---|
| 9* | −47.682 | 1.83 | | |
| 10 | 106.097 | 0.85 | 1.90366 | 31.32 |
| 11 | 5.099 | 2.18 | 1.49700 | 81.61 |
| 12 | −12.959 | Variable | | |
| 13* | −26.321 | 0.85 | 1.53071 | 55.69 |
| 14* | 15.510 | Variable | | |
| 15* | 7.059 | 3.12 | 1.53071 | 55.69 |
| 16* | −35.043 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

3rd surface
k = 0.000
A4 = 2.01689e−04, A6 = −2.08978e−06, A8 = 9.67597e−09
4th surface
k = 0.000
A4 = −2.30002e−04, A6 = −1.17596e−06, A8 = −3.62207e−08,
A10 = 4.17707e−11
8th surface
k = 0.000
A4 = −1.25673e−04, A6 = 1.12861e−06
9th surface
k = 0.000
A4 = 1.85728e−04, A6 = 7.96554e−07
13th surface
k = 0.000
A4 = 3.58699e−04, A6 = 3.62811e−06
14th surface
k = 0.000
A4 = 1.83054e−04, A6 = 2.32460e−06
15th surface
k = 0.000
A4 = −9.59014e−05, A6 = 2.81248e−06
16th surface
k = 0.000
A4 = 1.00937e−03, A6 = 2.69905e−06

Zoom data
Zoom ratio 3.00

| | WE | ST | TE |
|---|---|---|---|
| f | 3.43 | 5.94 | 10.29 |
| FNO. | 2.86 | 3.46 | 4.40 |
| 2ω | 116.42 | 69.69 | 40.72 |
| IH | 4.01 | 4.01 | 4.01 |
| BF (in air) | 3.73 | 3.73 | 3.73 |
| LTL (in air) | 59.36 | 49.95 | 47.27 |
| d6 | 22.40 | 9.50 | 1.51 |
| d12 | 2.40 | 5.49 | 11.89 |
| d14 | 4.49 | 4.89 | 3.80 |

Unit focal length

| f1 = −9.36 | f2 = 11.82 | f3 = −18.26 | f4 = 11.36 |
|---|---|---|---|

Example 11

Unit mm

Surface data

| Surface no. | r | d | nd | vd |
|---|---|---|---|---|
| Object plane | ∞ | ∞ | | |
| 1 | 22.749 | 1.20 | 1.88300 | 40.76 |
| 2 | 9.390 | 6.66 | | |
| 3 | −118.406 | 1.00 | 1.72916 | 54.68 |

-continued

Unit mm

| | | | | |
|---|---|---|---|---|
| 4 | 11.522 | 2.00 | | |
| 5 | 12.335 | 3.00 | 1.92286 | 18.90 |
| 6 | 18.475 | Variable | | |
| 7 (Stop) | ∞ | 0.50 | | |
| 8* | 7.320 | 2.79 | 1.74320 | 49.34 |
| 9* | −102.916 | 0.55 | | |
| 10 | 78.483 | 0.80 | 1.90366 | 31.32 |
| 11 | 6.581 | 2.17 | 1.49700 | 81.61 |
| 12 | −7.702 | Variable | | |
| 13* | 224.796 | 0.80 | 1.53071 | 55.69 |
| 14* | 5.400 | Variable | | |
| 15* | −19.781 | 2.12 | 1.53071 | 55.69 |
| 16* | −6.359 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

8th surface
k = 0.000
A4 = 4.01494e−06, A6 = 6.73338e−06
9th surface
k = 0.000
A4 = 8.60759e−04, A6 = 1.07426e−05
13th surface
k = 0.000
A4 = 4.17582e−04, A6 = −1.79774e−05
14th surface
k = 0.000
A4 = 6.37043e−04, A6 = 4.44571e−06
15th surface
k = 0.000
A4 = −1.19565e−03, A6 = 5.07009e−05
16th surface
k = 0.000
A4 = −4.27560e−05, A6 = 3.17710e−05

Zoom data
Zoom ratio 3.00

| | WE | ST | TE |
|---|---|---|---|
| f | 3.75 | 6.50 | 11.25 |
| FNO. | 2.86 | 3.48 | 4.40 |
| 2ω | 111.60 | 64.68 | 37.50 |
| IH | 4.01 | 4.01 | 4.01 |
| BF (in air) | 3.73 | 3.73 | 3.73 |
| LTL (in air) | 59.37 | 48.75 | 43.61 |
| d6 | 25.85 | 12.73 | 4.33 |
| d12 | 2.40 | 3.46 | 5.66 |
| d14 | 3.80 | 5.24 | 6.30 |

Unit focal length

| f1 = −9.27 | f2 = 8.94 | f3 = −10.44 | f4 = 16.74 |
|---|---|---|---|

Example 12

Unit mm

Surface data

| Surface no. | r | d | nd | vd |
|---|---|---|---|---|
| Object plane | ∞ | ∞ | | |
| 1 | 58.579 | 1.40 | 1.88300 | 40.76 |
| 2 | 8.114 | 7.21 | | |
| 3* | −41.844 | 1.60 | 1.53071 | 55.69 |
| 4* | 13.885 | 0.64 | | |
| 5* | 15.925 | 2.87 | 1.63493 | 23.89 |

-continued

Unit mm

| | | | | |
|---|---|---|---|---|
| 6* | −227.596 | Variable | | |
| 7 (Stop) | ∞ | 0.50 | | |
| 8* | 8.586 | 2.78 | 1.80610 | 40.92 |
| 9 | −116.929 | 0.50 | | |
| 10 | 16.966 | 1.16 | 1.49700 | 81.61 |
| 11 | 61.817 | 0.85 | 2.00069 | 25.46 |
| 12 | 6.609 | 0.93 | | |
| 13 | 10.353 | 2.42 | 1.49700 | 81.61 |
| 14 | −14.058 | Variable | | |
| 15* | 26.519 | 0.85 | 1.53071 | 55.69 |
| 16* | 9.838 | Variable | | |
| 17* | 28.275 | 1.74 | 1.53071 | 55.69 |
| 18* | −19.701 | 1.50 | | |
| 19 | ∞ | 1.30 | 1.51633 | 64.14 |
| 20 | ∞ | 0.51 | | |
| 21 | ∞ | 0.50 | 1.51633 | 64.14 |
| | ∞ | 0.53 | | |
| Image plane | ∞ | | | |

Aspherical surface data

3rd surface
k = 0.000
A4 = −3.54390e−06, A6 = −1.37451e−06
4th surface
k = 0.526
A4 = −1.91391e−04, A6 = −2.57397e−06
5th surface
k = 0.000
A4 = −2.07235e−05, A6 = −1.60041e−06
6th surface
k = 0.000
A4 = −3.60689e−06, A6 = −5.35381e−07
8th surface
k = 0.000
A4 = −8.24536e−05, A6 = 9.67596e−08
9th surface
k = 0.000
A4 = 1.78575e−04, A6 = 5.18006e−08
15th surface
k = 0.000
A4 = 3.29309e−04, A6 = 1.55725e−05
16th surface
k = 0.000
A4 = 3.18108e−04, A6 = 1.52037e−05
17th surface
k = 0.000
A4 = 1.91654e−03, A6 = −2.97230e−05
18th surface
k = 0.000
A4 = 3.38105e−03, A6 = −6.19130e−05

Zoom data
Zoom ratio 4.50

| | WE | ST | TE |
|---|---|---|---|
| f | 3.43 | 7.25 | 15.44 |
| FNO. | 2.24 | 3.09 | 4.49 |
| 2ω | 145.61 | 59.89 | 27.80 |
| IH | 4.01 | 4.01 | 4.01 |
| BF (in air) | 3.73 | 3.73 | 3.73 |
| LTL (in air) | 65.81 | 54.66 | 52.97 |
| d6 | 30.01 | 12.34 | 1.50 |
| d14 | 2.82 | 3.00 | 9.44 |
| d16 | 3.80 | 10.14 | 12.86 |

Unit focal length f1 = −9.99  f2 = 12.69  f3 = −30.00  f4 = 22.16

Example 13

Unit mm

Surface data

| Surface no. | r | d | nd | vd |
|---|---|---|---|---|
| Object plane | ∞ | ∞ | | |
| 1 | 53.695 | 1.20 | 1.88300 | 40.76 |
| 2 | 10.937 | 6.07 | | |
| 3 | −25.633 | 1.00 | 1.72916 | 54.68 |
| 4 | 13.233 | 2.00 | | |
| 5 | 21.989 | 3.00 | 1.92286 | 18.90 |
| 6 | 111.962 | Variable | | |
| 7 (Stop) | ∞ | 0.50 | | |
| 8* | 8.610 | 2.06 | 1.74320 | 49.34 |
| 9* | −718.906 | 0.50 | | |
| 10 | 50.000 | 1.23 | 1.76200 | 40.10 |
| 11 | −40.515 | 0.50 | | |
| 12 | 95.054 | 0.80 | 1.90366 | 31.32 |
| 13 | 5.527 | 3.71 | 1.49700 | 81.61 |
| 14 | −12.217 | Variable | | |
| 15* | −53.020 | 0.80 | 1.53071 | 55.69 |
| 16* | 10.247 | Variable | | |
| 17* | −51.479 | 1.91 | 1.53071 | 55.69 |
| 18* | −8.306 | 1.50 | | |
| 19 | ∞ | 1.30 | 1.51633 | 64.14 |
| 20 | ∞ | 0.51 | | |
| 21 | ∞ | 0.50 | 1.51633 | 64.14 |
| 22 | ∞ | 0.53 | | |
| Image plane | ∞ | | | |

Aspherical surface data

8th surface
k = 0.000
A4 = −6.97907e−05, A6 = 5.82419e−07
9th surface
k = 0.000
A4 = 2.51575e−04, A6 = 8.13644e−07
15th surface
k = 0.000
A4 = −5.10191e−04, A6 = 1.93625e−05
16th surface
k = 0.000
A4 = −2.47563e−04, A6 = 2.06916e−05
17th surface
k = 0.000
A4 = 1.44970e−04, A6 = 2.86550e−05
18th surface
k = 0.000
A4 = 8.43482e−04, A6 = 2.88486e−05

Zoom data
Zoom ratio 4.50

| | WE | ST | TE |
|---|---|---|---|
| f | 3.43 | 7.35 | 15.43 |
| FNO. | 2.25 | 3.14 | 4.25 |
| 2ω | 150.89 | 59.73 | 27.80 |
| IH | 4.01 | 4.01 | 4.01 |
| BF (in air) | 3.73 | 3.73 | 3.73 |
| LTL (in air) | 61.73 | 52.63 | 49.35 |
| d6 | 26.52 | 11.48 | 1.50 |
| d14 | 2.40 | 3.74 | 11.69 |
| d16 | 3.80 | 8.40 | 7.15 |

Unit focal length f1 = −8.18  f2 = 10.82  f3 = −16.11  f4 = 18.38

Example 14

Unit mm

Surface data

| Surface no. | r | d | nd | νd |
|---|---|---|---|---|
| Object plane | ∞ | ∞ | | |
| 1 | 211.945 | 1.40 | 1.72916 | 54.68 |
| 2 | 11.000 | 5.78 | | |
| 3* | −67.202 | 1.80 | 1.53071 | 55.69 |
| 4* | 9.000 | 1.50 | | |
| 5* | 65.964 | 2.66 | 1.63493 | 23.89 |
| 6* | −35.790 | Variable | | |
| 7 (Stop) | ∞ | 0.50 | | |
| 8* | 10.649 | 1.04 | 1.80610 | 40.92 |
| 9* | 30.116 | 4.33 | | |
| 10 | 17.725 | 1.91 | 1.49700 | 81.61 |
| 11 | −6.820 | 0.85 | 1.84666 | 23.78 |
| 12 | −11.265 | Variable | | |
| 13* | 9.968 | 0.85 | 1.63493 | 23.89 |
| 14* | 5.403 | Variable | | |
| 15* | 8.844 | 3.11 | 1.53071 | 55.69 |
| 16* | −26.337 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

3rd surface
k = 0.000
A4 = −1.21142e−04, A6 = 1.10941e−06
4th surface
k = 3.965
5th surface
k = 0.000
A4 = 4.03652e−04, A6 = −1.57078e−06
6th surface
k = 0.000
A4 = 3.24777e−04, A6 = −8.59601e−07
8th surface
k = 0.000
A4 = 1.30087e−04, A6 = 1.77475e−05
9th surface
k = 0.000
A4 = 2.71861e−04, A6 = 1.99568e−05
13th surface
k = 0.000
A4 = 1.17570e−06, A6 = −4.06689e−06
14th surface
k = 0.000
A4 = 2.50517e−04, A6 = −8.00783e−07
15th surface
k = 0.000
A4 = 7.39372e−04, A6 = −8.75113e−07
16th surface
k = 0.000
A4 = 2.14589e−03, A6 = −3.98353e−05

Zoom data
Zoom ratio 3.00

| | WE | ST | TE |
|---|---|---|---|
| f | 3.10 | 6.18 | 9.30 |
| FNO. | 2.63 | 3.30 | 3.63 |
| 2ω | 126.32 | 68.67 | 45.09 |
| IH | 4.01 | 4.01 | 4.01 |
| BF (in air) | 3.73 | 3.73 | 3.73 |
| LTL (in air) | 59.36 | 49.45 | 45.84 |
| d6 | 23.53 | 8.30 | 1.50 |

-continued

Unit mm

| | | | |
|---|---|---|---|
| d12 | 2.57 | 4.98 | 10.03 |
| d14 | 3.80 | 6.71 | 4.85 |

Unit focal length

| f1 = −9.22 | f2 = 11.76 | f3 = −20.03 | f4 = 12.87 |
|---|---|---|---|

Example 15

Unit mm

Surface data

| Surface no. | r | d | nd | νd |
|---|---|---|---|---|
| Object plane | ∞ | ∞ | | |
| 1 | 36.065 | 1.20 | 1.72916 | 54.68 |
| 2 | 10.081 | 7.38 | | |
| 3 | −41.358 | 1.00 | 1.64000 | 60.08 |
| 4 | 9.717 | 2.05 | | |
| 5 | 11.199 | 3.00 | 1.92286 | 18.90 |
| 6 | 16.774 | Variable | | |
| 7 (Stop) | ∞ | 0.50 | | |
| 8* | 7.438 | 5.03 | 1.49700 | 81.61 |
| 9 | −7.411 | 0.80 | 1.90366 | 31.32 |
| 10 | 196.660 | 0.50 | | |
| 11* | 10.004 | 1.67 | 1.74320 | 49.34 |
| 12* | −10.770 | Variable | | |
| 13* | −21.947 | 0.80 | 1.53071 | 55.69 |
| 14* | 5.403 | Variable | | |
| 15* | 71.970 | 2.76 | 1.53071 | 55.69 |
| 16* | −6.898 | 1.50 | | |
| 17 | ∞ | 1.30 | 1.51633 | 64.14 |
| 18 | ∞ | 0.51 | | |
| 19 | ∞ | 0.50 | 1.51633 | 64.14 |
| 20 | ∞ | 0.53 | | |
| Image plane | ∞ | | | |

Aspherical surface data

8th surface
k = 0.000
A4 = 2.62745e−05, A6 = −2.50727e−06, A8 = 2.37200e−07
11th surface
k = 0.000
A4 = −5.05801e−04, A6 = 1.02059e−05
12th surface
k = 0.000
A4 = 3.95717e−04, A6 = 7.87815e−06
13th surface
k = 0.000
A4 = 5.42881e−04, A6 = −2.74970e−05
14th surface
k = 0.000
A4 = 2.56966e−04, A6 = −3.90543e−05
15th surface
k = 0.000
A4 = −9.42772e−04, A6 = 2.13813e−05
16th surface
k = 0.000
A4 = 1.59189e−04, A6 = 2.15085e−05

Zoom data
Zoom ratio 3.00

| | WE | ST | TE |
|---|---|---|---|
| f | 3.43 | 5.94 | 10.29 |
| FNO. | 2.99 | 3.60 | 4.79 |
| 2ω | 129.11 | 70.79 | 40.72 |
| IH | 4.01 | 4.01 | 4.01 |
| BF (in air) | 3.73 | 3.73 | 3.73 |
| LTL (in air) | 57.37 | 49.31 | 49.26 |

Example 16 (continued)

| Unit mm | | | |
|---|---|---|---|
| d6 | 20.76 | 9.53 | 3.59 |
| d12 | 2.40 | 3.11 | 3.77 |
| d14 | 3.80 | 6.26 | 11.49 |

| Unit focal length | | | |
|---|---|---|---|
| f1 = −8.41 | f2 = 8.07 | f3 = −8.09 | f4 = 12.01 |

Example 16

Unit mm

Surface data

| Surface no. | r | d | nd | vd |
|---|---|---|---|---|
| Object plane | ∞ | ∞ | | |
| 1 | 160.355 | 1.40 | 1.72916 | 54.68 |
| 2 | 10.000 | 5.72 | | |
| 3* | −53.459 | 1.60 | 1.53071 | 55.69 |
| 4* | 9.207 | 3.28 | | |
| 5* | 44.236 | 2.65 | 1.63493 | 23.89 |
| 6* | −41.893 | Variable | | |
| 7 (Stop) | ∞ | 0.50 | | |
| 8* | 9.684 | 5.62 | 1.80610 | 40.92 |
| 9* | 45.950 | 0.72 | | |
| 10 | 17.157 | 0.85 | 1.84666 | 23.78 |
| 11 | 5.901 | 2.06 | 1.49700 | 81.61 |
| 12 | −24.526 | Variable | | |
| 13* | 12.586 | 0.85 | 1.53071 | 55.69 |
| 14* | 6.865 | Variable | | |
| 15* | 114.926 | 2.10 | 1.53071 | 55.69 |
| 16* | −10.821 | Variable | | |
| 17 | 60.571 | 1.01 | 1.53071 | 55.69 |
| 18 | −141.171 | 0.8 | | |
| 19 | ∞ | 1.30 | 1.51633 | 64.14 |
| 20 | ∞ | 0.51 | | |
| 21 | ∞ | 0.50 | 1.51633 | 64.14 |
| 22 | ∞ | 0.53 | | |
| Image plane | ∞ | | | |

Aspherical surface data

3rd surface
k = 0.000
A4 = −3.72931e−05, A6 = 1.89572e−07
4th surface
k = −1.566
5th surface
k = 0.000
A4 = 1.46434e−04, A6 = −1.20274e−06
6th surface
k = 0.000
A4 = 7.19595e−05, A6 = −1.04935e−06
8th surface
k = 0.000
A4 = −3.72000e−05, A6 = 5.60586e−08
9th surface
k = 0.000
A4 = 1.42419e−04, A6 = 1.69752e−06
13th surface
k = 0.000
A4 = −1.31085e−03, A6 = 2.14798e−05
14th surface
k = 0.000
A4 = −1.21073e−03, A6 = 1.32961e−05
15th surface
k = 0.000
A4 = 8.70903e−04, A6 = −1.54606e−05
16th surface
k = 0.000
A4 = 1.33279e−03, A6 = −1.88046e−05

Zoom data
Zoom ratio 3.50

| | WE | ST | TE |
|---|---|---|---|
| f | 3.43 | 6.42 | 12.01 |
| FNO. | 3.19 | 3.95 | 5.48 |
| 2ω | 130.39 | 66.67 | 35.60 |
| IH | 4.01 | 4.01 | 4.01 |
| BF (in air) | 3.03 | 3.03 | 3.03 |
| LTL (in air) | 64.37 | 52.96 | 52.30 |
| d6 | 25.67 | 9.55 | 1.50 |
| d12 | 2.40 | 5.20 | 12.18 |
| d14 | 3.80 | 4.96 | 6.43 |
| d16 | 1.11 | 1.86 | 0.80 |

Unit focal length

| f1 = −9.64 | f2 = 12.92 | f3 = −30.00 | f4 = 18.74 | f5 = 80.00 |
|---|---|---|---|---|

Example 17

Unit mm

Surface data

| Surface no. | r | d | nd | vd |
|---|---|---|---|---|
| Object plane | ∞ | ∞ | | |
| 1 | 48.096 | 1.20 | 1.81600 | 46.62 |
| 2 | 8.647 | 7.43 | | |
| 3 | −24.656 | 1.00 | 1.65160 | 58.55 |
| 4 | 23.886 | 1.50 | | |
| 5 | 21.753 | 2.50 | 1.89286 | 20.36 |
| 6 | 66.058 | Variable | | |
| 7 (Stop) | ∞ | 0.50 | | |
| 8* | 10.714 | 3.49 | 1.74320 | 49.34 |
| 9* | −33.290 | 1.77 | | |
| 10 | 43.748 | 0.80 | 2.00100 | 29.13 |
| 11 | 7.777 | 4.36 | 1.43875 | 94.66 |
| 12 | −16.171 | 0.50 | | |
| 13 | 112.239 | 1.40 | 1.49700 | 81.61 |
| 14 | −24.059 | Variable | | |
| 15* | −48.489 | 0.80 | 1.53071 | 55.69 |
| 16* | 12.930 | Variable | | |
| 17* | 156.323 | 1.50 | 1.53071 | 55.69 |
| 18* | −11.015 | 1.50 | | |
| 19 | ∞ | 1.30 | 1.51633 | 64.14 |
| 20 | ∞ | 0.51 | | |
| 21 | ∞ | 0.50 | 1.51633 | 64.14 |
| 22 | ∞ | 0.53 | | |
| Image plane | ∞ | | | |

Aspherical surface data

8th surface
k = −0.018
A4 = −8.48629e−05, A6 = −1.71721e−07, A8 = −1.97461e−09
9th surface
k = 0.000
A4 = 1.33316e−04, A6 = −6.84529e−07, A8 = 3.67882e−09
15th surface
k = 0.000
A4 = −4.74867e−04, A6 = 1.57328e−05

-continued

| Unit mm |
|---|
| 16th surface |
| k = 0.000 |
| A4 = −6.73925e−04, A6 = 6.95273e−06 |
| 17th surface |
| k = 0.000 |
| A4 = 1.23354e−03, A6 = −3.93936e−05 |
| 18th surface |
| k = 0.000 |
| A4 = 2.38248e−03, A6 = −3.43955e−05 |

Zoom data
Zoom ratio 3.50

|  | WE | ST | TE |
|---|---|---|---|
| f | 3.53 | 6.60 | 12.35 |
| FNO. | 1.65 | 1.98 | 2.51 |
| 2ω | 136.11 | 65.17 | 34.35 |
| IH | 4.01 | 4.01 | 4.01 |
| BF (in air) | 3.73 | 3.73 | 3.73 |
| LTL (in air) | 67.37 | 54.18 | 50.44 |
| d6 | 28.97 | 11.94 | 1.80 |
| d14 | 2.20 | 5.14 | 12.55 |
| d16 | 3.71 | 4.61 | 3.60 |

Unit focal length

| f1 = −8.94 | f2 = 12.48 | f3 = −19.15 | f4 = 19.45 |
|---|---|---|---|

Example 18

| Unit mm | | | | |
|---|---|---|---|---|
| Surface data | | | | |
| Surface no. | r | d | nd | νd |
| Object plane | ∞ | ∞ | | |
| 1 | 62.752 | 1.20 | 1.81600 | 46.62 |
| 2 | 8.880 | 6.33 | | |
| 3 | −99.283 | 1.00 | 1.65160 | 58.55 |
| 4 | 13.186 | 1.50 | | |
| 5 | 14.337 | 2.50 | 1.89286 | 20.36 |
| 6 | 43.032 | 3.00 | | |
| 7 | −33.316 | 0.90 | 1.72916 | 54.68 |
| 8 | −896.864 | Variable | | |
| 9 | ∞ | 0.50 | | |
| (Stop) | | | | |
| 10* | 9.243 | 2.98 | 1.74320 | 49.34 |
| 11* | −39.408 | 0.92 | | |
| 12 | 20.889 | 0.80 | 2.00100 | 29.13 |
| 13 | 6.495 | 3.93 | 1.43875 | 94.66 |
| 14 | −12.904 | Variable | | |
| 15* | −21.247 | 0.80 | 1.53071 | 55.69 |
| 16* | 8.282 | Variable | | |
| 17* | 8.850 | 2.36 | 1.53071 | 55.69 |
| 18* | −13.548 | 1.50 | | |
| 19 | ∞ | 1.30 | 1.51633 | 64.14 |
| 20 | ∞ | 0.51 | | |
| 21 | ∞ | 0.50 | 1.51633 | 64.14 |
| 22 | ∞ | 0.53 | | |
| Image plane | ∞ | | | |

Aspherical surface data

10th surface
k = 0.198
A4 = −1.49825e−04, A6 = −7.81709e−07, A8 = 8.64503e−10
11th surface
k = 0.000

| Unit mm |
|---|
| A4 = 1.84136e−04, A6 = −1.03936e−06, A8 = 2.53756e−08 |
| 15th surface |
| k = 0.000 |
| A4 = −6.88584e−04, A6 = 3.18227e−05 |
| 16th surface |
| k = 0.000 |
| A4 = −1.24019e−03, A6 = 2.35653e−05 |
| 17th surface |
| k = 0.000 |
| A4 = 4.80194e−04, A6 = −9.17362e−06 |
| 18th surface |
| k = 0.000 |
| A4 = 1.73787e−03, A6 = −2.06705e−05 |

Zoom data
Zoom ratio 3.50

|  | WE | ST | TE |
|---|---|---|---|
| f | 3.53 | 6.60 | 12.36 |
| FNO. | 1.94 | 2.43 | 3.24 |
| 2ω | 139.46 | 65.17 | 34.35 |
| IH | 4.01 | 4.01 | 4.01 |
| BF (in air) | 3.73 | 3.73 | 3.73 |
| LTL (in air) | 61.37 | 53.00 | 52.70 |
| d8 | 21.22 | 8.65 | 1.30 |
| d14 | 4.03 | 7.60 | 15.35 |
| d16 | 3.67 | 4.30 | 3.60 |

Unit focal length

| f1 = −7.35 | f2 = 11.20 | f3 = −11.12 | f4 = 10.47 |
|---|---|---|---|

Next, values of conditional expressions in each example are given below. '-' (hyphen) indicates that there is no corresponding arrangement.

|  | Example 1 | Example 2 | Example 3 |
|---|---|---|---|
| (1) \|f1\|/\|f2\| | 0.78778 | 0.68179 | 0.77959 |
| (2) L2/L1 | 0.743215 | 0.645337 | 0.570563 |
| (3) Lt/Lw | 0.764579 | 0.87994 | 0.793474 |
| (4) f1/fw | −2.47356 | −2.35854 | −2.64653 |
| (5) L1/(y × tan2ωw) | −5.06436 | −3.24955 | −3.03781 |
| (6) L1/f1 | −1.44955 | −1.79106 | −1.54281 |
| (7) L2/(y × tan2ωw) | −3.76391 | −2.09706 | −1.73326 |
| (8) L2/f2 | 0.848692 | 0.788044 | 0.686246 |
| (9) L12airt/L2 | 0.213892 | 0.21389 | 0.250289 |
| (10) f3/f1 | 2.213972 | 2.371227 | 2.980017 |
| (11) f4/L1 | 1.836837 | 0.89584 | 1.482281 |
| (12) β3t/β3w | 1.009253 | 1.108376 | 1.045133 |
| (13) β2w | −0.33616 | −0.40787 | −0.35605 |
| (14) β2t/β2w | 3.467769 | 3.157703 | 3.34874 |
| (15) (β2t/β2w)/(ft/tw) | 0.990804 | 0.902203 | 0.956791 |
| (16) (β2t/β2w)/(β3t/β3w) | 3.435975 | 2.848947 | 3.204128 |
| (17) \|fct\| | 0.82526 | 0.9204 | 0.62769 |
| (18) \|fct\|/\|fcw\| | 1.033739 | 1.366686 | 1.198571 |
| (19) L12airt/Lt | 0.043874 | 0.0379 | 0.04203 |
| (20) (r1nf + r1nb)/(r1nf − r1nb) | 1.170452 | 1.206084 | 1.206542 |
| (21) (r1pf + r1pb)/(r1pf − r1pb) | −1.90977 | −0.47291 | −0.50079 |
| (22) (r3ff + r3fb)/(r3ff − r3fb) | 0.473203 | 1.236149 | 1.062379 |
| (23) L1/L1air | 1.590683 | 1.602379 | 1.694519 |
| (24) L2/L2air | 9.650877 | 6.021764 | 8.127378 |
| (25) f1/L12airw | −0.34274 | −0.36976 | −0.36401 |
| (26) f2/L12airw | 0.435066 | 0.542339 | 0.466924 |
| (27) f2f/f2b | −0.01305 | 0.006029 | −0.18673 |
| (28) DTw | −67.4981 | −47.9071 | −46.7421 |
| (29) nd3 | 1.53071 | 1.53071 | 1.53071 |

-continued

| | Example 4 | Example 5 | Example 6 |
|---|---|---|---|
| (30) nd4 | 1.53071 | 1.53071 | 1.53071 |
| (31) \|vd3 − vd4\| | 0 | 0 | 0 |
| (32) Lt/(y × tan2ωw) | −18.3498 | −11.8349 | −10.3216 |

| | Example 4 | Example 5 | Example 6 |
|---|---|---|---|
| (1) \|f1\|/\|f2\| | 0.74004 | 0.80176 | 0.77775 |
| (2) L2/L1 | 0.61643 | 0.49777 | 0.493195 |
| (3) Lt/Lw | 0.827188 | 0.786457 | 0.883666 |
| (4) f1/fw | −2.36708 | −2.48531 | −2.68218 |
| (5) L1/(y × tan2ωw) | −3.51662 | −3.11505 | −1.9515 |
| (6) L1/f1 | −1.71939 | −1.67308 | −1.66528 |
| (7) L2/(y × tan2ωw) | −2.16775 | −1.55058 | −0.96247 |
| (8) L2/f2 | 0.784355 | 0.667715 | 0.638772 |
| (9) L12airt/L2 | 0.250703 | 0.281713 | 0.264691 |
| (10) f3/f1 | 2.727231 | 2.52965 | 1.826703 |
| (11) f4/L1 | 1.59002 | 1.807632 | 0.81787 |
| (12) β3t/β3w | 0.999989 | 0.999762 | 1.304973 |
| (13) β2w | −0.38228 | −0.35082 | −0.35 |
| (14) β2t/β2w | 3.499965 | 3.500748 | 3.065074 |
| (15) (β2t/β2w)/(ft/tw) | 1 | 1.000227 | 0.76626 |
| (16) (β2t/β2w)/(β3t/β3w) | 3.500002 | 3.501582 | 2.348764 |
| (17) \|fct\| | 0.61323 | 0.65876 | 1.57661 |
| (18) \|fct\|/\|fcw\| | 0.999982 | 0.999073 | 2.024435 |
| (19) L12airt/Lt | 0.045005 | 0.044057 | 0.036224 |
| (20) (r1nf + r1nb)/(r1nf − r1nb) | 1.868067 | 1.797231 | 1.55036 |
| (21) (r1pf + r1pb)/(r1pf − r1pb) | −2.27494 | −2.64415 | −0.55894 |
| (22) (r3ff + r3fb)/(r3ff − r3fb) | 3.041068 | 3.018919 | 1.242208 |
| (23) L1/L1air | 1.593609 | 1.573796 | 1.536605 |
| (24) L2/L2air | 13.5722 | 9.745984 | 4.568856 |
| (25) f1/L12airw | −0.35835 | −0.36045 | −0.37141 |
| (26) f2/L12airw | 0.484232 | 0.449569 | 0.47754 |
| (27) f2f/f2b | −0.00132 | 0.02435 | −0.1585 |
| (28) DTw | −51.9203 | −46.9834 | −28.4385 |
| (29) nd3 | 1.53071 | 1.53071 | 1.53071 |
| (30) nd4 | 1.53071 | 1.53071 | 1.53071 |
| (31) \|vd3 − vd4\| | 0 | 0 | 0 |
| (32) Lt/(y × tan2ωw) | −12.0754 | −9.91475 | −7.03287 |

| | Example 7 | Example 8 | Example 9 |
|---|---|---|---|
| (1) \|f1\|/\|f2\| | 0.71064 | 0.73358 | 0.85175 |
| (2) L2/L1 | 0.539752 | 0.525077 | 0.517443 |
| (3) Lt/Lw | 0.824842 | 0.878046 | 0.750362 |
| (4) f1/fw | −2.4209 | −2.58038 | −3.06464 |
| (5) L1/(y × tan2ωw) | −3.4784 | −1.83106 | −1.70684 |
| (6) L1/f1 | −1.71983 | −1.64971 | −1.28678 |
| (7) L2/(y × tan2ωw) | −1.87747 | −0.96145 | −0.88319 |
| (8) L2/f2 | 0.659677 | 0.635449 | 0.567122 |
| (9) L12airt/L2 | 0.259464 | 0.260866 | 0.28575 |
| (10) f3/f1 | 3.613222 | 3.351022 | 2.793988 |
| (11) f4/L1 | 1.180781 | 1.142309 | 1.210158 |
| (12) β3t/β3w | 0.995968 | 0.999985 | 0.993815 |
| (13) β2w | −0.38453 | −0.40908 | −0.35 |
| (14) β2t/β2w | 3.514055 | 3.999949 | 3.018614 |
| (15) (β2t/β2w)/(ft/tw) | 1.004022 | 0.999989 | 1.006209 |
| (16) (β2t/β2w)/(β3t/β3w) | 3.528282 | 4.000008 | 3.0374 |
| (17) \|fct\| | 0.44486 | 0.39998 | 0.38929 |
| (18) \|fct\|/\|fcw\| | 0.9796 | 0.999982 | 0.973234 |
| (19) L12airt/Lt | 0.040431 | 0.037982 | 0.044437 |
| (20) (r1nf + r1nb)/(r1nf − r1nb) | 1.251578 | 2.476873 | 1.165284 |
| (21) (r1pf + r1pb)/(r1pf − r1pb) | −0.36857 | −2.70197 | 0.524251 |
| (22) (r3ff + r3fb)/(r3ff − r3fb) | 5.15871 | 3.863063 | 4.259472 |
| (23) L1/L1air | 1.617492 | 1.468946 | 1.747922 |
| (24) L2/L2air | 8.897306 | 5.082581 | 2.347682 |
| (25) f1/L12airw | −0.34978 | −0.36695 | −0.41094 |
| (26) f2/L12airw | 0.492203 | 0.50021 | 0.482462 |
| (27) f2f/f2b | 0.065906 | −0.21515 | 0.269055 |
| (28) DTw | −50.7658 | −27.9317 | −28.1332 |
| (29) nd3 | 1.63493 | 1.53071 | 1.53071 |
| (30) nd4 | 1.53071 | 1.53071 | 1.53071 |
| (31) \|vd3 − vd4\| | −31.8 | 0 | 0 |
| (32) Lt/(y × tan2ωw) | −12.0485 | −6.60345 | −5.67932 |

| | Example 10 | Example 11 | Example 12 |
|---|---|---|---|
| (1) \|f1\|/\|f2\| | 0.79236 | 1.03635 | 0.78701 |
| (2) L2/L1 | 0.430511 | 0.455 | 0.629456 |
| (3) Lt/Lw | 0.798419 | 0.737298 | 0.806737 |
| (4) f1/fw | −2.73001 | −2.47068 | −2.91116 |
| (5) L1/(y × tan2ωw) | −1.89424 | −1.36859 | −4.99988 |
| (6) L1/f1 | −1.63261 | −1.49622 | −1.37447 |
| (7) L2/(y × tan2ωw) | −0.81549 | −0.62271 | −3.1472 |
| (8) L2/f2 | 0.556914 | 0.705525 | 0.680897 |
| (9) L12airt/L2 | 0.303881 | 0.765787 | 0.231509 |
| (10) f3/f1 | 1.950044 | 1.126654 | 3.004556 |
| (11) f4/L1 | 0.743277 | 1.207586 | 1.614352 |
| (12) β3t/β3w | 0.979618 | 1.125018 | 1.230245 |
| (13) β2w | −0.38099 | −0.25968 | −0.32333 |
| (14) β2t/β2w | 3.062419 | 2.666642 | 3.65766 |
| (15) (β2t/β2w)/(ft/tw) | 1.020804 | 0.888892 | 0.812812 |
| (16) (β2t/β2w)/(β3t/β3w) | 3.126136 | 2.37031 | 2.973115 |
| (17) \|fct\| | 0.61816 | 2.41113 | 1.05154 |
| (18) \|fct\|/\|fcw\| | 0.943103 | 1.365431 | 2.22842 |
| (19) L12airt/Lt | 0.041769 | 0.109224 | 0.037325 |
| (20) (r1nf + r1nb)/(r1nf − r1nb) | 1.721174 | 2.405643 | 1.321567 |
| (21) (r1pf + r1pb)/(r1pf − r1pb) | −0.98149 | −5.01767 | −0.86921 |
| (22) (r3ff + r3fb)/(r3ff − r3fb) | 0.258445 | 1.049226 | 2.179589 |
| (23) L1/L1air | 1.507801 | 1.600266 | 1.748237 |
| (24) L2/L2air | 3.605649 | 11.55429 | 6.045477 |
| (25) f1/L12airw | −0.40893 | −0.35165 | −0.32726 |
| (26) f2/L12airw | 0.516096 | 0.339322 | 0.415827 |
| (27) f2f/f2b | −0.26327 | 0.17587 | — |
| (28) DTw | −27.5432 | −27.3263 | −63.8186 |
| (29) nd3 | 1.53071 | 1.53071 | 1.53071 |
| (30) nd4 | 1.53071 | 1.53071 | 1.53071 |
| (31) \|vd3 − vd4\| | 0 | 0 | 0 |
| (32) Lt/(y × tan2ωw) | −5.93285 | −4.36591 | −19.5208 |

| | Example 13 | Example 14 | Example 15 |
|---|---|---|---|
| (1) \|f1\|/\|f2\| | 0.7556 | 0.78421 | 1.04165 |
| (2) L2/L1 | 0.663413 | 0.618056 | 0.546772 |
| (3) Lt/Lw | 0.801407 | 0.774556 | 0.860204 |
| (4) f1/fw | −2.38341 | −2.97429 | −2.45193 |
| (5) L1/(y × tan2ωw) | −5.94491 | −2.40957 | −2.96492 |
| (6) L1/f1 | −1.62351 | −1.42578 | −1.739 |
| (7) L2/(y × tan2ωw) | −3.94393 | −1.48925 | −1.62113 |
| (8) L2/f2 | 0.813822 | 0.691054 | 0.990444 |
| (9) L12airt/L2 | 0.22714 | 0.246149 | 0.510928 |
| (10) f3/f1 | 1.970676 | 2.171855 | 0.961581 |
| (11) f4/L1 | 1.384838 | 0.978952 | 0.820958 |
| (12) β3t/β3w | 1.129815 | 1.032179 | 1.396347 |
| (13) β2w | −0.32385 | −0.35 | −0.25137 |
| (14) β2t/β2w | 3.982819 | 2.906423 | 2.148475 |
| (15) (β2t/β2w)/(ft/tw) | 0.885081 | 0.968819 | 0.716155 |
| (16) (β2t/β2w)/(β3t/β3w) | 3.525195 | 2.815814 | 1.53864 |
| (17) \|fct\| | 1.48647 | 0.6368 | 4.67543 |
| (18) \|fct\|/\|fcw\| | 1.453986 | 1.10469 | 2.149454 |

|  | | | |
|---|---|---|---|
| (19) L12airt/Lt | 0.040029 | 0.043056 | 0.081923 |
| (20) (r1nf + r1nb)/(r1nf − r1nb) | 1.511573 | 1.109483 | 1.775919 |
| (21) (r1pf + r1pb)/(r1pf − r1pb) | −1.48879 | 0.296536 | −5.01759 |
| (22) (r3ff + r3fb)/(r3ff − r3fb) | 0.676064 | 3.366619 | 0.604921 |
| (23) L1/L1air | 1.644162 | 1.805128 | 1.551703 |
| (24) L2/L2air | 8.805154 | 1.878241 | 15.99348 |
| (25) f1/L12airw | −0.30255 | −0.38363 | −0.39567 |
| (26) f2/L12airw | 0.400418 | 0.489191 | 0.37985 |
| (27) f2f/f2b | 1.034222 | 6.673503 |  |
| (28) DTw | −69.6489 | −34.5389 | −44.3734 |
| (29) nd3 | 1.53071 | 1.63493 | 1.53071 |
| (30) nd4 | 1.53071 | 1.53071 | 1.53071 |
| (31) |vd3 − vd4| | 0 | −31.8 | 0 |
| (32) Lt/(y × tan2ωw) | −22.3791 | −8.51392 | −10.1105 |

|  | Example 16 | Example 17 | Example 18 |
|---|---|---|---|
| (1) |f1|/|f2| | 0.74616 | 0.71613 | 0.65627 |
| (2) L2/L1 | 0.63167 | 0.904681 | 0.525272 |
| (3) Lt/Lw | 0.81424 | 0.75105 | 0.860121 |
| (4) f1/fw | −2.80998 | −2.53181 | −2.08283 |
| (5) L1/(y × tan2ωw) | −3.10687 | −3.53339 | −4.79061 |
| (6) L1/f1 | −1.51957 | −1.52503 | −2.23447 |
| (7) L2/(y × tan2ωw) | −1.96252 | −3.19659 | −2.51637 |
| (8) L2/f2 | 0.716213 | 0.988025 | 0.77026 |
| (9) L12airt/L2 | 0.216181 | 0.186834 | 0.208587 |
| (10) f3/f1 | 3.112736 | 2.142496 | 1.512982 |
| (11) f4/L1 | 1.27977 | 1.426998 | 0.637298 |
| (12) β3t/β3w | 1.049986 | 0.996278 | 0.997159 |
| (13) β2w | −0.37047 | −0.32857 | −0.40211 |
| (14) β2t/β2w | 3.260333 | 3.513028 | 3.509851 |
| (15) (β2t/β2w)/(ft/tw) | 0.931527 | 1.003724 | 1.002811 |
| (16) (β2t/β2w)/(β3t/β3w) | 3.10512 | 3.526152 | 3.51985 |
| (17) |fct| | 0.55486 | 0.78627 | 1.114 |
| (18) |fct|/|fcw| | 1.271866 | 0.986553 | 0.99287 |
| (19) L12airt/Lt | 0.0378 | 0.045121 | 0.033764 |
| (20) (r1nf + r1nb)/(r1nf − r1nb) | 1.133019 | 1.438401 | 1.329681 |
| (21) (r1pf + r1pb)/(r1pf − r1pb) | 0.027205 | −1.98194 | −1.9993 |
| (22) (r3ff + r3fb)/(r3ff − r3fb) | 3.399814 | 0.64697 | — |
| (23) L1/L1air | 1.627751 | 1.526341 | 1.517149 |
| (24) L2/L2air | 12.86183 | 6.975098 | 9.358519 |
| (25) f1/L12airw | −0.36826 | −0.30323 | −0.33845 |
| (26) f2/L12airw | 0.493538 | 0.42342 | 0.515728 |
| (27) f2f/f2b | 0.163462 | −0.00219 |  |
| (28) DTw | −45.963 | −54.2318 | −58.0499 |
| (29) nd3 | 1.53071 | 1.53071 | 1.53071 |
| (30) nd4 | 1.53071 | 1.53071 | 1.53071 |
| (31) |vd3 − vd4| | 0 | 0 | 0 |
| (32) Lt/(y × tan2ωw) | −11.2238 | −13.2362 | −15.5455 |

Values of parameters in each example are given below.

|  | Example 1 | Example 2 | Example 3 | Example 4 |
|---|---|---|---|---|
| β2w | −0.33616 | −0.40787 | −0.35605 | −0.38228 |
| β2t | −1.16571 | −1.28795 | −1.1923 | −1.33796 |
| β3w | 1.493964 | 1.629148 | 1.367158 | 1.41724 |
| β3t | 1.507788 | 1.805708 | 1.428862 | 1.417225 |
| fcw | −0.79833 | −0.67345 | −0.5237 | −0.61324 |
| fct | −0.82526 | −0.9204 | −0.62769 | −0.61323 |
| f2f | 9.9706 | 11.0238 | 9.2302 | 9.9815 |
| f2b | −763.889 | 1828.52 | −49.432 | −7537.64 |
| Lw | 59.98 | 59.97 | 59.97 | 57.96 |
| Lt | 45.86 | 52.77 | 47.58 | 47.95 |

|  | Example 5 | Example 6 | Example 7 | Example 8 |
|---|---|---|---|---|
| β2w | −0.35082 | −0.35 | −0.38453 | −0.40908 |
| β2t | −1.22812 | −1.07277 | −1.35126 | −1.63628 |
| β3w | 1.415967 | 1.785506 | 1.284103 | 1.343137 |
| β3t | 1.41563 | 2.330038 | 1.278925 | 1.343117 |
| fcw | −0.65937 | −0.77879 | −0.45413 | −0.39999 |
| fct | −0.65876 | −1.57661 | −0.44486 | −0.39998 |
| f2f | 10.3217 | 10.0191 | 11.6323 | 9.7467 |
| f2b | 423.8906 | −63.2104 | 176.4988 | −45.3018 |
| Lw | 57.72 | 62.47 | 59.97 | 59.97 |
| Lt | 45.39 | 55.20 | 49.47 | 52.66 |

|  | Example 9 | Example 10 | Example 11 | Example 12 |
|---|---|---|---|---|
| β2w | −0.35 | −0.38099 | −0.25968 | −0.32333 |
| β2t | −1.05651 | −1.16675 | −0.69248 | −1.18265 |
| β3w | 1.361073 | 1.854026 | 1.913522 | 1.310902 |
| β3t | 1.352655 | 1.816237 | 2.152747 | 1.612731 |
| fcw | −0.39999 | −0.65545 | −1.76584 | −0.47188 |
| fct | −0.38929 | −0.61816 | −2.41113 | −1.05154 |
| f2f | 14.527 | 9.1538 | 9.2955 | — |
| f2b | 53.9926 | −34.7699 | 52.8543 | — |
| Lw | 59.99 | 59.97 | 59.98 | 66.42 |
| Lt | 45.01 | 47.88 | 44.22 | 53.59 |

|  | Example 13 | Example 14 | Example 15 | Example 16 |
|---|---|---|---|---|
| β2w | −0.32385 | −0.35 | −0.25137 | −0.37047 |
| β2t | −1.28984 | −1.01725 | −0.54006 | −1.20786 |
| β3w | 1.599434 | 1.632344 | 2.399306 | 1.377215 |

-continued

|  |  |  |  |  |
|---|---|---|---|---|
| β3t | 1.807065 | 1.684871 | 3.350264 | 1.446057 |
| fcw | −1.02234 | −0.57645 | −2.17517 | −0.43626 |
| fct | −1.48647 | −0.6368 | −4.67543 | −0.55486 |
| f2f | — | 19.9608 | 48.2254 | 14.2366 |
| f2b | — | 19.3003 | 7.2264 | 87.0943 |
| Lw | 62.34 | 59.97 | 57.99 | 64.98 |
| Lt | 49.96 | 46.45 | 49.88 | 52.91 |

|  | Example 17 | Example 18 |
|---|---|---|
| β2w | −0.32857 | −0.40211 |
| β2t | −1.15429 | −1.41135 |
| β3w | 1.493268 | 2.165611 |
| β3t | 1.48771 | 2.159459 |
| fcw | −0.79698 | −1.122 |
| fct | −0.78627 | −1.114 |
| f2f | — | 10.3442 |
| f2b | — | −4715.4 |
| Lw | 67.97 | 61.98 |
| Lt | 51.04 | 53.31 |

Figure 37:
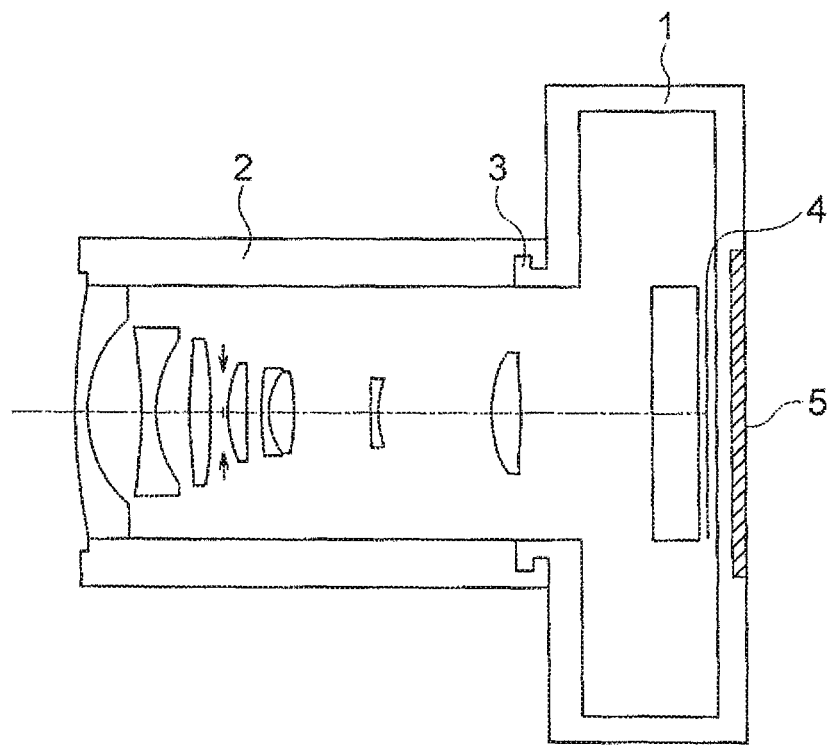
FIG. 37 is a cross-sectional view of an image pickup apparatus.

FIG. 37 is a cross-sectional view of a single-lens mirrorless camera as an electronic image pickup apparatus. In FIG. 37, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens described in any one of the examples from the first example to the eighteenth example is to be used.

Figure 38:
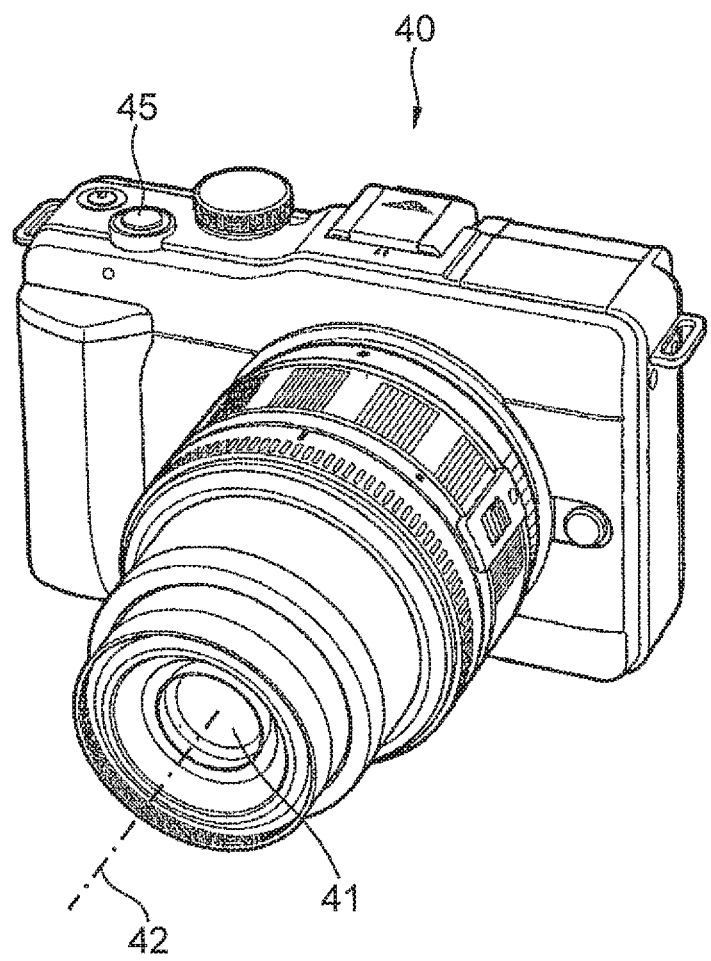
FIG. 38 is a front perspective view of the image pickup apparatus.
Figure 39:
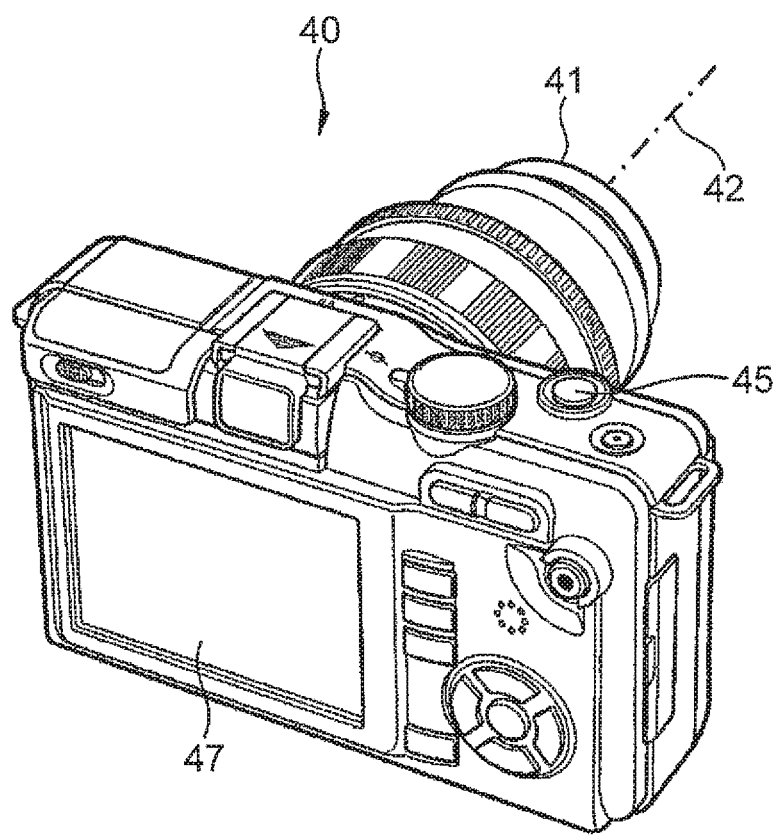
FIG. 39 is a rear perspective view of the image pickup apparatus.

FIG. 38 and FIG. 39 are conceptual diagrams of an arrangement of the image pickup apparatus. FIG. 38 is a front perspective view of a digital camera 40 as the image pickup apparatus, and FIG. 39 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 40:
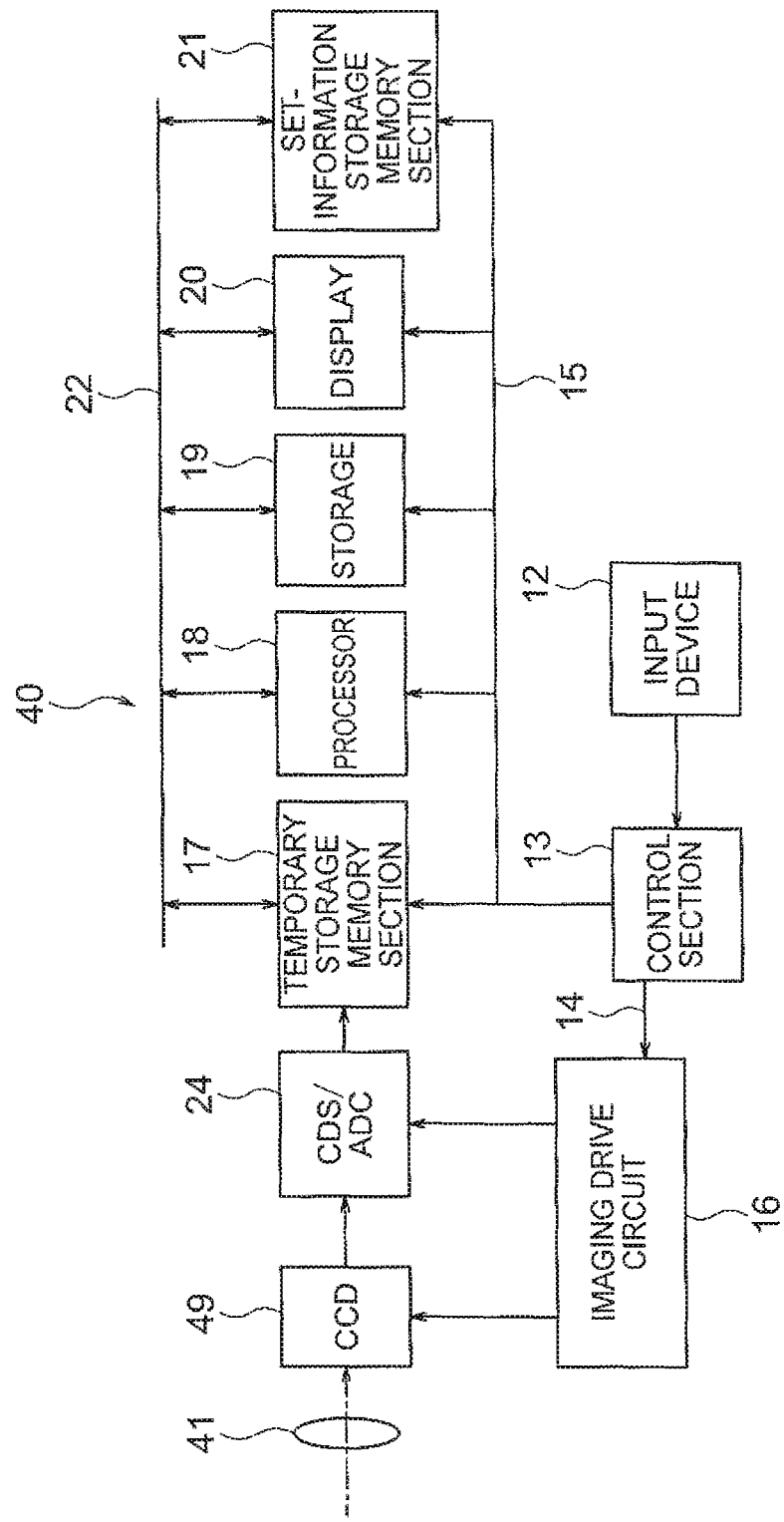
FIG. 40 is a configurational block diagram of an internal circuit of main components of the image pickup apparatus.

FIG. 40 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 40, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the digital camera 40 in which such an arrangement is made, by adopting the zoom lens according to the example as the photographic optical system 41, it is possible to let the digital camera 40 configured in such manner to be an image pickup apparatus which is suitable for capturing an image in a wide angle with a high resolution while being small-sized.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit.

According to the present embodiment, it is possible to provide a zoom lens having a small size in which an aberration is corrected favorably without a light ray being vignetted throughout the entire zoom range while securing a wide angle of view and a high zooming ratio, and an image pickup apparatus using the zoom lens.

As described heretofore, the present invention is suitable for a zoom lens having a small size in which an aberration is corrected favorably without a light ray being vignetted throughout the entire zoom range while securing a wide angle of view and a high zooming ratio, and for an image pickup apparatus using the zoom lens.

What is claimed is:

1. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the third lens unit includes one negative lens,
the negative lens is a focusing lens,
the focusing lens moves toward the object side at a time of focusing to an object at a close distance, and
the following conditional expressions (1), (2), (3), (4), and (22) are satisfied:

$$0.4 < |f1|/|f2| < 1.2 \quad (1)$$

$$0.3 < L2/L1 < 0.95 \quad (2)$$

$$0.6 < Lt/Lw < 1 \quad (3)$$

$$-5 < f1/fw < -2.15 \quad (4)$$

$$0.1 < (r3f\!f + r3f\!b)/(r3f\!f - r3f\!b) < 10 \quad (22)$$

where,
f1 denotes a focal length of the first lens unit,
f2 denotes a focal length of the second lens unit,
L1 denotes a thickness on an optical axis of the first lens unit,
L2 denotes a thickness on an optical axis of the second lens unit,
Lw denotes an overall length of the zoom lens at the wide angle end,
Lt denotes an overall length of the zoom lens at the telephoto end,
fw denotes a focal length of the overall zoom lens system at the wide angle end,
r3ff denotes a radius of curvature of an object-side surface of the focusing lens, and
r3fb denotes a radius of curvature of an image-side surface of the focusing lens, and here
the overall length is a distance from a lens surface nearest to object up to a paraxial image plane, and is a distance in a case in which no air conversion is carried out.

2. The zoom lens according to claim 1, wherein the following conditional expression (6) is satisfied:

$$-2.5 < L1/f1 < -0.8 \quad (6).$$

3. The zoom lens according to claim 1, wherein the following conditional expression (8) is satisfied:

$$0.3 < L2/f2 < 1.5 \quad (8).$$

4. The zoom lens according to claim 1, wherein the following conditional expression (9) is satisfied:

$$0 < L12airt/L2 < 0.9 \quad (9)$$

where,
L12airt denotes an air space between the first lens unit and the second lens unit at the telephoto end.

5. The zoom lens according to claim 1, wherein the following conditional expression (10) is satisfied:

$$0.5 < f3/f1 < 6 \quad (10)$$

where,
f3 denotes a focal length of the third lens unit.

6. The zoom lens according to claim 1, wherein:
the first lens unit includes a plurality of lenses, and
the plurality of lenses include at least two negative lenses and one positive lens.

7. The zoom lens according to claim 1, wherein:
the second lens unit includes an object-side lens component and an image-side lens component, and
the following conditional expression (27) is satisfied:

$$-0.5 < f2f/f2b < 9 \quad (27)$$

where,
f2f denotes a focal length of the object-side lens component, and
f2b denotes a focal length of an image-side lens component, and here, the lens component is one of a single lens and a cemented lens.

8. The zoom lens according to claim 1, wherein:
the fourth lens unit includes one positive lens, and
the following conditional expressions (29), (30), and (31) are satisfied:

$$nd3<1.7 \tag{29}$$

$$nd4<1.7 \tag{30}$$

$$|vd3-vd4|<33 \tag{31}$$

where,
nd3 denotes a refractive index for a d-line of the negative lens in the third lens unit,
vd3 denotes Abbe number for the negative lens in the third lens unit,
nd4 denotes a refractive index for a d-line of the positive lens in the fourth lens unit, and
vd4 denotes Abbe number for the positive lens in the fourth lens unit.

9. The zoom lens according to claim 1, wherein:
the second lens unit includes a negative lens, and
an object-side surface of the negative lens in the second lens unit is convex toward the object side.

10. The zoom lens according to claim 1, wherein:
the second lens unit includes, in order from the object side, a positive lens and a cemented lens,
the cemented lens includes a negative lens and a positive lens, and
an object-side surface of the negative lens in the cemented lens is convex toward the object side.

11. An image pickup apparatus, comprising:
the zoom lens according to claim 1; and
an image pickup element which converts an image formed by the zoom lens to an electric signal.

12. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the third lens unit includes one negative lens,
the negative lens is a focusing lens,
the focusing lens moves toward the object side at a time of focusing to an object at a close distance, and
the following conditional expressions (1), (2), (3), (5), and (22) are satisfied:

$$0.4<|f1|/|f2|<1.2 \tag{1}$$

$$0.3<L2/L1<0.95 \tag{2}$$

$$0.6<Lt/Lw<1 \tag{3}$$

$$-10<L1/(y\times\tan 2\omega w)<-0.5 \tag{5}$$

$$0.1<(r3\mathit{ff}+r3\mathit{fb})/(r3\mathit{ff}-r3\mathit{fb})<10 \tag{22}$$

where,
f1 denotes a focal length of the first lens unit,
f2 denotes a focal length of the second lens unit,
L1 denotes a thickness on an optical axis of the first lens unit,
L2 denotes a thickness on an optical axis of the second lens unit,
Lw denotes an overall length of the zoom lens at the wide angle end,
Lt denotes an overall length of the zoom lens at the telephoto end,
y denotes the maximum image height at an image forming surface in the zoom lens,
ωw denotes a half angle of view at the wide angle end of the zoom lens,
r3ff denotes a radius of curvature of an object-side surface of the focusing lens, and
r3fb denotes a radius of curvature of an image-side surface of the focusing lens, and here
the overall length is a distance from a lens surface nearest to object up to a paraxial image plane, and is a distance in a case in which no air conversion is carried out.

13. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the third lens unit includes one negative lens,
the negative lens is a focusing lens,
the focusing lens moves toward the object side at a time of focusing to an object at a close distance, and
the following conditional expressions (1), (2), (3), (7), and (22) are satisfied:

$$0.4<|f1|/|f2|<1.2 \tag{1}$$

$$0.3<L2/L1<0.95 \tag{2}$$

$$0.6<Lt/Lw<1 \tag{3}$$

$$-8<L2/(y\times\tan 2\omega w)<-0.4 \tag{7}$$

$$0.1<(r3\mathit{ff}+r3\mathit{fb})/(r3\mathit{ff}-r3\mathit{fb})<10 \tag{22}$$

where,
f1 denotes a focal length of the first lens unit,
f2 denotes a focal length of the second lens unit,
L1 denotes a thickness on an optical axis of the first lens unit,
L2 denotes a thickness on an optical axis of the second lens unit,
Lw denotes an overall length of the zoom lens at the wide angle end,
Lt denotes an overall length of the zoom lens at the telephoto end,
y denotes the maximum image height at an image forming surface in the zoom lens,
ωw denotes a half angle of view at the wide angle end of the zoom lens,
r3ff denotes a radius of curvature of an object-side surface of the focusing lens, and
r3fb denotes a radius of curvature of an image-side surface of the focusing lens, and here the overall length is a distance from a lens surface nearest to object up to a paraxial image plane, and is a distance in a case in which no air conversion is carried out.

14. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the third lens unit includes one negative lens,
the negative lens is a focusing lens,
the focusing lens moves toward the object side at a time of focusing to an object at a close distance, and
the following conditional expressions (1), (2), (3), (11), and (22) are satisfied:

$$0.4<|f1|/|f2|<1.2 \tag{1}$$

$$0.3<L2/L1<0.95 \tag{2}$$

$$0.6<Lt/Lw<1 \tag{3}$$

$$0.5<f4/L1<3.5 \tag{11}$$

$$0.1<(r3ff+r3fb)/(r3ff-r3fb)<10 \tag{22}$$

where,
f1 denotes a focal length of the first lens unit,
f2 denotes a focal length of the second lens unit,
L1 denotes a thickness on an optical axis of the first lens unit,
L2 denotes a thickness on an optical axis of the second lens unit,
Lw denotes an overall length of the zoom lens at the wide angle end,
Lt denotes an overall length of the zoom lens at the telephoto end,
f4 denotes a focal length of the fourth lens unit,
r3ff denotes a radius of curvature of an object-side surface of the focusing lens, and
r3fb denotes a radius of curvature of an image-side surface of the focusing lens, and here
the overall length is a distance from a lens surface nearest to object up to a paraxial image plane, and is a distance in a case in which no air conversion is carried out.

15. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the third lens unit includes one negative lens,
the negative lens is a focusing lens,
the focusing lens moves toward the object side at a time of focusing to an object at a close distance, and
the following conditional expressions (1), (2), (3), (22), and (25) are satisfied:

$$0.4<|f1|/|f2|<1.2 \tag{1}$$

$$0.3<L2/L1<0.95 \tag{2}$$

$$0.6<Lt/Lw<1 \tag{3}$$

$$0.1<(r3ff+r3fb)/(r3ff-r3fb)<10 \tag{22}$$

$$-0.60<f1/L12airw<-0.20 \tag{25}$$

where,
f1 denotes a focal length of the first lens unit,
f2 denotes a focal length of the second lens unit,
L1 denotes a thickness on an optical axis of the first lens unit,
L2 denotes a thickness on an optical axis of the second lens unit,
Lw denotes an overall length of the zoom lens at the wide angle end,
Lt denotes an overall length of the zoom lens at the telephoto end,
r3ff denotes a radius of curvature of an object-side surface of the focusing lens,
r3fb denotes a radius of curvature of an image-side surface of the focusing lens,
the overall length is a distance from a lens surface nearest to object up to a paraxial image plane, and is a distance in a case in which no air conversion is carried out, and
L12airw denotes an air space between the first lens unit and the second lens unit at the wide angle end.

16. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the third lens unit includes one negative lens,
the negative lens is a focusing lens,
the focusing lens moves toward the object side at a time of focusing to an object at a close distance, and
the following conditional expressions (1), (2), (3), (22), and (26) are satisfied:

$$0.4<|f1|/|f2|<1.2 \tag{1}$$

$$0.3<L2/L1<0.95 \tag{2}$$

$$0.6<Lt/Lw<1 \tag{3}$$

$$0.1<(r3ff+r3fb)/(r3ff-r3fb)<10 \tag{22}$$

$$0.30<f2/L12airw<0.70 \tag{26}$$

where,
f1 denotes a focal length of the first lens unit,
f2 denotes a focal length of the second lens unit,
L1 denotes a thickness on an optical axis of the first lens unit,
L2 denotes a thickness on an optical axis of the second lens unit,
Lw denotes an overall length of the zoom lens at the wide angle end, Lt denotes an overall length of the zoom lens at the telephoto end,
r3ff denotes a radius of curvature of an object-side surface of the focusing lens,
r3fb denotes a radius of curvature of an image-side surface of the focusing lens,
the overall length is a distance from a lens surface nearest to object up to a paraxial image plane, and is a distance in a case in which no air conversion is carried out, and
L12airw denotes an air space between the first lens unit and the second lens unit at the wide angle.

17. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the first lens unit moves from the object side to an image side only, at the time of zooming,
the third lens unit includes one negative lens,
the negative lens is a focusing lens,
the focusing lens moves toward the object side at a time of focusing to an object at a close distance, and
the following conditional expressions (1), (2), (3), and (22) are satisfied:

$$0.4<|f1|/|f2|<1.2 \tag{1}$$

$$0.3<L2/L1<0.95 \tag{2}$$

$$0.6<Lt/Lw<1 \tag{3}$$

$$0.1<(r3\mathit{ff}+r3\mathit{fb})/(r3\mathit{ff}-r3\mathit{fb})<10 \tag{22}$$

where,
f1 denotes a focal length of the first lens unit,
f2 denotes a focal length of the second lens unit,
L1 denotes a thickness on an optical axis of the first lens unit,
L2 denotes a thickness on an optical axis of the second lens unit,
Lw denotes an overall length of the zoom lens at the wide angle end,
Lt denotes an overall length of the zoom lens at the telephoto end,
r3ff denotes a radius of curvature of an object-side surface of the focusing lens, and
r3fb denotes a radius of curvature of an image-side surface of the focusing lens, and here
the overall length is a distance from a lens surface nearest to object up to a paraxial image plane, and is a distance in a case in which no air conversion is carried out.

18. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the third lens unit includes one negative lens,
the negative lens is a focusing lens,
the focusing lens moves toward the object side at a time of focusing to an object at a close distance, and
the following conditional expressions (1), (2), (3), (22), and (28) are satisfied:

$$0.4<|f1|/|f2|<1.2 \tag{1}$$

$$0.3<L2/L1<0.95 \tag{2}$$

$$0.6<Lt/Lw<1 \tag{3}$$

$$0.1<(r3\mathit{ff}+r3\mathit{fb})/(r3\mathit{ff}-r3\mathit{fb})<10 \tag{22}$$

$$-80\%<DTw<-8\% \tag{28}$$

where,
f1 denotes a focal length of the first lens unit,
f2 denotes a focal length of the second lens unit,
L1 denotes a thickness on an optical axis of the first lens unit,
L2 denotes a thickness on an optical axis of the second lens unit,
Lw denotes an overall length of the zoom lens at the wide angle end,
Lt denotes an overall length of the zoom lens at the telephoto end,
r3ff denotes a radius of curvature of an object-side surface of the focusing lens,
r3fb denotes a radius of curvature of an image-side surface of the focusing lens,
the overall length is a distance from a lens surface nearest to object up to a paraxial image plane, and is a distance in a case in which no air conversion is carried out, and
DTw denotes an amount of distortion at the maximum image height at the wide angle end.

19. A zoom lens comprising, in order from an object side:
a first lens unit having a negative refractive power;
a second lens unit having a positive refractive power;
a third lens unit having a negative refractive power; and
a fourth lens unit having a positive refractive power,
wherein:
at a time of zooming, distances between lens units vary,
a distance between the first lens unit and the second lens unit becomes smaller at a telephoto end than at a wide angle end, and a distance between the second lens unit and the third lens unit becomes longer at the telephoto end than at the wide angle end,
the third lens unit includes one negative lens,
the negative lens is a focusing lens,
the focusing lens moves toward the object side at a time of focusing to an object at a close distance, and
the following conditional expressions (1), (2), (3), (22), and (32) are satisfied:

$$0.4<|f1|/|f2|<1.2 \tag{1}$$

$$0.3<L2/L1<0.95 \tag{2}$$

$$0.6<Lt/Lw<1 \tag{3}$$

$$0.1<(r3\mathit{ff}+r3\mathit{fb})/(r3\mathit{ff}-r3\mathit{fb})<10 \tag{22}$$

$$-35<Lt/(y\times\tan 2\omega w)<-2 \tag{32}$$

where,
f1 denotes a focal length of the first lens unit,
f2 denotes a focal length of the second lens unit, L1 denotes a thickness on an optical axis of the first lens unit,
L2 denotes a thickness on an optical axis of the second lens unit,
Lw denotes an overall length of the zoom lens at the wide angle end,
Lt denotes an overall length of the zoom lens at the telephoto end,
$r3ff$ denotes a radius of curvature of an object-side surface of the focusing lens,
$r3fb$ denotes a radius of curvature of an image-side surface of the focusing lens,
y denotes the maximum image height at an image forming surface in the zoom lens, and
ωw denotes a half angle of view at the wide angle end of the zoom lens, and here
the overall length is a distance from a lens surface nearest to object up to a paraxial image plane, and is a distance in a case in which no air conversion is carried out.

\* \* \* \* \*